US011309779B2

(12) United States Patent
Chang

(10) Patent No.: US 11,309,779 B2
(45) Date of Patent: Apr. 19, 2022

(54) BRUSH-LESS DC DYNAMO AND A VEHICLE COMPRISING THE SAME

(71) Applicant: Chun-Jong Chang, Zhubei (TW)

(72) Inventor: Chun-Jong Chang, Zhubei (TW)

( * ) Notice: Subject to any disclaimer, the term of this patent is extended or adjusted under 35 U.S.C. 154(b) by 125 days.

(21) Appl. No.: 16/996,898

(22) Filed: Aug. 19, 2020

(65) Prior Publication Data

US 2021/0067020 A1 Mar. 4, 2021

Related U.S. Application Data

(60) Provisional application No. 62/955,466, filed on Dec. 31, 2019, provisional application No. 62/892,585, filed on Aug. 28, 2019.

(51) Int. Cl.
| | | |
|---|---|---|
| *H02K 29/08* | (2006.01) | |
| *H02K 1/16* | (2006.01) | |
| *H02K 1/26* | (2006.01) | |

(52) U.S. Cl.
CPC .............. *H02K 29/08* (2013.01); *H02K 1/16* (2013.01); *H02K 1/26* (2013.01)

(58) Field of Classification Search
CPC ............ H02K 29/08; H02K 1/16; H02K 1/26
USPC ........................................ 310/177, 179, 184
See application file for complete search history.

(56) References Cited

U.S. PATENT DOCUMENTS

| 2,413,805 A * | 1/1947 | Vickers .................. H02K 41/06 |
|---|---|---|
| | | 310/216.022 |
| 2016/0020652 A1 * | 1/2016 | Hunstable .............. H02K 21/12 |
| | | 310/177 |

FOREIGN PATENT DOCUMENTS

CN          1462500 A * 12/2003  ........... B64C 39/001

* cited by examiner

*Primary Examiner* — Jose A Gonzalez Quinones

(57) ABSTRACT

This invention provides a brushless dc dynamo, which is characterized by using semiconductor switches to replace commutators used in conventional brush DC dynamo, wherein the periodically mechanical contact of the armature and different electrodes are replaced with static electronic switching array to periodically switch electrically without any mechanical contact switching between the armature and electrodes. Meanwhile, the armature can work as conventional mode to always maintain the distribution of the armature current such that the magnetic field of the rotor is perpendicular to the magnetic field of the stator during rotating, and the damage of switched contacts caused by mechanical contact of the armature and electrodes can be avoided.

16 Claims, 35 Drawing Sheets

BRUSH-LESS DC DYNAMO AND A VEHICLE COMPRISING THE SAME

This application claims the benefit of U.S. provisional patent application No. 62/892,585, filed on Aug. 28, 2019, and U.S. provisional patent application No. 62/955,466, filed on Dec. 31, 2019, and the entirety of which are incorporated by reference herein.

BACKGROUND OF THE INVENTION

Field of the Invention

The present invention relates to a DC dynamo and in particular relates to a brushless DC dynamo and a vehicle comprising the same.

Description of the Related Art

A conventional DC dynamo usually includes brushes and commutators (i.e. rectifier) to always keep the magnetic field of the rotor perpendicular to the magnetic field of the stator during rotation to generate a greatest torque. Meanwhile, the DC dynamos continuously head the lists of rotation speed controlling and servo controlling fields owing to advantages of voltage proportion to the rotation speed and hence naturally easy to control. The brushless DC dynamo (BLDC dynamo) is now very popular in the market, which has a structure like a permanent-magnet variable frequency synchronous AC dynamo, wherein the rotatable angle of the stator is determined by a so-called multiple phase magnetic field, for example three phases magnetic field, thus the permanent rotor can be rotated by a magnetic field with variable rotation velocities to serve as a motor; or, the electromotive force induced by a permanent rotor can be transformed into AC power by a multiphase coil, such as a three phase coil, to serve as a generator. However, the VVVF control method of state-of-the-art BLDC is too complex and unnatural, so a novel brushless DC dynamo with a working mode more close to that of the convention DC dynamo is highly expected.

SUMMARY OF THE INVENTION

A feature of this present invention is to provide a brushless DC dynamo, comprising: a circular armature unit, comprising: L slots of first armature conductors spaced with each other in sequence, and $1^{th}$ slot of the first armature conductors is adjacent to $L^{th}$ slot of the first armature conductors and spatially joined with each other, L is a natural number; and L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number; a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and S≥2, and each pair of the magnetic poles faces M slots of the circular armature unit, M is a natural number and M=2S, L=M*N; a pair of external electrodes comprising a first external electrode with a first polarity and a second external electrode with a second polarity, wherein the first polarity and the second polarity are opposite to each other; a control unit comprising M first control switches and M second control switches; and a logic unit electrically connected to the control unit, wherein logic signals for controlling short or open of the first control switches and the second control switches are outputted by the logic unit by sensing positions of the magnetic unit; wherein, the first armature conductors and the second armature conductors are classified as M steps of armature coils interconnecting in sequence, and $P^{th}$ step of the armature coils is formed by P1 slot of the first armature conductors satisfying with 1≤Q≤N and P2 slot of the second armature conductors satisfying 1≤Q≤N interconnecting in sequence, wherein P1=1+remainder of $\{[P-1+(M*(Q-1))]/L\}$, P2=1+remainder of $\{[P-1+(M*(Q-1))+S]/L\}$, P, Q, S are all natural numbers, and 1≤P≤M, 1≤Q≤N, 1≤P2≤L; wherein, $1^{th}$ first control switch is disposed between the first external electrode with a first polarity and a node connecting $1^{th}$ step of the armature coils and $M^{th}$ step of the armature coils, wherein $i^{th}$ first control switch is disposed between the first external electrode with a first polarity and a node connecting $(i-1)^{th}$ step of the armature coils and $i^{th}$ step of the armature coils, and $i^{th}$ second control switch is disposed between the second external electrode with a second polarity and a node connecting $1^{th}$ step of the armature coils and $M^{th}$ step of the armature coils, wherein $i^{th}$ second control switch is disposed between the second external electrode with a second polarity and a node connecting $(i-1)^{th}$ step of the armature coils and $i^{th}$ step of the armature coils, i is a natural number and 2≤i≤M; wherein, when the brushless DC dynamo is operated under a basic mode, there is only one of the first control switch that is short and only one of the second control switch that is short at the same operating time, wherein when $1^{th}$ first control switch is short, $(1+S)^{th}$ second control switch is short; when 2≤i≤S, $i^{th}$ first control switch is short, $(i+S)^{th}$ second control switch is short; when i=S+1, $i^{th}$ first control switch is short, $1_{st}$ second control switch is short; when S+1≤i≤M, $i^{th}$ first control switch is short, $(i-S)^{th}$ second control switch is short; wherein when the brushless DC dynamo is operated under transition mode during transiting from a basic mode to next basic mode, adjacent two of the first control switches or adjacent two of the second control switches of the brushless DC dynamo can be short at the same operating time, and the first control switches not adjacent to each other or the second control switches not adjacent to each other of the brushless DC dynamo cannot be short at the same operating time.

The brushless DC dynamo as mentioned in paragraph [0003], wherein the driving or outputting direction of the brushless DC dynamo will be reversed when the polarities of the logic signals outputted by the logic unit are changed to upset the operation of the first control switches and the second control switches of the same step without changing the first polarity of the first external electrode and the second polarity of the second external electrode. Alternatively, the brushless DC dynamo as mentioned in paragraph [0003], wherein the driving or outputting direction of the brushless DC dynamo will be quickly reversed to provide a power modulation function similar to bipolar pulse width modulation (PWM) when the polarities of the logic signals outputted by the logic unit are quickly changed to quickly upset the operation of the first control switches and the second control switches of the same step without changing the first polarity of the first external electrode and the second polarity of the second external electrode. Alternatively, the brushless DC dynamo as mentioned in paragraph [0003], wherein a power modulation function similar to single polar pulse width modulation (PWM) is provided when the polarities of the first external electrode and the second external electrode and the polarities of the logic signals output by the logic unit are not changed, and the logic signals output by the logic unit are quickly synchronously enabled or forbidden to quickly synchronously enable or forbid the operation of the first control switches and the second control switches of the same step.

Another feature of this invention is to provide a brushless DC dynamo, comprising: a circular armature unit, comprising: L slots of first armature conductors spaced with each other in sequence, and $1^{th}$ slot of the first armature conductors is adjacent to $L^{th}$ slot of the first armature conductors and spatially joined with each other, L is a natural number; and L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number; a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and S≥2, and each pair of the magnetic poles faces M' slots of the circular armature unit, M' is a natural number and M'=2S, L=M'*N; a pair of external electrodes comprising a first external electrode with a first polarity and a second external electrode with a second polarity, wherein the first polarity and the second polarity are opposite to each other; a control unit comprising M' first control switches and M' second control switches; and a logic unit electrically connected to the control unit, wherein logic signals for controlling short or open of the first control switches and the second control switches are outputted by the logic unit by sensing positions of the magnetic unit; wherein, the first armature conductors and the second armature conductors are classified as M' steps of armature coils interconnecting in sequence, and $P^{th}$ step of the armature coils is formed by P1 slot of the first armature conductors satisfying with 1≤Q≤N and P2 slot of the second armature conductors satisfying 1≤Q≤N interconnecting in sequence, wherein P1=1+remainder of $\{[P-1+(M'*(Q-1)+S)]/L\}$, P2=1+remainder of $\{[P-1+(M'*(Q-1))]/L\}$, P, Q, P1, P2 are all natural numbers, and M'≥4, 1≤P≤M', 1≤Q≤N, 1≤P1≤L, 1≤P2≤L, and the armature coils are classified as S classes, wherein $t^{th}$ class of the armature coils is formed by $t^{th}$ step of the armature coils and $(t+S)^{th}$ step of the armature coils reversely connected in sequence or in parallel, t is a natural number and t≤S; wherein, a $(2t-1)^{th}$ node and a $(2t)^{th}$ node are on two terminals of the $t^{th}$ class of the armature coils formed by $t^{th}$ step of the armature coils and $(t+S)^{th}$ step of the armature coils reversely connected in sequence or in parallel, and a $t^{th}$ first control switch is interconnected with the first external electrode with a first polarity at the $(2t-1)^{th}$ node, and a $(t+S)^{th}$ second control switch is interconnected with the second external electrode with a second polarity at the $(2t)^{th}$ node; wherein, there are at most half of the first control switches short and at most half of the second control switches short at the same operation time, and the $t^{th}$ first control switch and the $t^{th}$ second control switch are not short at the same time, and the the $(t+S)^{th}$ first control switch and the $(t+S)^{th}$ second control switch are not short at the same time.

The brushless DC dynamo as mentioned in paragraph [0005], wherein the driving or outputting direction of the brushless DC dynamo will be reversed when the polarities of the logic signals outputted by the logic unit are changed to upset the operation of the first control switches and the second control switches of the same step without changing the first polarity of the first external electrode and the second polarity of the second external electrode. Alternatively, the brushless DC dynamo as mentioned in paragraph [0005], wherein the driving or outputting direction of the brushless DC dynamo will be quickly reversed to provide a power modulation function similar to bipolar pulse width modulation (PWM) when the polarities of the logic signals outputted by the logic unit are quickly changed to quickly upset the operation of the first control switches and the second control switches of the same step without changing the first polarity of the first external electrode and the second polarity of the second external electrode, or a power modulation function similar to single polar pulse width modulation (PWM) is provided when the polarities of the first external electrode and the second external electrode and the polarities of the logic signal output by the logic unit are not changed, and the logic signals output by the logic unit are quickly synchronously enabled or forbidden to quickly synchronously enable or forbid the operation of the first control switches and the second control switches of the same step. Alternatively, the brushless DC dynamo as mentioned in paragraph [0005], wherein a power modulation function similar to single polar pulse width modulation (PWM) is provided when the polarities of the first external electrode and the second external electrode and the polarities of the logic signals output by the logic unit are not changed, and the logic signals output by the logic unit are quickly synchronously enabled or forbidden to quickly synchronously enable or forbid the operation of the first control switches and the second control switches of the same step.

Another feature of this present invention is to provide another brushless DC dynamo, comprising: a circular armature unit, comprising: L slots of first armature conductors spaced with each other in sequence, and slot of the first armature conductors is adjacent to $L^{th}$ slot of the first armature conductors and spatially joined with each other, L is a natural number; and L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number; a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and S≥2, and each pair of the magnetic poles faces M' slots of the circular armature unit, M' is a natural number and M'=2S, L=M'*N; a pair of external electrodes comprising a first external electrode with a first polarity and a second external electrode with a second polarity, wherein the first polarity and the second polarity are opposite to each other, and the pair of external electrodes is a rechargeable battery or a power supplying module, and the first external electrode is interconnected to the rechargeable battery or the power supplying module in sequence by a inductor; a first common potential electrode directly or indirectly electrically connected to the first external electrode with a first polarity; a second common potential electrode; a third common potential electrode electrically connected to the second common potential electrode; a fourth common potential electrode directly or indirectly electrically connected to the second external electrode with a second polarity; a control unit comprising M1' first control switches, M1' second control switches, M2' third control switches and M2' fourth control switches, wherein M1'=2S1, M2'=2S2, M1'+M2'≤M', and S1≥1 S2≥1, S1+S2≤S, and M1', M2', S1 and S2 are all natural numbers; and a logic unit electrically connected to the control unit, wherein logic signals for controlling short or open of the first control switches, the second control switches, the third control switches and the fourth control switches are outputted by the logic unit by sensing the positions of the magnetic unit; wherein, the first armature conductors and the second armature conductors are classified as M' steps of armature coils interconnecting in sequence, and $P^{th}$ step of the armature coils is formed by P1 slot of the first armature conductors satisfying with $1 \leq Q \leq N$ and P2 slot of the second armature conductors satisfying $1 \leq Q \leq N$ interconnecting in sequence, wherein P1=1+remainder of $\{[P-1+(M'*(Q-1))]/L\}$, P2=1+remainder of $\{[P-1+(M'*(Q-1))+S]/L\}$, P, Q, P1, P2 are all natural numbers, and $M' \geq 4$, $1 \leq P \leq M'$, $1 \leq Q \leq N$, $1 \leq P1 \leq L$, $1 \leq P2 \leq L$, and the armature coils are classified as S classes, and the S classes of the armature coils are further divided into a first group and a second group, wherein the first group includes S1 classes of the armatures coils and the second group includes S2 classes of the armatures coils; wherein, the S1 classes of the armature coils in the first class are independently connected to the first control switch electrically connected to the first common potential electrode and the second control switch electrically connected to the second common potential electrode, wherein $t1^{th}$ class of the armature coils is formed by t1 step of the armature coils and $t1+S^{th}$ step of the armature coils reversely connected in sequence or in parallel, t1 is a natural number and $1 \leq t1 \leq S$, and wherein, a $[2(t1)-1]^{th}$ node and a $[2(t1)]^{th}$ node are on two terminals of the $t1^{th}$ class of the armature coils, and a $[2(t1)]^{th}$ first control switch is interconnected between the first common potential electrode and the $[2(t1)-1]^{th}$ node, and a $[2(t1)-1]^{th}$ second control switch is interconnected between the second common potential electrode and the $[2(t1)-1]^{th}$ node, and there are at most half of the first control switches short and at most half of the second control switches short at the same operation time, and the $[2(t1)-1]^{th}$ first control switch and the $[2(t1)-1]^{th}$ second control switch are not short at the same time, and the $[2(t1)]^{th}$ first control switch and the $[2(t1)]^{th}$ second control switch are not short at the same time; wherein, the S2 class of the armature coils in the second class are independently connected to the third control switch electrically connected to the third common potential electrode and the fourth control switch electrically connected to the fourth common potential electrode, wherein $t2^{th}$ class of the armature coils is formed by t2 step of the armature coils and $(t2+S)^{th}$ step of the armature coils reversely connected in sequence or in parallel, t2 is a natural number and $S1+1 \leq t2 \leq S$, and a $[2(t2)-1]^{th}$ node and a $[2(t2)-3]^{th}$ node are on two terminals of the $t2^{th}$ class of the armature coils, and a $[2(t2)-3]^{th}$ third control switch is interconnected with the third common potential electrode at the $[2(t2)-1]^{th}$ node, and a $[2(t2)-2]^{th}$ second control switch is interconnected with the second common potential electrode at the $[2(t2)]^{th}$ node, and there are at most half of the third control switches short and at most half of the fourth control switches short at the same operation time, and the $[2(t2)-3]^{th}$ third control switch and the $[2(t2)-3]^{th}$ fourth control switch are not short at the same time, and the $[2(t2)-2]^{th}$ third control switch and the $[2(t2)-2]^{th}$ fourth control switch are not short at the same time.

The brushless DC dynamo as mentioned in paragraph [0007], further comprising a fifth control switch, a sixth control switch and a seventh control switch, wherein the third common potential electrode electrically is electrically connected to a terminal of the fifth control switch and a terminal of the seventh control switch and the other one terminal of the fifth control switch is electrically connected to the first common potential electrode, and the second common potential electrode electrically is electrically connected to a terminal of the sixth control switch and the other one terminal of the seventh control switch and the other one terminal of the sixth control switch is electrically connected to the fourth common potential electrode, wherein the brushless DC dynamo acts as motor connected in parallel driven by the rechargeable battery module when the fifth control switch and the sixth control switch are short and the seventh control switch is open, and the brushless DC dynamo acts as generator connected in series and charge to the rechargeable battery module when the fifth control switch and the sixth control switch are open and the seventh control switch is short.

The brushless DC dynamo as mentioned in paragraphs [0007] or [0008], wherein the driving or outputting direction of the brushless DC dynamo will be reversed when the polarities of the logic signals outputted by the logic unit are changed to upset the operation of the first control switches, the second control switches, the third control switches, and the fourth control switches of the same step without changing the first polarity of the first external electrode and the second polarity of the second external electrode. Alternatively, the brushless DC dynamo as mentioned in paragraphs [0007] or [0008], wherein the driving or outputting direction of the brushless DC dynamo will be quickly reversed to provide a power modulation function similar to bipolar pulse width modulation (PWM) when the polarities of the logic signals outputted by the logic unit are quickly changed to quickly upset the operation of the first control switches, the second control switches, the third control switches and the fourth control switches of the same step without changing the first polarity of the first external electrode and the second polarity of the second external electrode. Alternatively, the brushless DC dynamo as mentioned in paragraphs [0007] or [0008], wherein a power modulation function similar to single polar pulse width modulation (PWM) is provided when the polarities of the first external electrode and the second external electrode and the polarities of the logic signals output by the logic unit are not changed, and the logic signals output by the logic unit are quickly synchronously enabled or forbidden to quickly synchronously enable or forbid the operation of the first control switches, the second control switches, the third control switches and the fourth control switches of the same step.

The brushless DC dynamo as mentioned above, wherein the first control switch and the second control switch are power device switches.

The brushless DC dynamo as mentioned above, wherein the first control switch, the second control switch, the third control switch, the fourth control switch, the fifth control switch, the sixth control switch and the seventh control switch are power device switches.

The brushless DC dynamo as mentioned above, wherein the power device switches are SiC switches, GaN switches, bipolar junction transistor (BJT) switches, insulated gate bipolar transistor (IGBT) switches or metal-oxide-semiconductor field-effect transistor (MOSFET) switches.

The brushless DC dynamo as mentioned above, wherein the magnetic unit is a permanent magnet or a electromagnet.

The brushless DC dynamo as mentioned above, wherein the logic unit is a resolver, a encoder, a Hall sensor, a photointerrupter or a photoelectric sensor.

The brushless DC dynamo as mentioned above, wherein the first armature coils and the second armature coils are manufactured by wave winding, lap winding or frog-leg winding.

The brushless DC dynamo as mentioned above, wherein the circular armature unit is a circular stator and the magnetic unit is a magnetic rotor, or alternatively the circular armature unit is a circular rotor and the magnetic is a magnetic stator.

Another feature of this invention is to provide a vehicle comprising at least one brushless DC dynamo as mentioned above.

BRIEF DESCRIPTION OF THE DRAWINGS

FIG. 4A' is a schematic drawing illustrating another brushless DC dynamo 2000' of the embodiment 2 according to this present invention.

FIG. 4B' is a schematic drawing illustrating another connection of the 4 steps armature coil of the brushless DC dynamo 2000 as shown in FIG. 4A.

FIG. 4B''' is a schematic drawing illustrating another connection of the 4 steps armature coil of the brushless DC dynamo 2000' as shown in FIG. 4A'.

DETAILED DESCRIPTION OF THE INVENTION

Figure 1A:
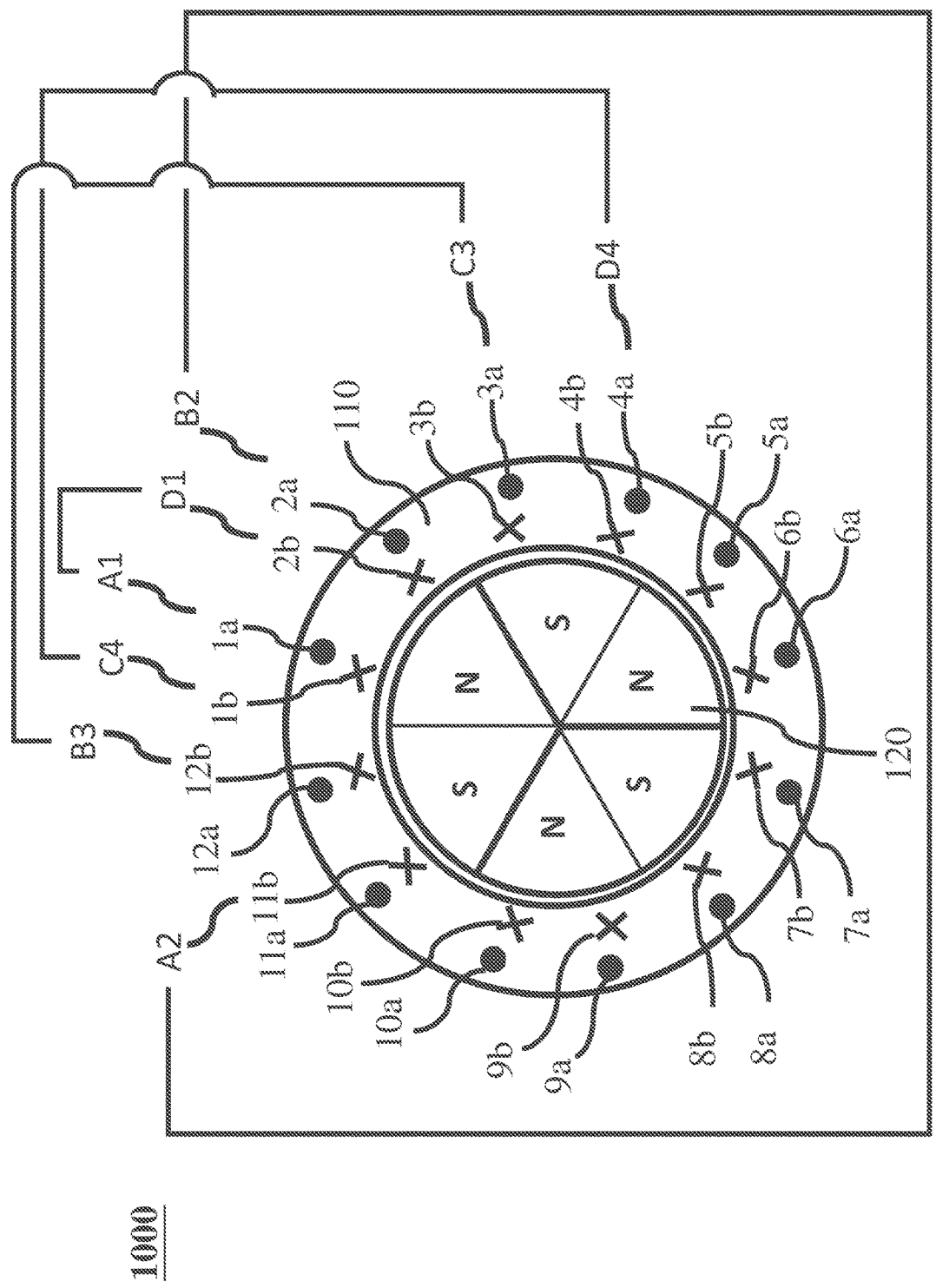
FIG. 1A is a schematic drawing illustrating a brushless DC dynamo 1000 of the embodiment 1 according to this present invention.

According to this present invention, the commutators used in the conventional brush DC dynamo are replaced with semiconductor switches, wherein the periodically mechanical contact of the armature and different electrodes are replaced with static electronic switching array to periodically switch without any contact of the armature and electrodes. Meanwhile, the armature can work as conventional mode to maintain the distribution of the armature current when the magnetic field of the rotator is perpendicular to the magnetic field of the stator during rotating, and the damage of switch contacts caused by mechanical contact of the armature and electrodes can be avoided.

The making and using of the embodiments of the present disclosure are discussed in detail below. However, it should be noted that the embodiments provide many applicable inventive concepts that can be embodied in a variety of specific methods. The specific exemplary embodiments discussed are merely illustrative of specific methods to make and use the embodiments, and do not limit the scope of the disclosure.

Exemplary Embodiment 1

This exemplary embodiment 1 according to this present invention is to provide a brushless DC dynamo, comprising: a circular armature unit, comprising: L slots of first armature conductors spaced with each other in sequence, and $1^{th}$ slot of the first armature conductors is adjacent to $L^{th}$ slot of the first armature conductors and spatially joined with each other, L is a natural number; and L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number; a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and S≥2, and each pair of the magnetic poles faces M slots of the circular armature unit, M is a natural number and M=2S, L=M*N; a pair of external electrodes comprising a first external electrode with a first polarity and a second external electrode with a second polarity, wherein the first polarity and the second polarity are opposite to each other; a control unit comprising M first control switches and M second control switches; and a logic unit electrically connected to the control unit, wherein logic signals for controlling short or open of the first control switches and the second control switches are outputted by the logic unit by sensing positions of the magnetic unit; wherein, the first armature conductors and the second armature conductors are classified as M steps of armature coils interconnecting in sequence, and $P^{th}$ step of the armature coils is formed by P1 slot of the first armature conductors satisfying with 1≤Q≤N and P2 slot of the second armature conductors satisfying 1≤Q≤N interconnecting in sequence, wherein P1=1+remainder of {[P−1+(M*(Q−1))]/L}, P2=1+remainder of {[P−1+(M*(Q−1))+S]/L}, P, Q, S are all natural numbers, and 1≤P≤M, 1≤Q≤N, 1≤P1≤L, 1≤P2≤L; wherein, $1^{th}$ first control switch is disposed between the first external electrode with a first polarity and a node connecting $1^{th}$ step of the armature coils and $M^{th}$ step of the armature coils, wherein $i^{th}$ first control switch is disposed between the first external electrode with a first polarity and a node connecting $(i-1)^{th}$ step of the armature coils and $i^{th}$ step of the armature coils, and $i^{th}$ second control switch is disposed between the second external electrode with a second polarity and a node connecting $1^{th}$ step of the armature coils and $M^{th}$ step of the armature coils, wherein $i^{th}$ second control switch is disposed between the second external electrode with a second polarity and a node connecting $(i-1)^{th}$ step of the armature coils and $i^{th}$ step of the armature coils, i is a natural number and $2 \leq i \leq M$; wherein, when the brushless DC dynamo is operated under a basic mode, there is only one of the first control switch that is short and only one of the second control switch that is short at the same operating time, wherein when $1^{th}$ first control switch is short, $(1+S)^{th}$ second control switch is short; when $2 \leq i \leq S$, $i^{th}$ first control switch is short, $(i+S)^{th}$ second control switch is short; when $i=S+1$, $i^{th}$ first control switch is short, $1_{st}$ second control switch is short; when $S+1 \leq i \leq M$, $i^{th}$ first control switch is short, $(i-S)^{th}$ second control switch is short; wherein when the brushless DC dynamo is operated under transition mode during transiting from a basic mode to next basic mode, adjacent two of the first control switches or adjacent two of the second control switches of the brushless DC dynamo can be short at the same operating time, and the first control switches not adjacent to each other or the second control switches not adjacent to each other of the brushless DC dynamo cannot be short at the same operating time.

When the polarity of the first external electrode is positive and the polarity of the second external electrode is negative, the logic unit will outputs a positive logic signal to the control unit, and when $1^{th}$ first control switch and $(1+S)^{th}$ second control switch are short, the current within the pair of the external electrodes will reverse at the node connecting to the $1^{th}$ first control switch and the node connecting the $S^{th}$ step of the armature coil and the $(1+S)^{th}$ step of the armature coil; when $2 \leq i \leq S$, and when $i^{th}$ first control switch and $(i+S)^{th}$ second control switch are short, the current within the pair of the external electrodes will reverse at the node connecting the $(i-1)^{th}$ step of the armature coil and $i^{th}$ step of the armature coil, and the node connecting the $(i+S-1)^{th}$ step of the armature coil and the $(i+S)^{th}$ step of the armature coil; when $i=S+1$, and when $i^{th}$ first control switch and $1^{th}$ second control switch are short, the current within the pair of the external electrodes will reverse at the node connecting the $(i-1)^{th}$ step of the armature coil and $1^{th}$ step of the armature coil, and the node connecting the $M^{th}$ step of the armature coil and the $1^{th}$ step of the armature coil; when $S+1 \leq i \leq M$, and when $i^{th}$ first control switch and $(i-S)^{th}$ second control switch are short, the current within the pair of the external electrodes will reverse at the node connecting the $(i-1)^{th}$ step of the armature coil and $i^{th}$ step of the armature coil, and the node connecting the $(i-S-1)^{th}$ step of the armature coil and the $(i-S)^{th}$ step of the armature coil.

The brushless DC dynamo of the Embodiment 1 as mentioned above, wherein the first control switch and the second control switch are power device switches for example but not limited to SiC switches, GaN switches, bipolar junction transistor (BJT) switches, insulated gate bipolar transistor (IGBT) switches or metal-oxide-semiconductor field-effect transistor (MOSFET) switches.

The brushless DC dynamo of the Embodiment 1 as mentioned above, wherein the magnetic unit is a permanent magnet or a electromagnet.

The brushless DC dynamo of the Embodiment 1 as mentioned above, wherein the logic element is for example but not limited to a resolver, a encoder, a Hall sensor, a photointerrupter or a photoelectric sensor.

The brushless DC dynamo of the Embodiment 1 as mentioned above, wherein the first armature coils and the second armature coils are manufactured by wave winding, lap winding or frog-leg winding.

The brushless DC dynamo of the Embodiment 1 as mentioned above, wherein the circular armature unit is a circular stator and the magnetic unit is a magnetic rotor, or alternatively the circular armature unit is a circular rotor and the magnetic is a magnetic stator.

Please refer to FIG. 1A. FIG. 1A is a schematic drawing illustrating a brushless DC dynamo 1000 of the embodiment 1 according to this present invention. As shown in FIG. 1A, the brushless DC dynamo 1000 comprises a circular armature unit 110 and a magnetic unit 120 consisted of a permanent magnet or an electromagnet disposed inside of the circular armature unit 110.

Figure 1B:
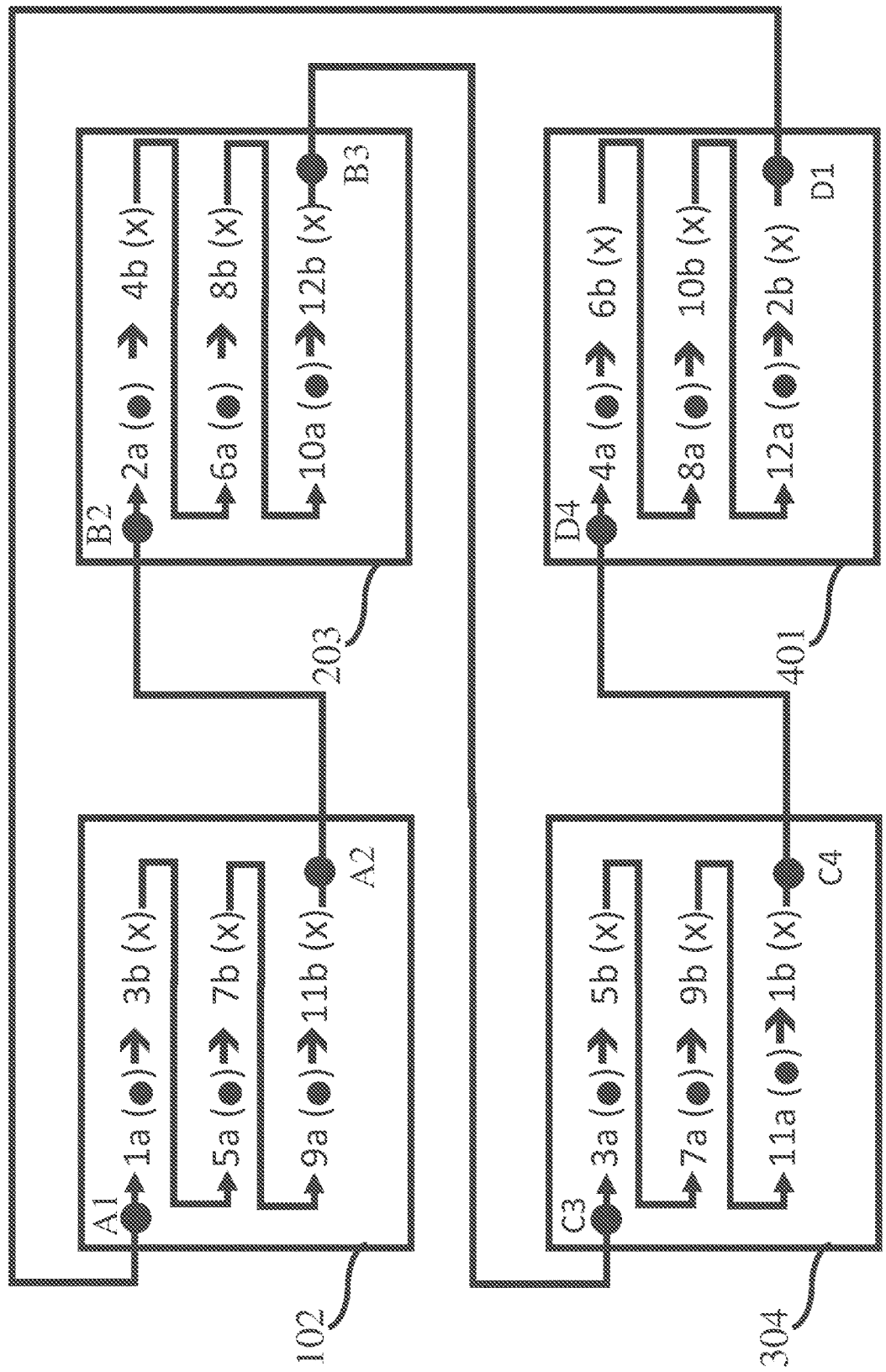
FIG. 1B is a schematic drawing illustrating the connection of the 4 steps armature coil of the brushless DC dynamo 1000 as shown in FIG. 1A.
Figure 1B:
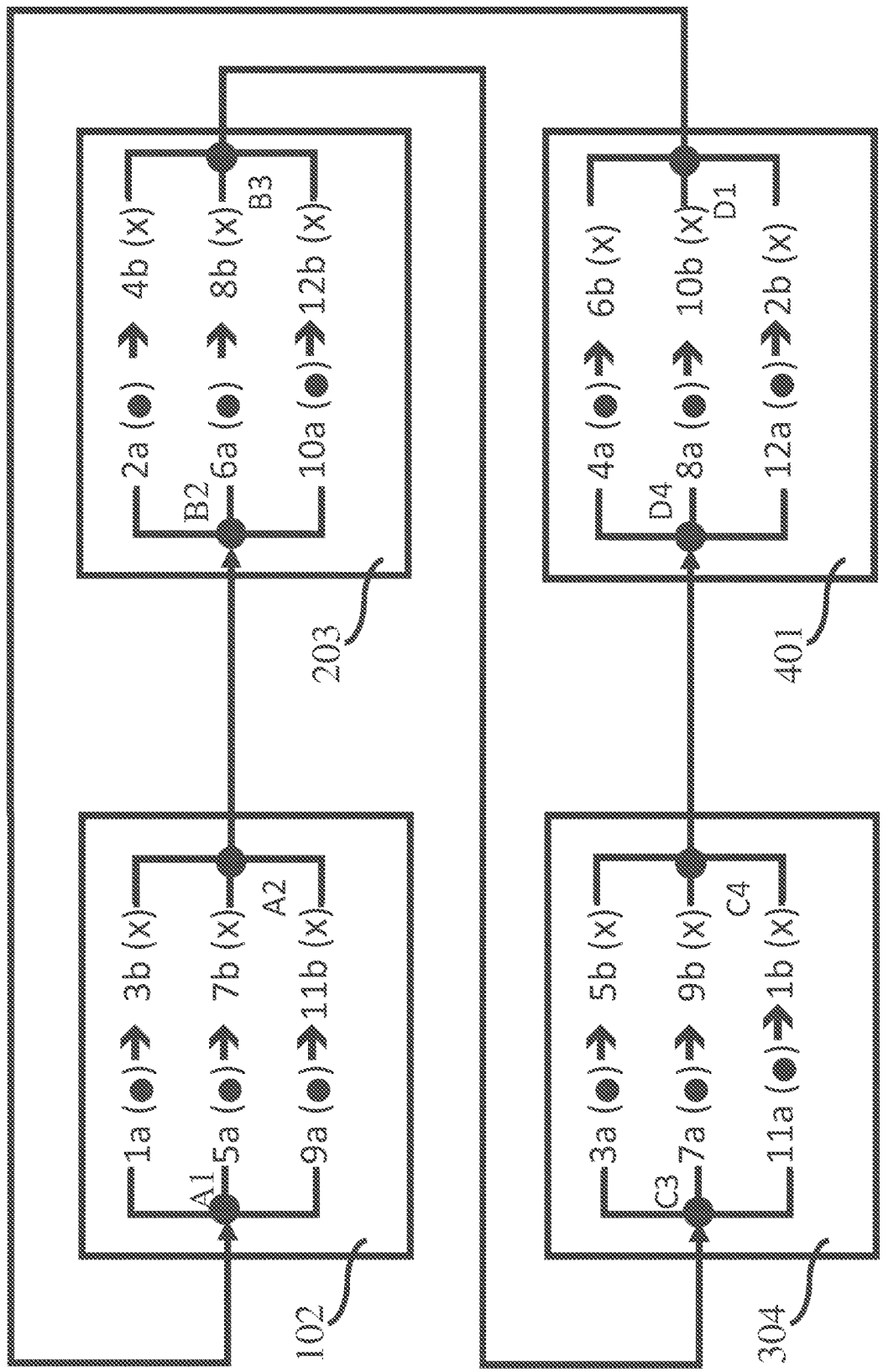

As shown in FIG. 1, an armature coil with twelve slots is taken as an example to explain this embodiment. Accordingly, it means L=12, and the circular armature unit 110 of the brushless DC dynamo 1000 comprises 12 slots of first armature conductors $1a$~$12a$ spaced with each other in sequence, and the slot of first armature conductors $1a$ is adjacent to $12^{th}$ slot of first armature conductors $12a$ and spatially joined with each other, and 12 slots of second armature conductors $1b$~$12b$ spaced with each other in sequence, adjacent to the 12 slots of first armature conductors $1a$~$12a$, and the slot of second armature conductors $1b$ is adjacent to $12^{th}$ slot of second armature conductors $12b$ and spatially joined with each other. The symbol • shown in FIG. 1A represents the winding direction of the first armature conductorss $1a$~$12a$ is out of the surface of the circular armature unit 110, and the symbol X shown in FIG. 1A represents the winding direction of the first armature conductorss $1a$~$12a$ is into the surface of the circular armature unit 110. As shown in FIG. 1A, the first armature conductors $1a$~$12a$ locate outside of the second armature conductorss $1b$~$12b$. Alternatively, according to other embodiments of this invention, the first armature conductors $1a$~$12a$ are adjacent to the second armature conductors $1b$~$12b$ for example but not limited to next to each other.

The magnetic unit 120 comprises N pairs of magnetic poles, wherein the circular armature unit 110 and the magnetic unit 120 can rotate relativity to each other under control, N is a natural number and L=M*N. According to this embodiment 1, N=3 since L=12 and M=4. Therefore, the magnetic unit 120 comprises 3 pairs of magnetic poles, and each pole is consisted of a N pole and a S pole. The magnetic unit 120 of this embodiment is a rotator, and the circular armature unit 110 is a stator, and the magnetic unit 120 can rotate relatively to the circular armature unit 110 under control. Alternatively, accordingly to other embodiments of this invention, the magnetic unit 120 of this embodiment is a stator, and the circular armature unit 110 is a rotator, and the circular armature unit 110 can rotate relatively to the magnetic unit 120 under control.

According to this embodiment, M=4, so the first armature conductors $1a$~$12a$ and the second armature conductors $1b$~$12b$ can be classified as 4 steps of armature coils interconnecting in sequence. As mentioned, $P^{th}$ step of the armature coils is formed by P1 slot of the first armature conductors satisfying with $1 \leq Q \leq N$ and P2 slot of the second armature conductors satisfying $1 \leq Q \leq N$ interconnecting in sequence, wherein P1=1+remainder of $\{[P-1+(M*(Q-1))]/L\}$, P2=1+remainder of $\{[P-1+(M*(Q-1))+S]/L\}$, P, Q, S are all natural numbers, and $1 \leq P \leq M$, $1 \leq Q \leq N$, $1 \leq P1 \leq L$, $1 \leq P2 \leq L$. When L=12, M=4, N=3, S will be equal to 2, and $1 \leq Q \leq 3$, $1 \leq P1 \leq 12$, $1 \leq P2 \leq 12$, then the $1^{th}$ step (P=1) of the armature coil 102 will be formed by the $1^{th}$ slot (P1=1) of the first armature conductors 1a, the $3^{th}$ slot (P2=3) of the second armature conductors 3b, the $5^{th}$ slot (P1=5) of the first armature conductors 5a, the $7^{th}$ slot (P2=7) of the second armature conductors 7b, the $9^{th}$ slot (P1=9) of the first armature conductors 9a, and the $11^{th}$ slot (P2=11) of the second armature conductors 11b; the $2^{th}$ step (P=2) of the armature coil 203 will be formed by the $2^{th}$ slot (P1=2) of the first armature conductors 2a, the $4^{th}$ slot (P2=4) of the second armature conductors 4b, the $6^{th}$ slot (P1=6) of the first armature conductors 6a, the $8^{th}$ slot (P2=8) of the second armature conductors 8b, the $10^{th}$ slot (P1=10) of the first armature conductors 10a, and the $12^{th}$ slot (P2=12) of the second armature conductors 12b; the $3^{th}$ step (P=3) of the armature coil 304 will be formed by the $3^{th}$ slot (P1=3) of the first armature conductors 3a, the $5^{th}$ slot (P2=5) of the second armature conductors 5b, the $7^{th}$ slot (P1=7) of the first armature conductors 7a, the $9^{th}$ slot (P2=9) of the second armature conductors 9b, the $11^{th}$ slot (P1=11) of the first armature conductors 11a, and the $1^{th}$ slot (P2=1) of the second armature conductors 1b; the $4^{th}$ step (P=4) of the armature coil 401 will be formed by the $4^{th}$ slot (P1=4) of the first armature conductors 4a, the $6^{th}$ slot (P2=6) of the second armature conductors 6b, the $8^{th}$ slot (P1=8) of the first armature conductors 8a, the $10^{th}$ slot (P2=10) of the second armature conductors 10b, the $12^{th}$ slot (P1=12) of the first armature conductors 12a, and the $2^{th}$ slot (P2=2) of the second armature conductors 2b. Each step of the armature coils can be formed by alternatively connecting the first armature conductors and the second armature conductors in sequence as shown in FIG. 1B or formed by alternatively connecting the first armature conductors and the second armature conductors in parallel as shown in FIG. 1B'.

Please refers to FIGS. 2A-2D illustrating equivalent circuit diagrams at different stages of the 4 steps armature coil of the brushless DC dynamo 1000 as shown in FIG. 1A, and FIGS. 3A-3D illustrating schematic drawing showing operation of the brushless DC dynamo 1000 at different stages corresponding to FIGS. 2A-2D.

Figure 2A:
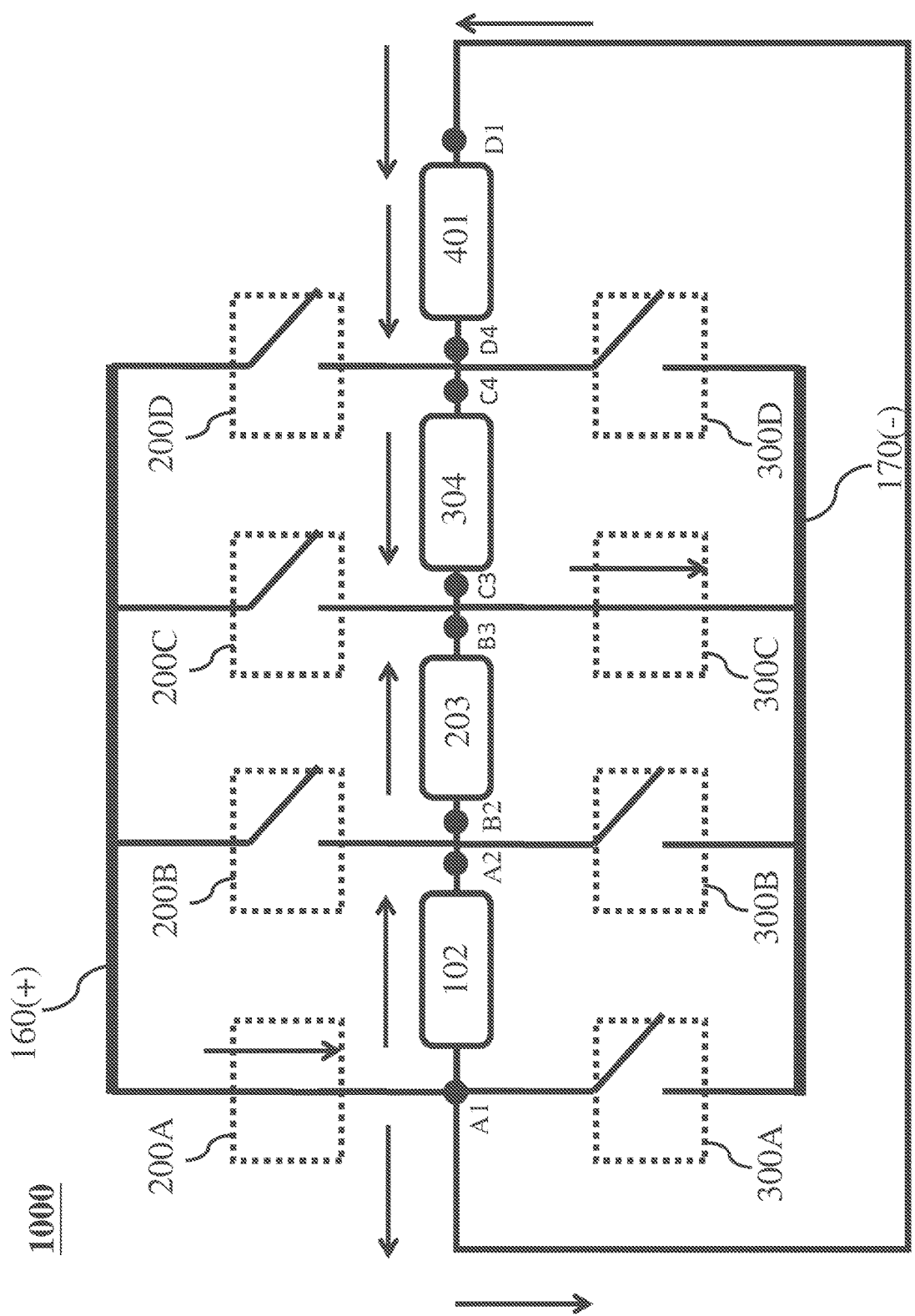
FIGS. 2A-2D are equivalent circuit diagrams at different stages of the 4 steps armature coil of the brushless DC dynamo 1000 as shown in FIG. 1A.
Figure 2B:
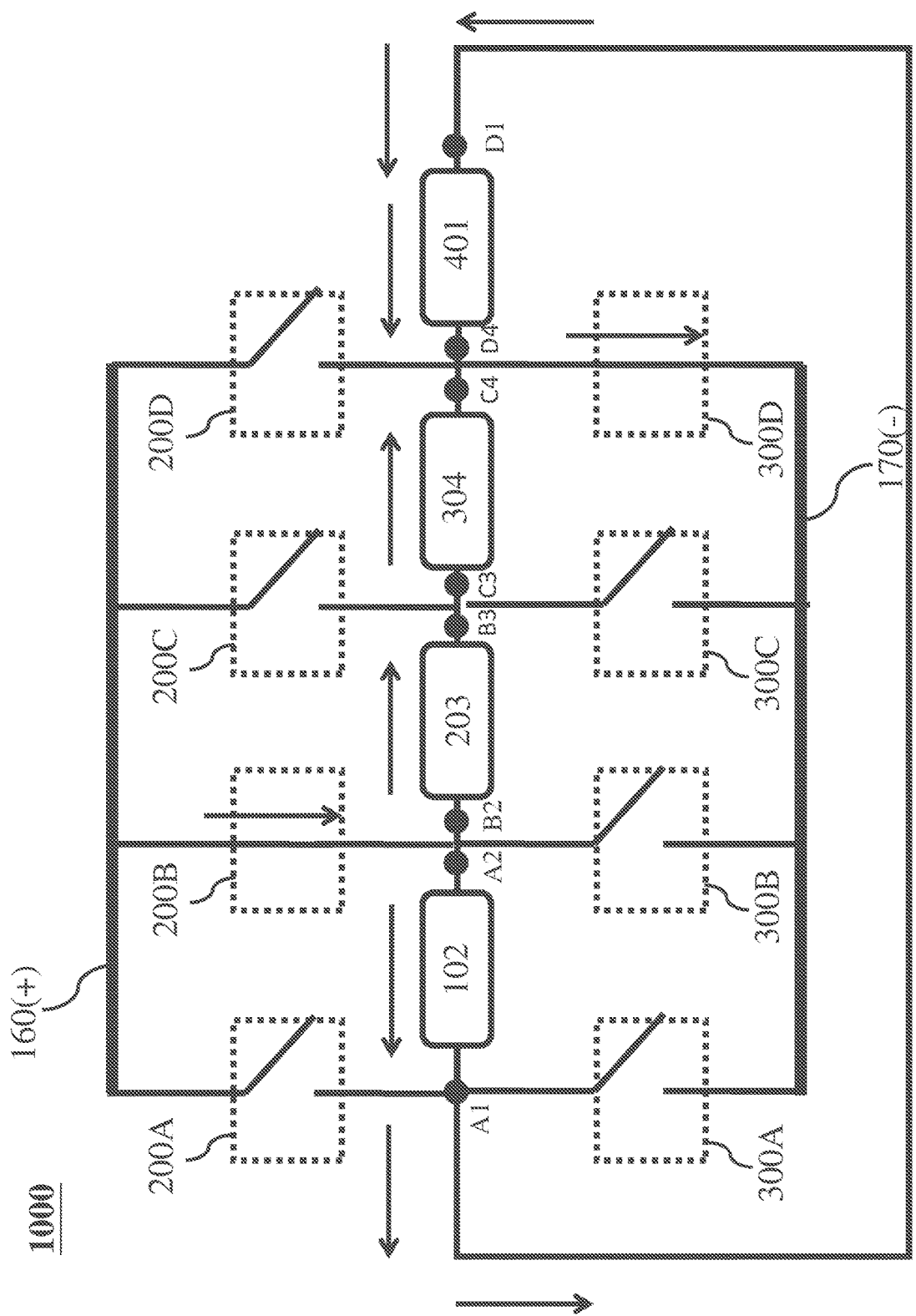
Figure 3A:
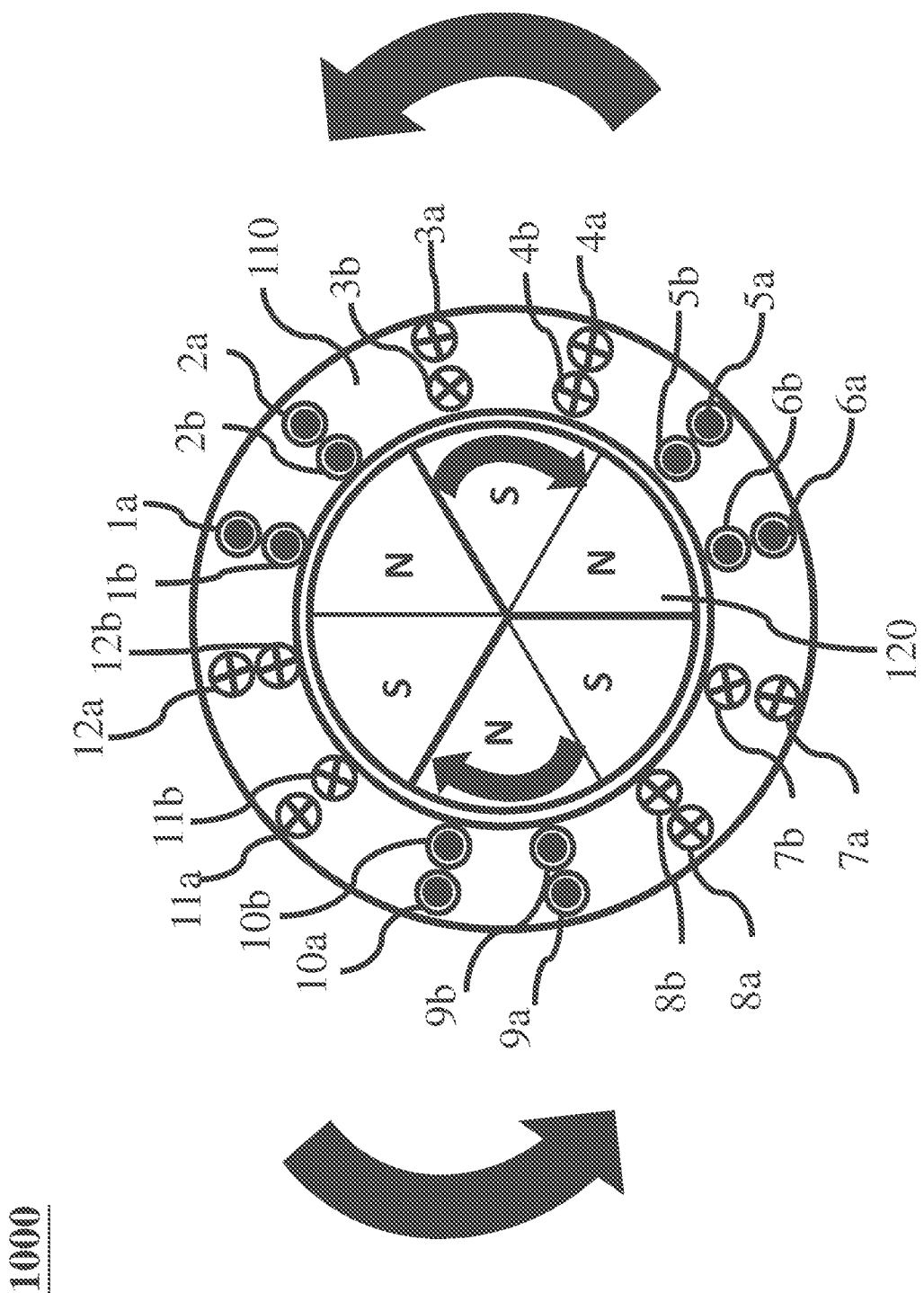
FIGS. 3A-3D illustrate schematic drawings showing operation of the brushless DC dynamo 1000 at different stages corresponding to FIGS. 2A-2D.
Figure 3B:
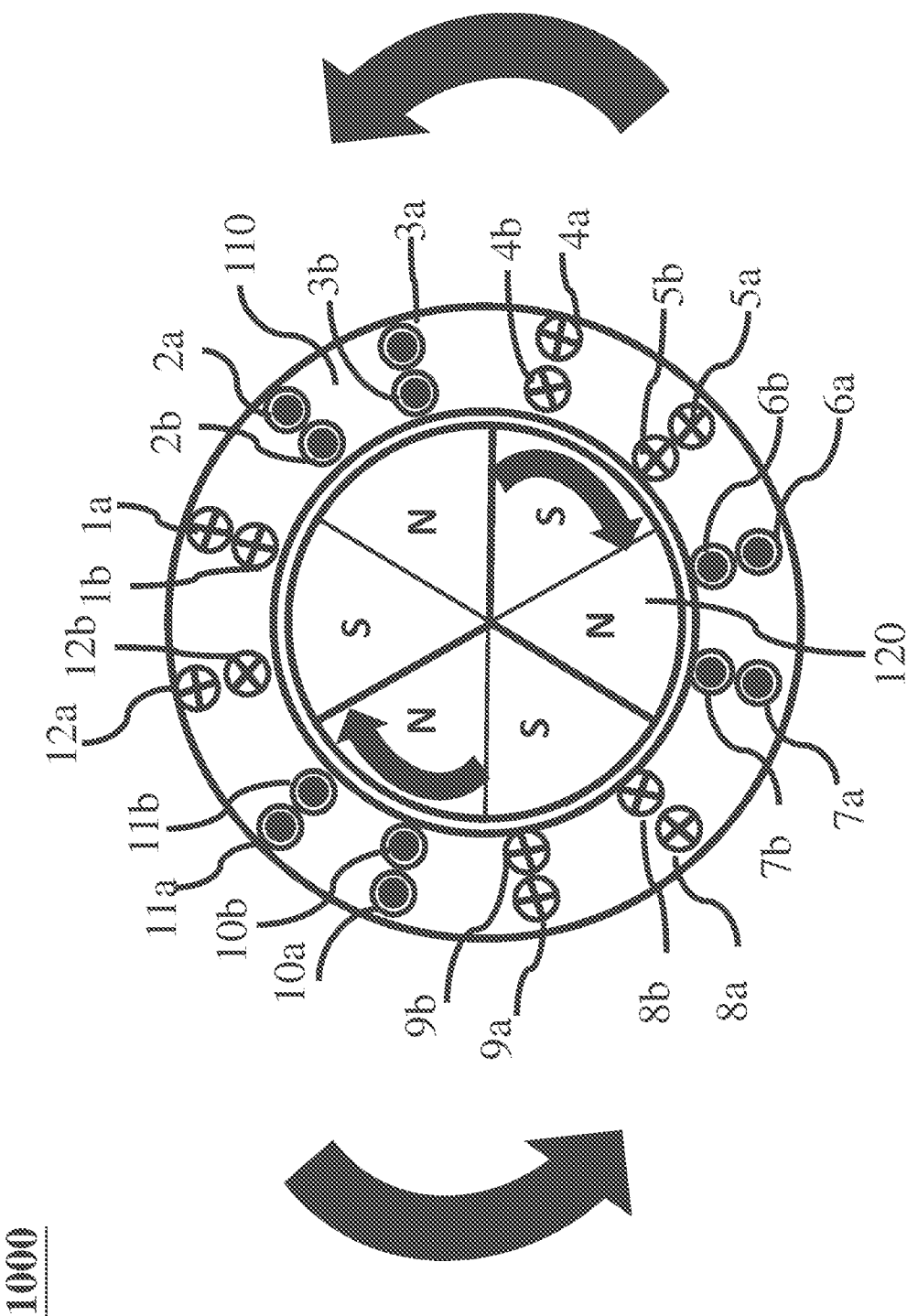

First, please refers to FIGS. 2A-2B and FIGS. 3A-3B. As shown in FIGS. 2A-2B, the polarity of the first external electrode 160 is positive, and the polarity of the second external electrode 170 is negative, and the logic unit (not shown) outputs a positive logic signal to the control unit (not shown), and the $1^{th}$ first control switch 200A is switched from short as shown in FIG. 2A to open as shown in FIG. 2B, the $3^{th}$ second control switch 300C is switched from short as shown in FIG. 2A to open as shown in FIG. 2B, the $2^{th}$ first control switch 200B is switched from open as shown in FIG. 2A to short as shown in FIG. 2B, and the $4^{th}$ second control switch 300D is switched from open as shown in FIG. 2A to short as shown in FIG. 2B, then the current will be commutated at the nodes A1 and A2 connecting $1^{th}$ step of armature coil 102 like a commutator disposed therebetween, and the current will also be commutated at the nodes C3 and C4 connecting $3^{th}$ step of armature coil 304 like a commutator disposed therebetween. As shown in FIGS. 3A-3B, because the currents within the $1^{th}$ step of armature coil 102 and the $3^{th}$ step of armature coil 304 flow backward, so the armature coils whose current flows out of the surface of the circular armature unit 110 face the N poles of the magnetic unit 120 will be changed from the first armature conductors 1a, 2a, 5a, 6a, 9a, 10a and the second armature conductors 1b, 2b, 5b, 6b, 9b, 10b to the first armature conductors 2a, 3a, 6a, 7a, 10a, 11a and the second armature conductors 2b, 3b, 6b, 7b, 10b, 11b, and the armature coils whose current flows into the surface of the circular armature unit 110 face the S poles of the magnetic unit 120 will be changed from the first armature conductors 3a, 4a, 7a, 8a, 11a, 12a and the second armature conductors 3b, 4b, 7b, 8b, 11b, 12b to the first armature conductors 4a, 5a, 8a, 9a, 12a, 1a and the second armature conductors 4b, 5b, 8b, 9b, 12b, 1b, thereby the magnetic unit 120 will clockwise rotate relatively to the circular armature unit 100. Moreover, when the brushless DC dynamo 1000 is switched from the basic operation mode as shown in FIG. 2A to the transition mode of the basic operation mode as shown in FIG. 2B, the adjacent first control switches 200A, 200B, and the adjacent second control switches 300C, 300D will be transitionally short at the same time.

Figure 2C:
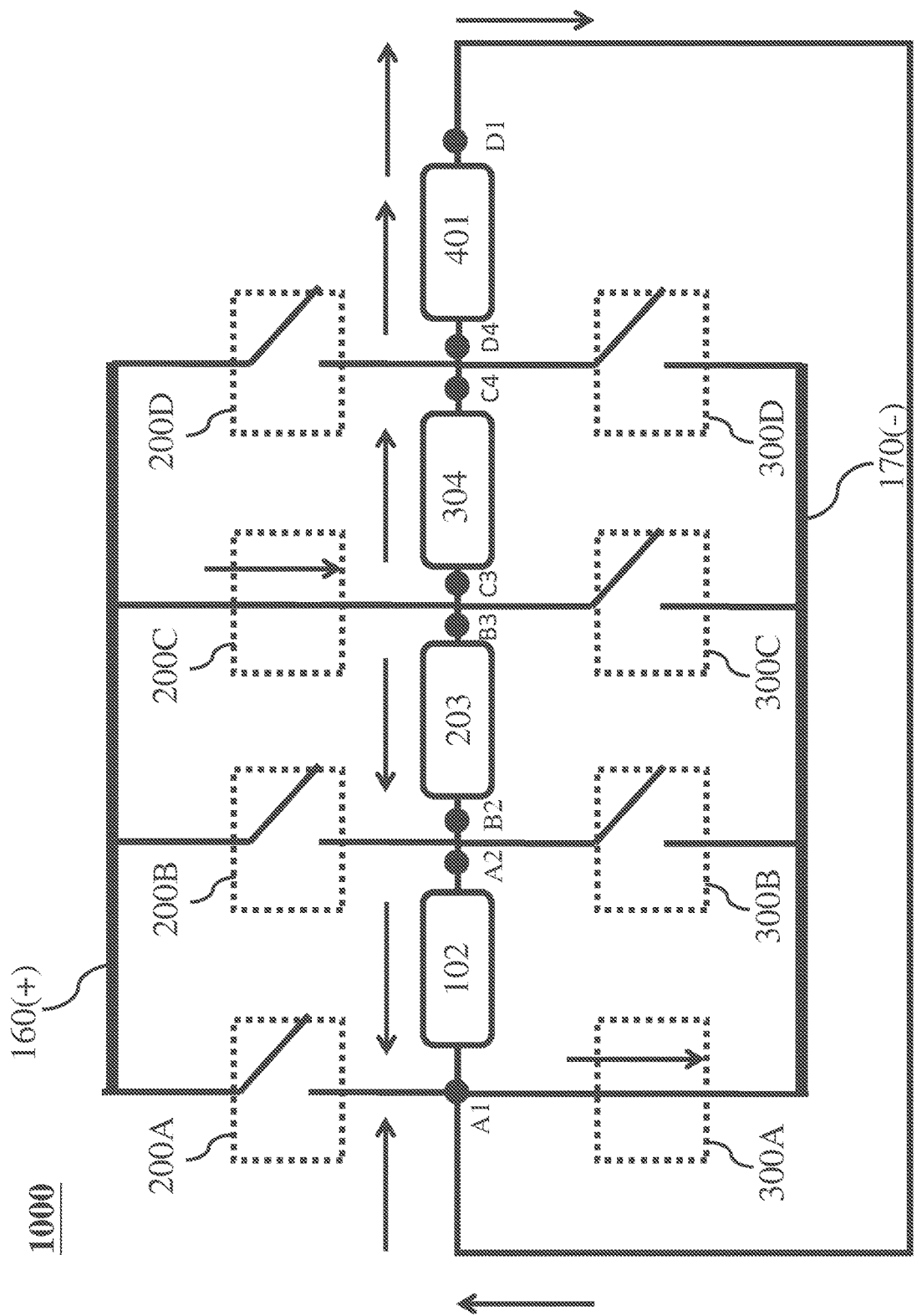
Figure 3C:
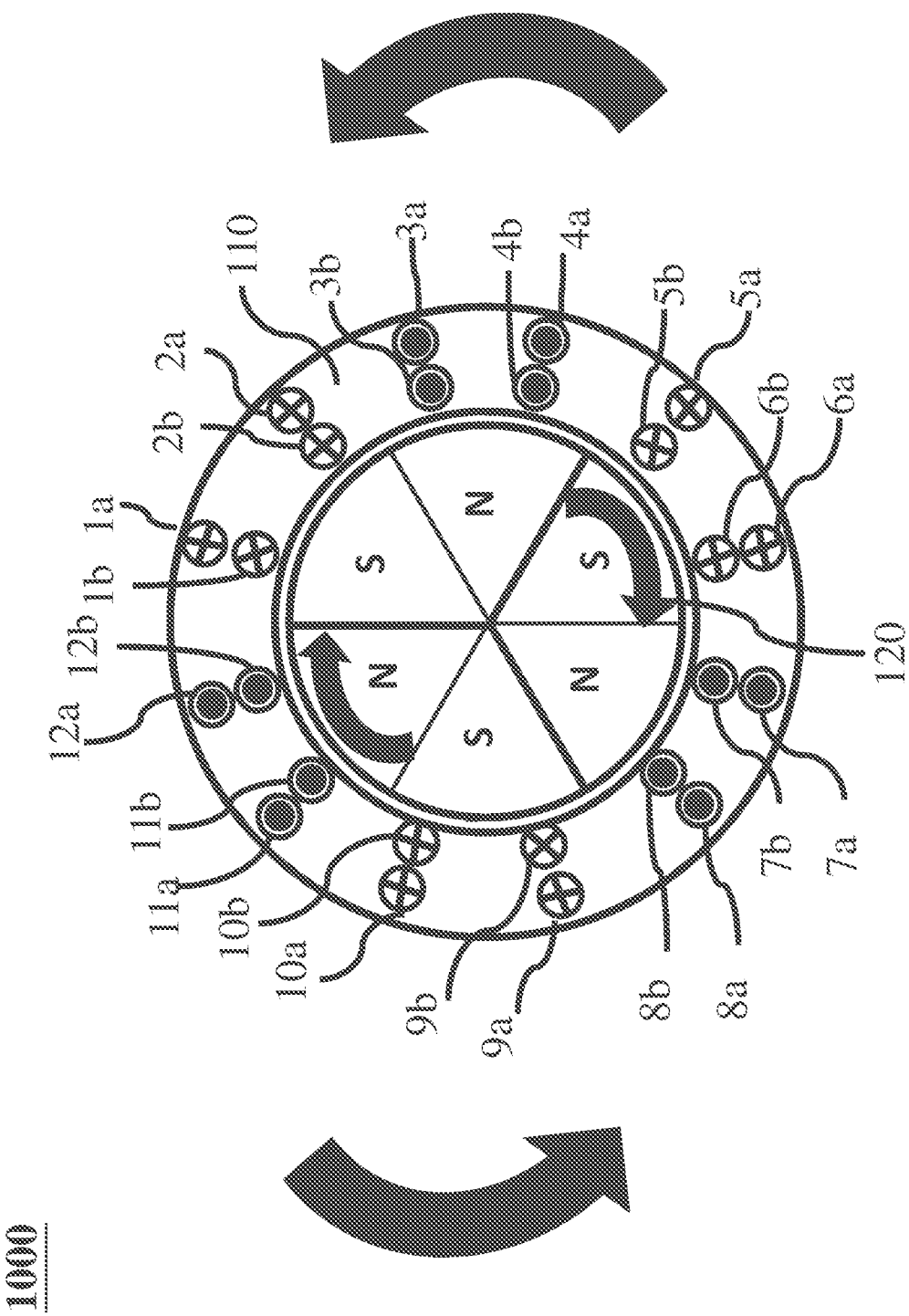

Next, please refers to FIGS. 2B-2C and FIGS. 3B-3C. As shown in FIGS. 2B-2C, the polarity of the first external electrode 160 is positive, and the polarity of the second external electrode 170 is negative, and the logic unit (not shown) outputs a positive logic signal to the control unit (not shown), and the $2^{th}$ first control switch 200B is switched from short as shown in FIG. 2B to open as shown in FIG. 2C, the $4^{th}$ second control switch 300D is switched from short as shown in FIG. 2B to open as shown in FIG. 2C, the $3^{th}$ first control switch 200C is switched from open as shown in FIG. 2B to short as shown in FIG. 2C, and the $1^{th}$ second control switch 300A is switched from open as shown in FIG. 2B to short as shown in FIG. 2C, then the current will be commutated at the nodes B2 and B3 connecting $2^{th}$ step of armature coil 203 like a commutator disposed therebetween, and the current will also be commutated at the nodes D1 and D4 connecting $4^{th}$ step of armature coil 401 like a commutator disposed therebetween. As shown in FIGS. 3B-3C, because the currents within the $2^{th}$ step of armature coil 203 and the $4^{th}$ step of armature coil 401 flow backward, so the armature coils whose current flows out of the surface of the circular armature unit 110 face the N poles of the magnetic unit 120 will be changed from the first armature conductors 2a, 3a, 6a, 7a, 10a, 11a and the second armature conductors 2b, 3b, 6b, 7b, 10b, 11b to the first armature conductors 3a, 4a, 7a, 8a, 11a, 12a and the second armature conductors 3b, 4b, 7b, 8b, 11b, 12b, and the armature coils whose current flows into the surface of the circular armature unit 110 face the S poles of the magnetic unit 120 will be changed from the first armature conductors 4a, 5a, 8a, 9a, 12a, 1a and the second armature conductors 4b, 5b, 8b, 9b, 12b, 1b to the first armature conductors 1a, 2a, 5a, 6a, 9a, 10a and the second armature conductors 1b, 2b, 5b, 6b, 9b, 10b, thereby the magnetic unit 120 will clockwise rotate relatively to the circular armature unit 100. Moreover, when the brushless DC dynamo 1000 is switched from the basic operation mode as shown in FIG. 2B to the transition mode of the basic operation mode as shown in FIG. 2C, the adjacent first control switches 200B, 200C, and the adjacent second control switches 300D, 300A will be transitionally short at the same time.

Figure 2D:
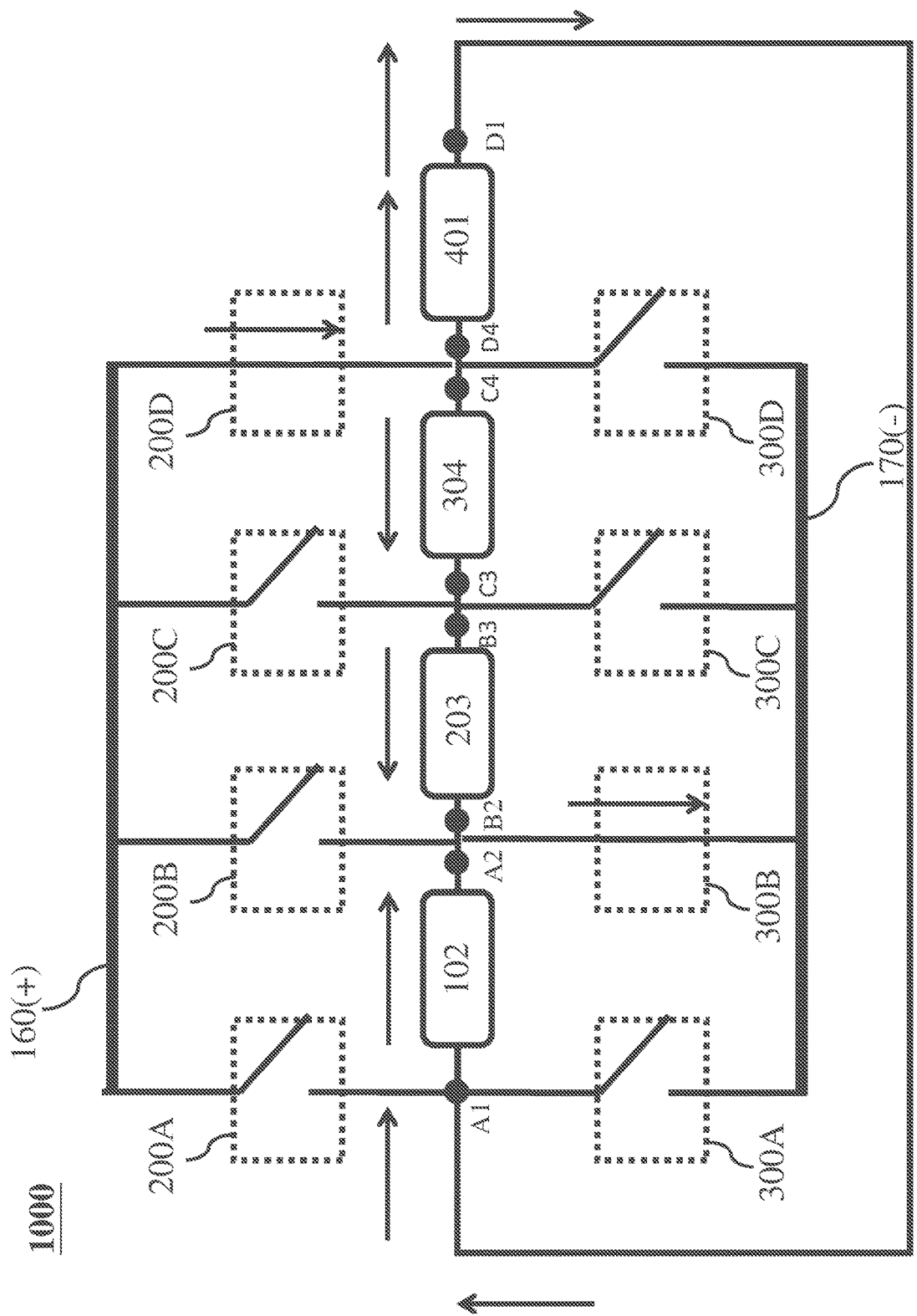
Figure 3D:
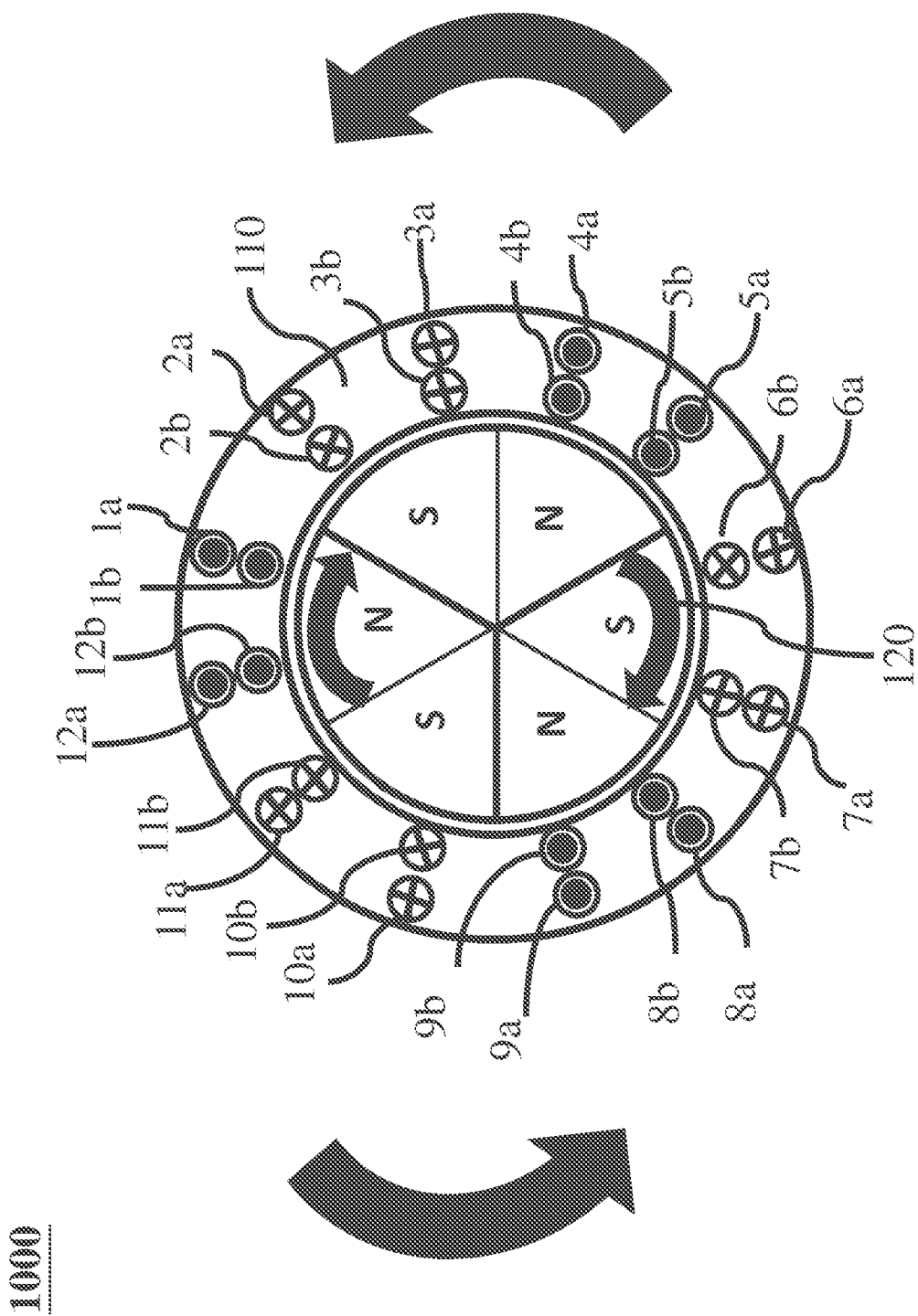

Next, please refers to FIGS. 2C-2D and FIGS. 3C-3D. As shown in FIGS. 2C-2D, the polarity of the first external electrode 160 is positive, and the polarity of the second external electrode 170 is negative, and the logic unit (not shown) outputs a positive logic signal to the control unit (not shown), and the $3^{th}$ first control switch 200C is switched from short as shown in FIG. 2C to open as shown in FIG. 2D, the second control switch 300A is switched from short as shown in FIG. 2C to open as shown in FIG. 2D, the $4^{th}$ first control switch 200D is switched from open as shown in FIG. 2C to short as shown in FIG. 2D, and the $2^{th}$ second control switch 300B is switched from open as shown in FIG. 2C to short as shown in FIG. 2D, then the current will be commutated at the nodes A1 and A2 connecting $1^{th}$ step of armature coil 102 like a commutator disposed therebetween, and the current will also be commutated at the nodes C3 and C4 connecting $3^{th}$ step of armature coil 304 like a commutator disposed therebetween. As shown in FIGS. 3C-3D, because the currents within the $1^{th}$ step of armature coil 102 and the $3^{th}$ step of armature coil 304 flow backward, so the armature coils whose current flows out of the surface of the circular armature unit 110 face the N poles of the magnetic unit 120 will be changed from the first armature conductors 3a, 4a, 7a, 8a, 11a, 12a and the second armature conductors 3b, 4b, 7b, 8b, 11b, 12b to the first armature conductors 1a, 4a, 5a, 8a, 9a, 12a and the second armature conductors 1b, 4b, 5b, 8b, 9b, 12b, and the armature coils whose current flows into the surface of the circular armature unit 110 face the S poles of the magnetic unit 120 will be changed from the first armature conductors 1a, 2a, 5a, 6a, 9a, 10a and the second armature conductors 1b, 2b, 5b, 6b, 9b, 10b to the first armature conductors 2a, 3a, 6a, 7a, 10a, 11a and the second armature conductors 2b, 3b, 6b, 7b, 10b, 11b, thereby the magnetic unit 120 will clockwise rotate relatively to the circular armature unit 100. Moreover, when the brushless DC dynamo 1000 is switched from the basic operation mode as shown in FIG. 2C to the transition mode of the basic operation mode as shown in FIG. 2D, the adjacent first control switches 200C, 200D, and the adjacent second control switches 300A, 300B will be transitionally short at the same time.

Finally, please refers to FIGS. 2D, 2A and FIGS. 3D, 3A. As shown in FIGS. 2D, 2A, the polarity of the first external electrode 160 is positive, and the polarity of the second external electrode 170 is negative, and the logic unit (not shown) outputs a positive logic signal to the control unit (not shown), and the first control switch 200A is switched from short as shown in FIG. 2D to open as shown in FIG. 2A, the $2^{th}$ second control switch 300B is switched from short as shown in FIG. 2D to open as shown in FIG. 2A, the $4^{th}$ first control switch 200D is switched from short as shown in FIG. 2D to open as shown in FIG. 2A, and the $3^{th}$ second control switch 300C is switched from open as shown in FIG. 2D to short as shown in FIG. 2A, then the current will be commutated at the nodes A1 and A2 connecting $2^{th}$ step of armature coil 203 like a commutator disposed therebetween, and the current will also be commutated at the nodes C3 and C4 connecting $3^{th}$ step of armature coil 304 like a commutator disposed therebetween. As shown in FIGS. 3D and 3A, because the currents within the $2^{th}$ step of armature coil 203 and the $4^{th}$ step of armature coil 401 flow backward, so the armature coils whose current flows out of the surface of the circular armature unit 110 face the N poles of the magnetic unit 120 will be changed from the first armature conductors 1a, 4a, 5a, 8a, 9a, 12a and the second armature conductors 1b, 4b, 5b, 8b, 9b, 12b to the first armature conductors 1a, 2a, 5a, 6a, 9a, 10a and the second armature conductors 1b, 2b, 5b, 6b, 9b, 10b, and the armature coils whose current flows into the surface of the circular armature unit 110 face the S poles of the magnetic unit 120 will be changed from the first armature conductors 2a, 3a, 6a, 7a, 10a, 11a and the second armature conductors 2b, 3b, 6b, 76b, 10b, 11b to the first armature conductors 3a, 4a, 7a, 8a, 11a, 12a and the second armature conductors 3b, 4b, 7b, 8b, 11b, 12b, thereby the magnetic unit 120 will clockwise rotate relatively to the circular armature unit 100. Moreover, when the brushless DC dynamo 1000 is switched from the basic operation mode as shown in FIG. 2D to the transition mode of the basic operation mode as shown in FIG. 2A, the adjacent first control switches 200D, 200A, and the adjacent second control switches 300B, 300C will be transitionally short at the same time.

According to the brushless DC dynamo 1000 of this embodiment 1, the magnetic unit 120 will counterclockwise rotate relatively to circular armature unit 110 when the polarity of the first external electrode 160 is positive and the polarity of the second external electrode 170 is negative, and the logic unit (not shown) outputs a negative logic signal to the control unit (not shown).

According to the brushless DC dynamo 1000 of this embodiment 1, the magnetic unit 120 will counterclockwise rotate relatively to circular armature unit 110 when the polarity of the first external electrode 160 is negative and the polarity of the second external electrode 170 is positive, and the logic unit (not shown) outputs a positive logic signal to the control unit (not shown).

According to the brushless DC dynamo 1000 of this embodiment 1, the magnetic unit 120 will clockwise rotate relatively to circular armature unit 110 when the polarity of the first external electrode 160 is negative and the polarity of the second external electrode 170 is positive, and the logic unit (not shown) outputs a negative logic signal to the control unit (not shown).

Moreover, the driving direction or output direction of the brushless DC dynamo 1000 will be reversed when the polarities of the first external electrode 160 and the second external electrode 170 are not changed, and the polarity outputted by the logic unit (not shown) is changed to reverse the operations of all first control switches 200A~200D and all second control switches 300A~300D of the same step. Specially, the driving direction or output direction of the brushless DC dynamo 1000 will be quickly reversed to provide a function of bi-polar pulse with modulation (PWM) when the polarities of the first external electrode 160 and the second external electrode 170 are not changed, and the polarity of signals i outputted by the logic unit (not shown) s quickly changed to reverse the operations of all first control switches 200A~200D and all second control switches 300A~300D of the same step. In addition, the function of unipolar pulse with modulation (PWM) mentioned above can be achieved by quickly enabling or disenabling signals outputted by the logic unit (not shown) without changing polarities thereof to simultaneously enable or disenable the operations of all first control switches 200A-200D and all second control switches 300A~300D of the same step.

Furthermore, the above-mentioned brushless DC dynamo 1000 according to Embodiment 1 of this invention can be equipped with a vehicle, and the rotation direction of the driving axis of the vehicle can be changed by controlling the magnetic unit 120 to clockwise or counterclockwise rotate relatively to the circular armature unit 110 of the above-mentioned brushless DC dynamo 1000 controlled by the polarities of the first external electrode 160, the second external electrode 170 and the logic signals output by the logic unit.

Exemplary Embodiment 2

This Exemplary Embodiment 2 according to this present invention is to provide another brushless DC dynamo, comprising: a circular armature unit, comprising: L slots of first armature conductors spaced with each other in sequence, and $1^{th}$ slot of the first armature conductors is adjacent to $L^{th}$ slot of the first armature conductors and spatially joined with each other, L is a natural number; and L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number; a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and S≥2, and each pair of the magnetic poles faces M' slots of the circular armature unit, M' is a natural number and M'=2S, L=M'*N; a pair of external electrodes comprising a first external electrode with a first polarity and a second external electrode with a second polarity, wherein the first polarity and the second polarity are opposite to each other; a control unit comprising M' first control switches and M' second control switches; and a logic unit electrically connected to the control unit, wherein logic signals for controlling short or open of the first control switches and the second control switches are outputted by the logic unit by sensing positions of the magnetic unit; wherein, the first armature conductors and the second armature conductors are classified as M' steps of armature coils interconnecting in sequence, and $P^{th}$ step of the armature coils is formed by P1 slot of the first armature conductors satisfying with 1≤Q≤N and P2 slot of the second armature conductors satisfying 1≤Q≤N interconnecting in sequence, wherein P1=1+remainder of {[P−1+(M'*(Q−1)+S)]/L}, P2=1+remainder of {[P−1+(M'*(Q−1))]/L}, P, Q, P1, P2 are all natural numbers, and M'≥4, 1≤P≤M', 1≤Q≤N, 1≤P1≤L, 1≤P2≤L, and the armature coils are classified as S classes, wherein $t^{th}$ class of the armature coils is formed by $t^{th}$ step of the armature coils and $(t+S)^{th}$ step of the armature coils reversely connected in sequence or in parallel, t is a natural number and t≤S; wherein, a $(2t-1)^{th}$ node and a $(2t)^{th}$ node are on two terminals of the $t^{th}$ class of the armature coils formed by $t^{th}$ step of the armature coils and $(t+S)^{th}$ step of the armature coils reversely connected in sequence or in parallel, and a $t^{th}$ first control switch is interconnected with the first external electrode with a first polarity at the $(2t-1)^{th}$ node, and a $(t+S)^{th}$ second control switch is interconnected with the second external electrode with a second polarity at the $(2t)^{th}$ node; wherein, there are at most half of the first control switches short and at most half of the second control switches short at the same operation time, and the $t^{th}$ first control switch and the $t^{th}$ second control switch are not short at the same time, and the $(t+S)^{th}$ first control switch and the $(t+S)^{th}$ second control switch are not short at the same time.

The brushless DC dynamo of the Embodiment 2 as mentioned above, wherein the first control switch and the second control switch are power device switches for example but not limited to SiC switches, GaN switches, bipolar junction transistor (BJT) switches, insulated gate bipolar transistor (IGBT) switches or metal-oxide-semiconductor field-effect transistor (MOSFET) switches.

The brushless DC dynamo of the Embodiment 2 as mentioned above, wherein the magnetic unit is a permanent magnet or a electromagnet.

The brushless DC dynamo of the Embodiment 2 as mentioned above, wherein the logic element is for example but not limited to a resolver, a encoder, a Hall sensor, a photointerrupter or a photoelectric sensor.

The brushless DC dynamo of the Embodiment 2 as mentioned above, wherein the first armature coils and the second armature coils are manufactured by wave winding, lap winding or frog-leg winding.

The brushless DC dynamo of the Embodiment 2 as mentioned above, wherein the circular armature unit is a circular stator and the magnetic unit is a magnetic rotor, or alternatively the circular armature unit is a circular rotor and the magnetic is a magnetic stator.

Figure 4A:
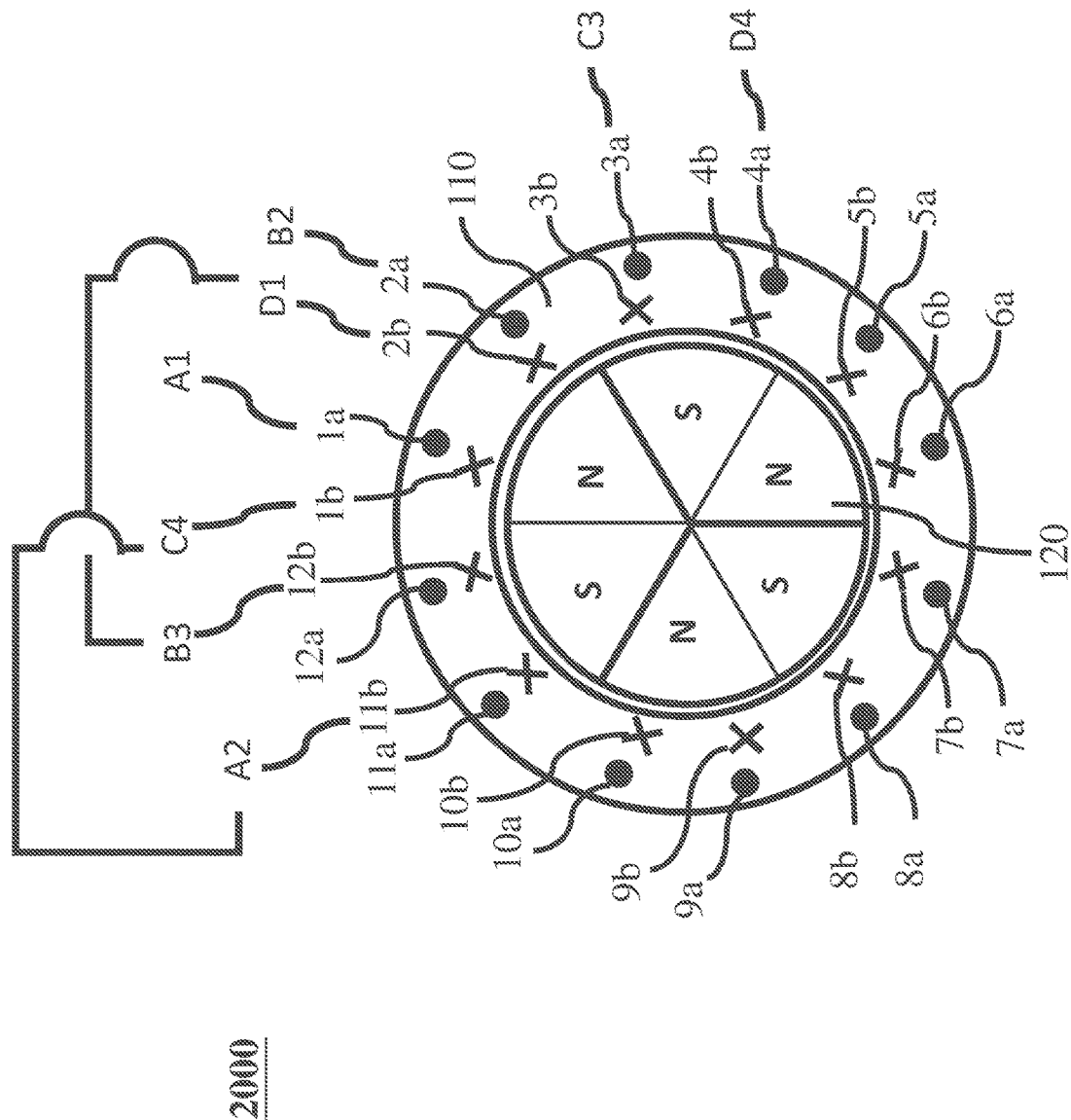
FIG. 4A is a schematic drawing illustrating a brushless DC dynamo 2000 of the embodiment 2 according to this present invention.
Figure 4A:
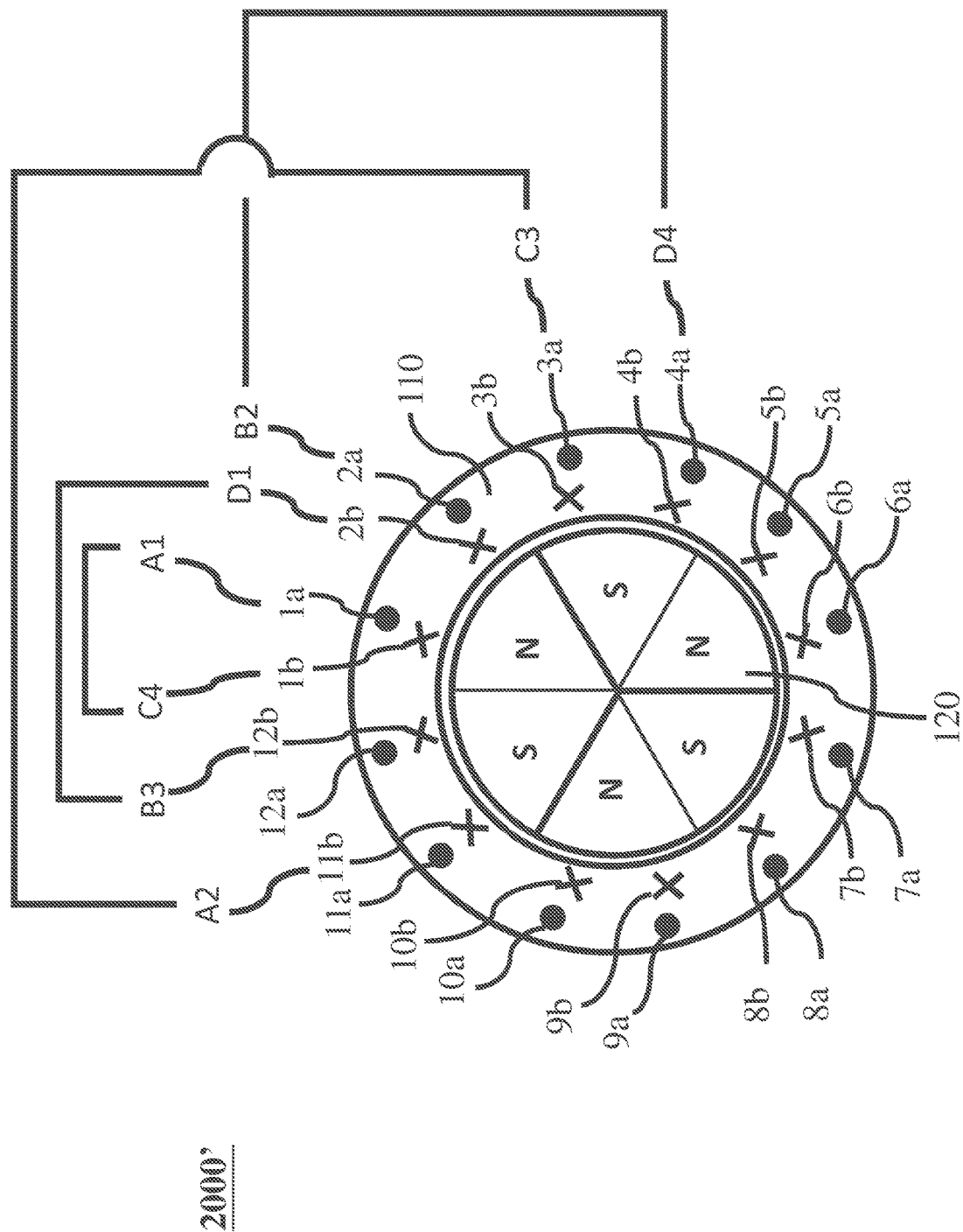

Please refer to FIG. 4A. FIG. 4A is a schematic drawing illustrating a brushless DC dynamo 1000 of the Embodiment 2 according to this present invention. As shown in FIG. 4A, the brushless DC dynamo 2000 comprises a circular armature unit 110 and a magnetic unit 120 consisted of a permanent magnet or an electromagnet disposed inside of the circular armature unit 110.

As shown in FIG. 4A, an armature coil with twelve slots is taken as an example to explain this embodiment. Accordingly, it means L=12, and the circular armature unit 110 of the brushless DC dynamo 1000 comprises 12 slots of first armature conductors 1a~12a spaced with each other in sequence, and the slot of first armature conductors 1a is adjacent to $12^{th}$ slot of first armature conductors 12a and spatially joined with each other, and 12 slots of second armature conductors 1b~12b spaced with each other in sequence, adjacent to the 12 slots of first armature conductors 1a~12a, and the slot of second armature conductors 1b is adjacent to $12^{th}$ slot of second armature conductors 12b and spatially joined with each other. The symbol • shown in FIG. 1A represents the winding direction of the first armature conductorss 1a~12a is out of the surface of the circular armature unit 110, and the symbol X shown in FIG. 1A represents the winding direction of the first armature conductorss 1a~12a is into the surface of the circular armature unit 110. As shown in FIG. 1A, the first armature conductors 1a~12a locate outside of the second armature conductorss 1b~12b. Alternatively, according to other embodiments of this invention, the first armature conductors 1a~12a are adjacent to the second armature conductors 1b~12b for example but not limited to next to each other.

The magnetic unit 120 comprises N pairs of magnetic poles, wherein the circular armature unit 110 and the magnetic unit 120 can rotate relatively to each other under control, N is a natural number and L=M' *N. According to this embodiment 1, N=3 since L=12 and M'=4. Therefore, the magnetic unit 120 comprises 3 pairs of magnetic poles, and each pole is consisted of a N pole and a S pole. The magnetic unit 120 of this embodiment is a rotator, and the circular armature unit 110 is a stator, and the magnetic unit 120 can rotate relatively to the circular armature unit 110 under control. Alternatively, accordingly to other embodiments of this invention, the magnetic unit 120 of this embodiment is a stator, and the circular armature unit 110 is a rotator, and the circular armature unit 110 can rotate relatively to the magnetic unit 120 under control.

Figure 4B:
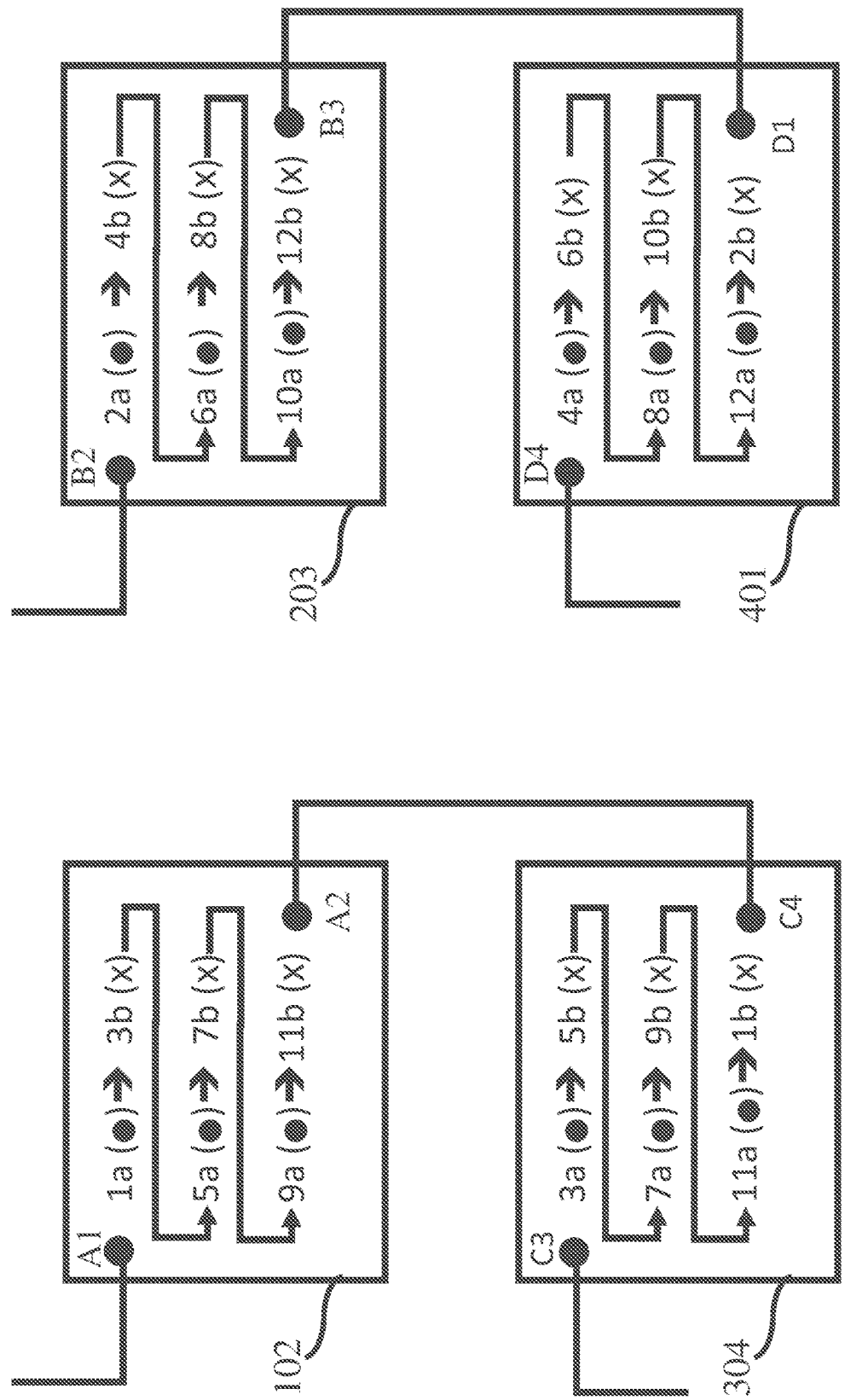
FIG. 4B is a schematic drawing illustrating the connection of the 4 steps armature coil of the brushless DC dynamo 2000 as shown in FIG. 4A.
Figure 4B:
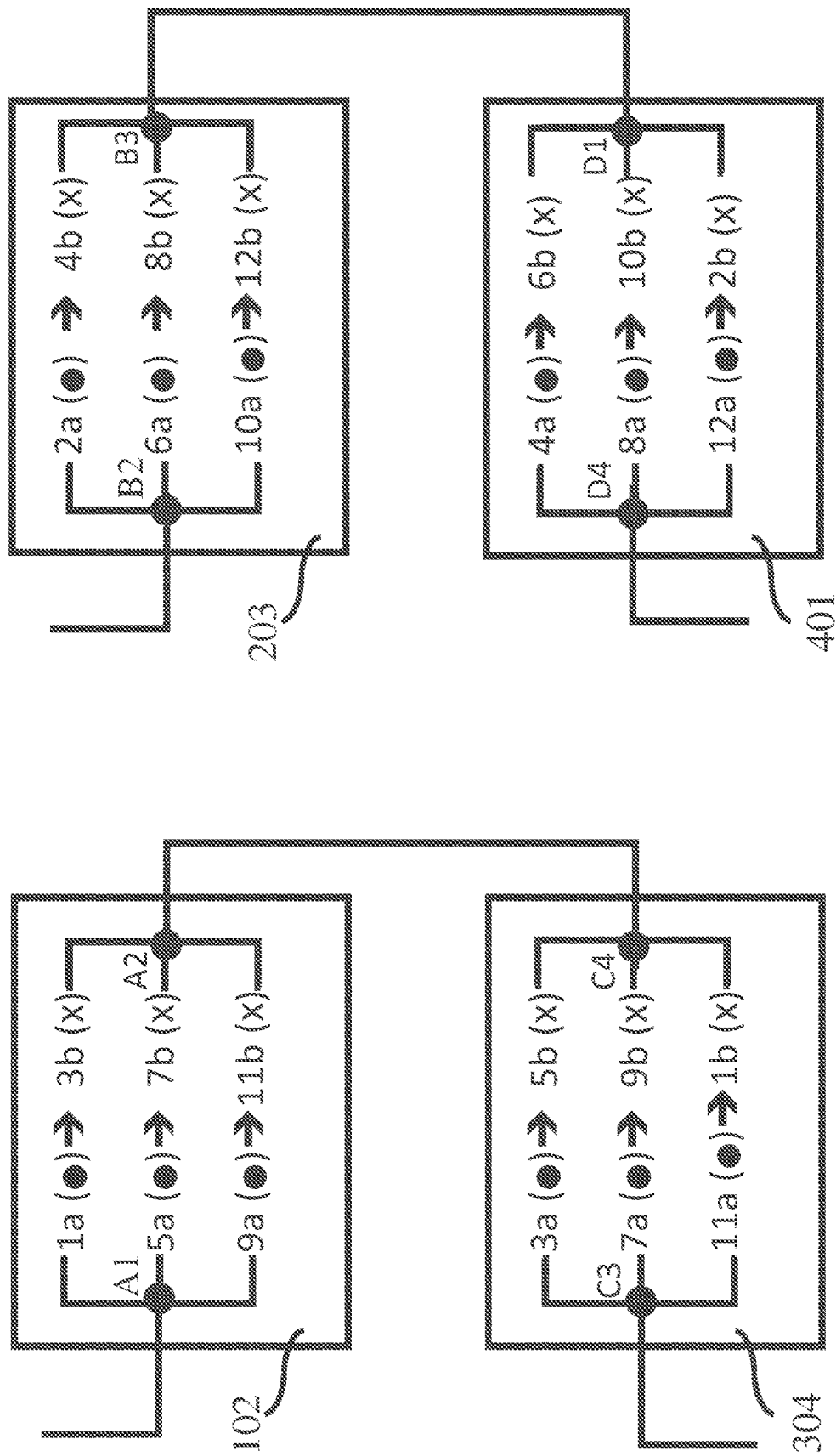
Figure 4B:
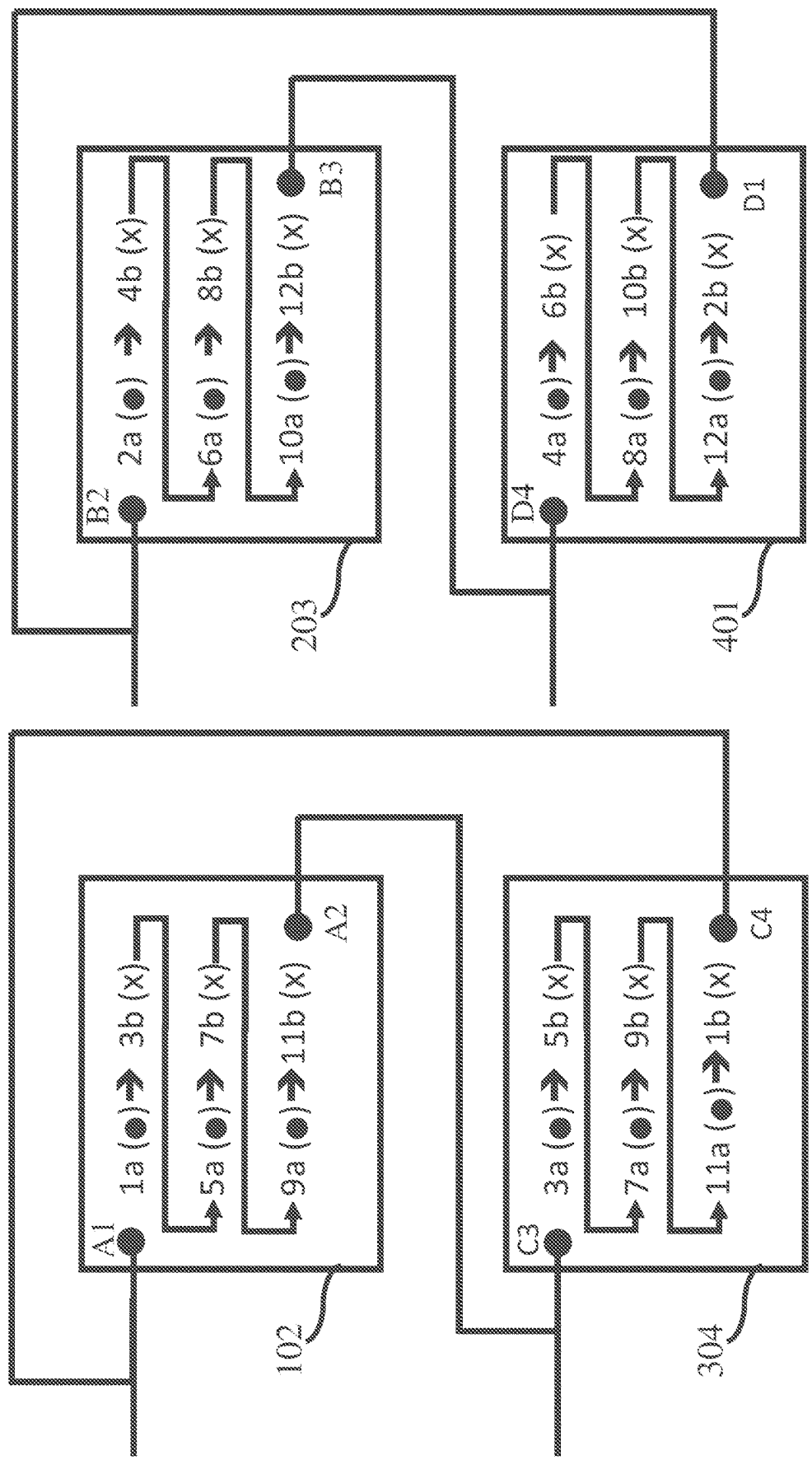
Figure 4B:
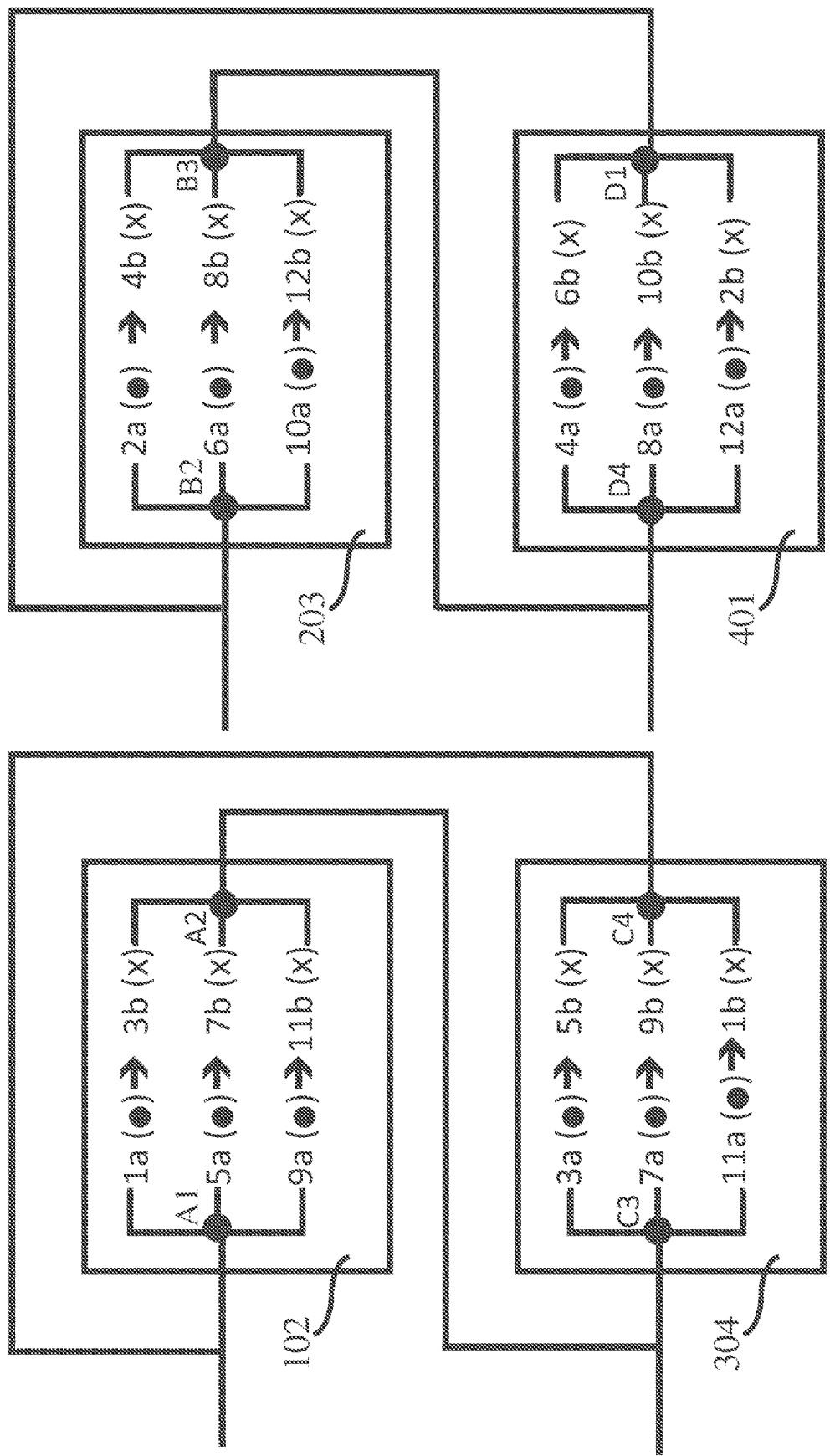

According to this embodiment, M'=4, so the first armature conductors 1a~12a and the second armature conductors 1b~12b can be classified as 4 steps of armature coils interconnecting in sequence. As mentioned, $P^{th}$ step of the armature coils is formed by P1 slot of the first armature conductors and P2 slot of the second armature conductors interconnecting in sequence or in parallel, wherein P1=1+remainder of {[P−1+(M' *(Q−1))]/L}, P2=1+remainder of {[P−1+(M'*(Q−1))+S]/L}, P, Q, P1 P2 are all natural numbers, and M'≥4, 1≤Q≤N, 1≤P2≤L. When L=12, M'=4, and N=3, S will be equal to 2, 1≤P≤4, 1≤Q≤3, ≤P1≤12, and 1≤P2≤12, thereby the $1^{th}$ step (P=1) of the armature coil 102 will be formed by the $1^{th}$ slot (P1=1) of the first armature conductors 1a, the $3^{th}$ slot (P2=3) of the second armature conductors 3b, the $5^{th}$ slot (P1=5) of the first armature conductors 5a, the $7^{th}$ slot (P2=7) of the second armature conductors 7b, the 9$^{th}$ slot (P1=9) of the first armature conductors 9a, and the 11$^{th}$ slot (P2=11) of the second armature conductors 11b; the 2$^{th}$ step (P=2) of the armature coil 203 will be formed by the 2$^{th}$ slot (P1=2) of the first armature conductors 2a, the 4$^{th}$ slot (P2=4) of the second armature conductors 4b, the 6$^{th}$ slot (P1=6) of the first armature conductors 6a, the 8$^{th}$ slot (P2=8) of the second armature conductors 8b, the 10$^{th}$ slot (P1=10) of the first armature conductors 10a, and the 12$^{th}$ slot (P2=12) of the second armature conductors 12b; the 3$^{th}$ step (P=3) of the armature coil 304 will be formed by the 3$^{th}$ slot (P1=3) of the first armature conductors 3a, the 5$^{th}$ slot (P2=5) of the second armature conductors 5b, the 7$^{th}$ slot (P1=7) of the first armature conductors 7a, the 9$^{th}$ slot (P2=9) of the second armature conductors 9b, the 11$^{th}$ slot (P1=11) of the first armature conductors 11a, and the 1$^{th}$ slot (P2=1) of the second armature conductors 1b; the 4$^{th}$ step (P=4) of the armature coil 401 will be formed by the 4$^{th}$ slot (P1=4) of the first armature conductors 4a, the 6$^{th}$ slot (P2=6) of the second armature conductors 6b, the 8$^{th}$ slot (P1=8) of the first armature conductors 8a, the 10$^{th}$ slot (P2=10) of the second armature conductors 10b, the 12$^{th}$ slot (P1=12) of the first armature conductors 12a, and the 2$^{th}$ slot (P2=2) of the second armature conductors 2b. Each step of the armature coils can be formed by alternatively connecting the first armature conductors and the second armature conductors in sequence as shown in FIG. 4B or formed by alternatively connecting the first armature conductors and the second armature conductors in parallel as shown in FIG. 4B'.

As mentioned above, M' steps of the armature coils of this Embodiment 2 are classified into S classes, and the t$^{th}$ class of the armature coils is formed by reversely interconnecting the t$^{th}$ step of the armature coils and (t+S)$^{th}$ of the armature coils in sequence or in parallel, wherein t is a natural number and t≤S. S of this present Embodiment 2 equals to 2, it means 1≤t≤2. Therefore, when M'=4, 4 steps of the armature coils of this Embodiment 2 are classified into 2 classes, wherein the first class of the armature coils is formed by reversely interconnecting the 1$^{th}$ step of the armature coils and the 3$^{th}$ step of the armature coils in sequence, and the second class of the armature coils is formed by reversely interconnecting the 2$^{th}$ step of the armature coils and the 4$^{th}$ step of the armature coils in sequence. Alternatively, accordingly to other embodiments of this invention, the first class of the armature coils can also be formed by reversely interconnecting the 1$^{th}$ step of the armature coils and the 3$^{th}$ step of the armature coils reversely interconnected in parallel, and the second class of the armature coils can also be formed by reversely interconnecting the 2$^{th}$ step of the armature coils and the 4$^{th}$ step of the armature coils in parallel.

Please refers to FIGS. 5A~5D illustrating equivalent circuit diagrams at different stages of the 4 steps armature coil of the brushless DC dynamo 2000 as shown in FIG. 4A, and FIGS. 6A~6D illustrating schematic drawing showing operation of the brushless DC dynamo 1000 at different stages corresponding to FIGS. 5A-5D.

Figure 5A:
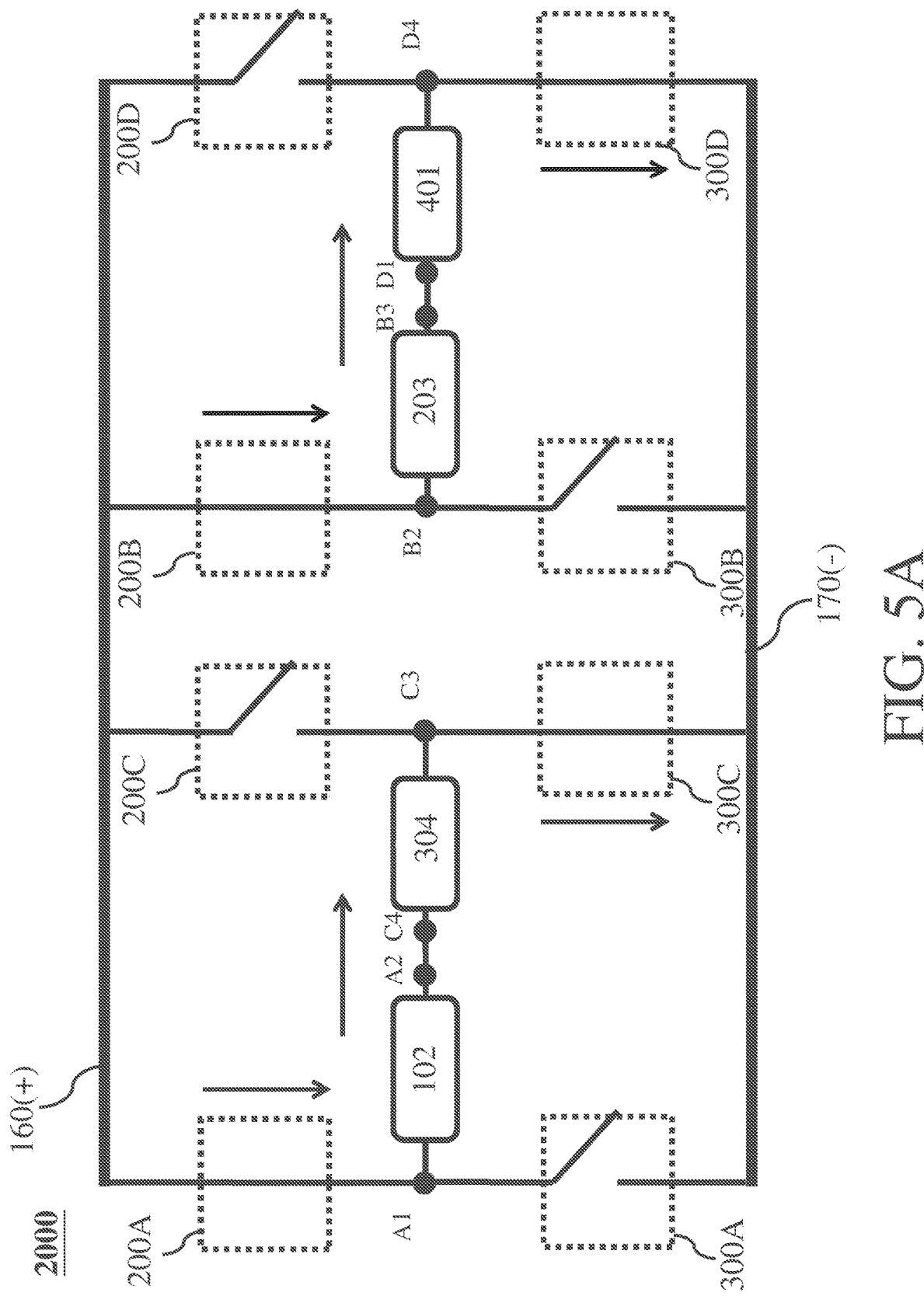
FIGS. 5A~5D are equivalent circuit diagrams at different stages of the 4 steps armature coil of the brushless DC dynamo 2000 as shown in FIG. 4A.
Figure 5B:
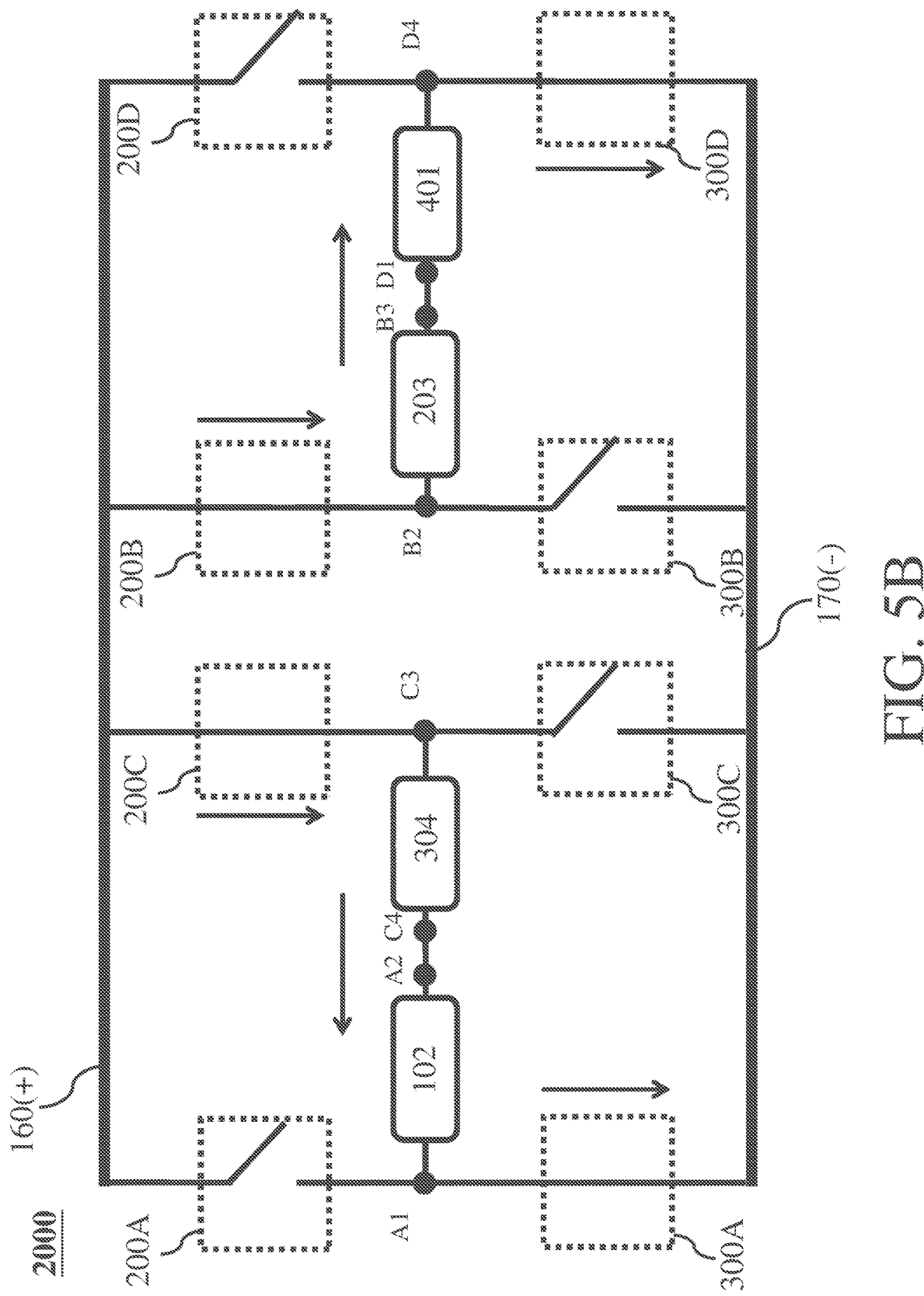
Figure 6A:
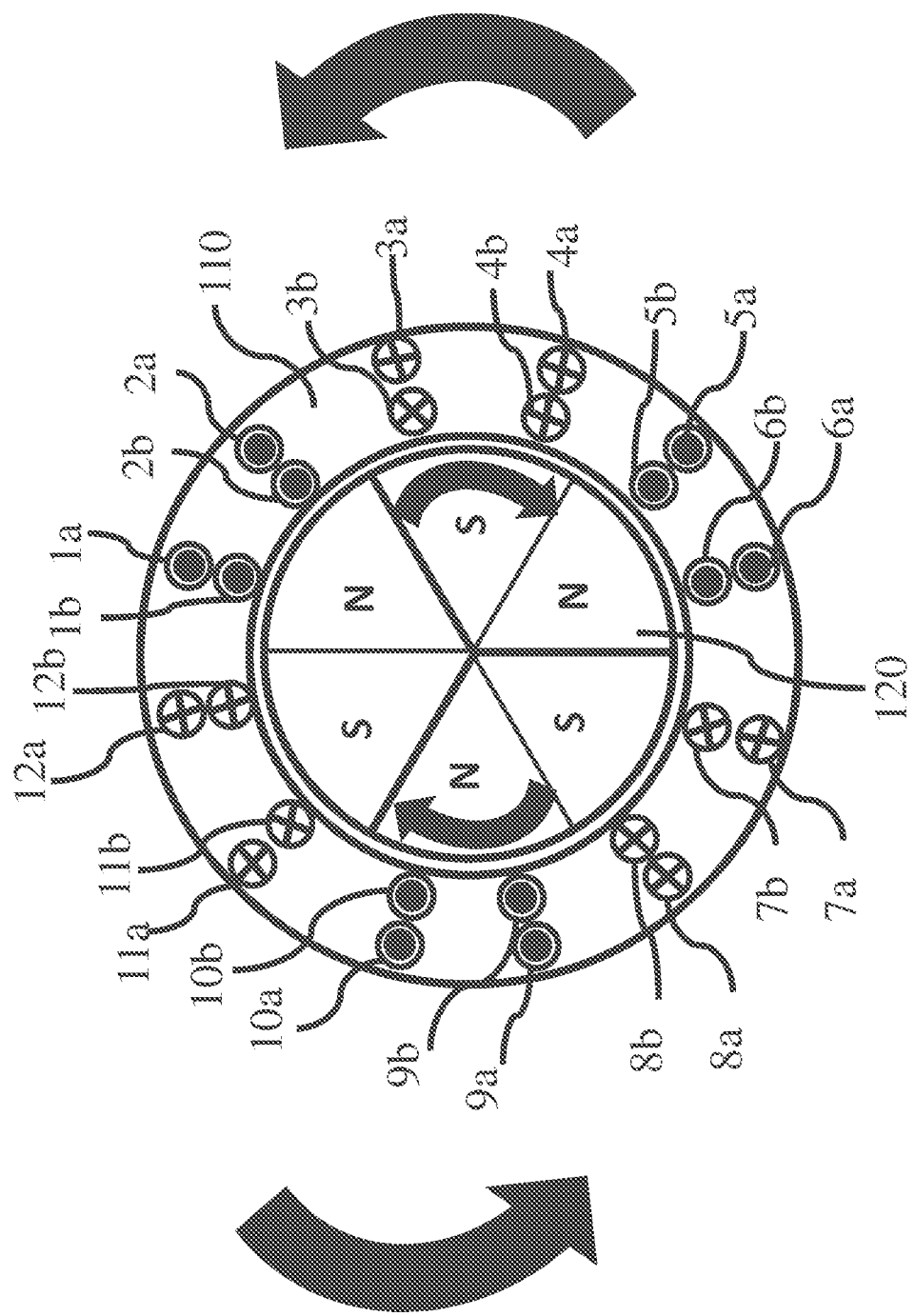
FIGS. 6A~6D are schematic drawing showing the operation of the brushless DC dynamo 2000 at different stages corresponding to FIGS. 5A-5D and the operation of the brushless DC dynamo 2000' at different stages corresponding to FIGS. 5A'~5D'.
Figure 6B:
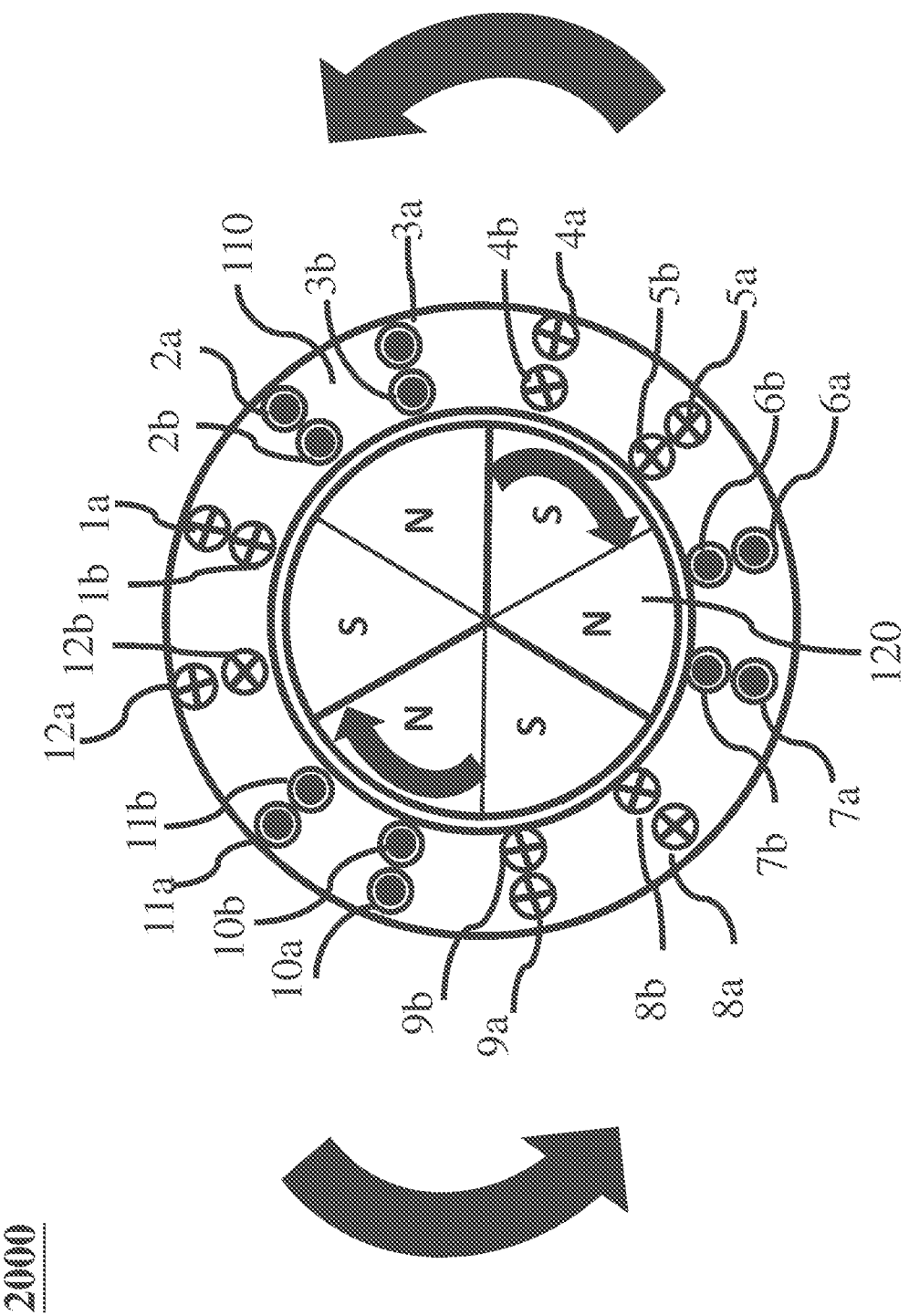

First, please refers to FIGS. 5A-5B and FIGS. 6A-6B. As shown in FIGS. 5A-5B, the polarity of the first external electrode 160 is positive, and the polarity of the second external electrode 170 is negative, and the logic unit (not shown) outputs a positive logic signal to the control unit (not shown), and the 1$^{th}$ first control switch 200A is switched from short as shown in FIG. 5A to open as shown in FIG. 5B, the 3$^{th}$ first control switch 200C is switched from short as shown in FIG. 5A to open as shown in FIG. 5B, the 1$^{th}$ second control switch 300A is switched from open as shown in FIG. 5A to short as shown in FIG. 5B, and the 3$^{th}$ second control switch 300C is switched from short as shown in FIG. 5A to open as shown in FIG. 5B, then the current will be commutated at the node C3 connecting the 3$^{th}$ step of armature coil 304 and the node A1 connecting the 1$^{th}$ step of armature coil 102 like a commutator disposed therebetween. As shown in FIGS. 6A-6B, because the currents within the 1$^{th}$ step of armature coil 102 and the 3$^{th}$ step of armature coil 304 flow backward, so the armature coils whose current flows out of the surface of the circular armature unit 110 face the N poles of the magnetic unit 120 will be changed from the first armature conductors 1a, 2a, 5a, 6a, 9a, 10a and the second armature conductors 1b, 2b, 5b, 6b, 9b, 10b to the first armature conductors 2a, 3a, 6a, 7a, 10a, 11a and the second armature conductors 2b, 3b, 6b, 7b, 10b, 11b, and the armature coils whose current flows into the surface of the circular armature unit 110 face the S poles of the magnetic unit 120 will be changed from the first armature conductors 3a, 4a, 7a, 8a, 11a, 12a and the second armature conductors 3b, 4b, 7b, 8b, 11b, 12b to the first armature conductors 4a, 5a, 8a, 9a, 12a, 1a and the second armature conductors 4b, 5b, 8b, 9b, 12b, 1b, thereby the magnetic unit 120 will clockwise rotate relatively to the circular armature unit 100.

Figure 5C:
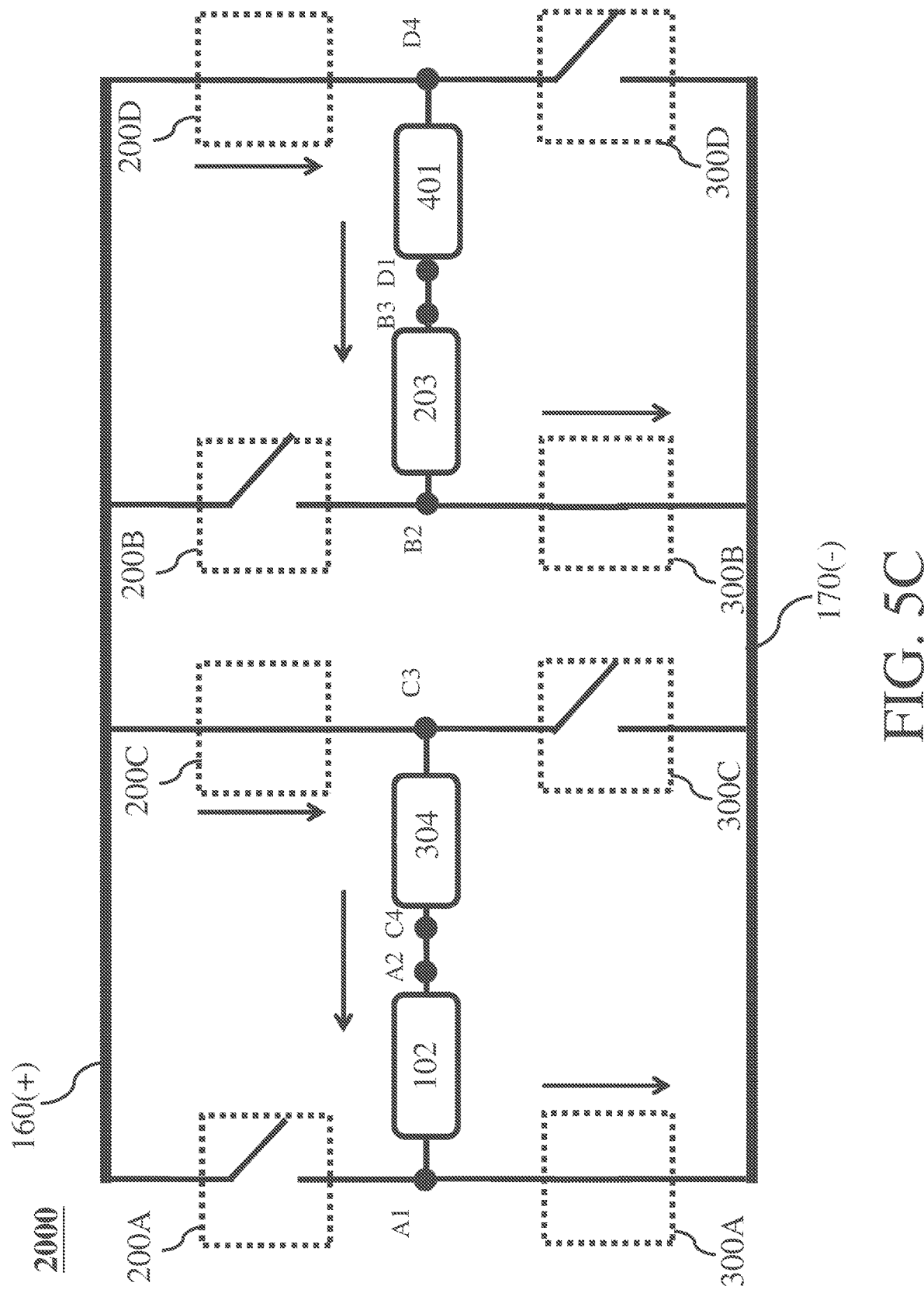
Figure 6C:
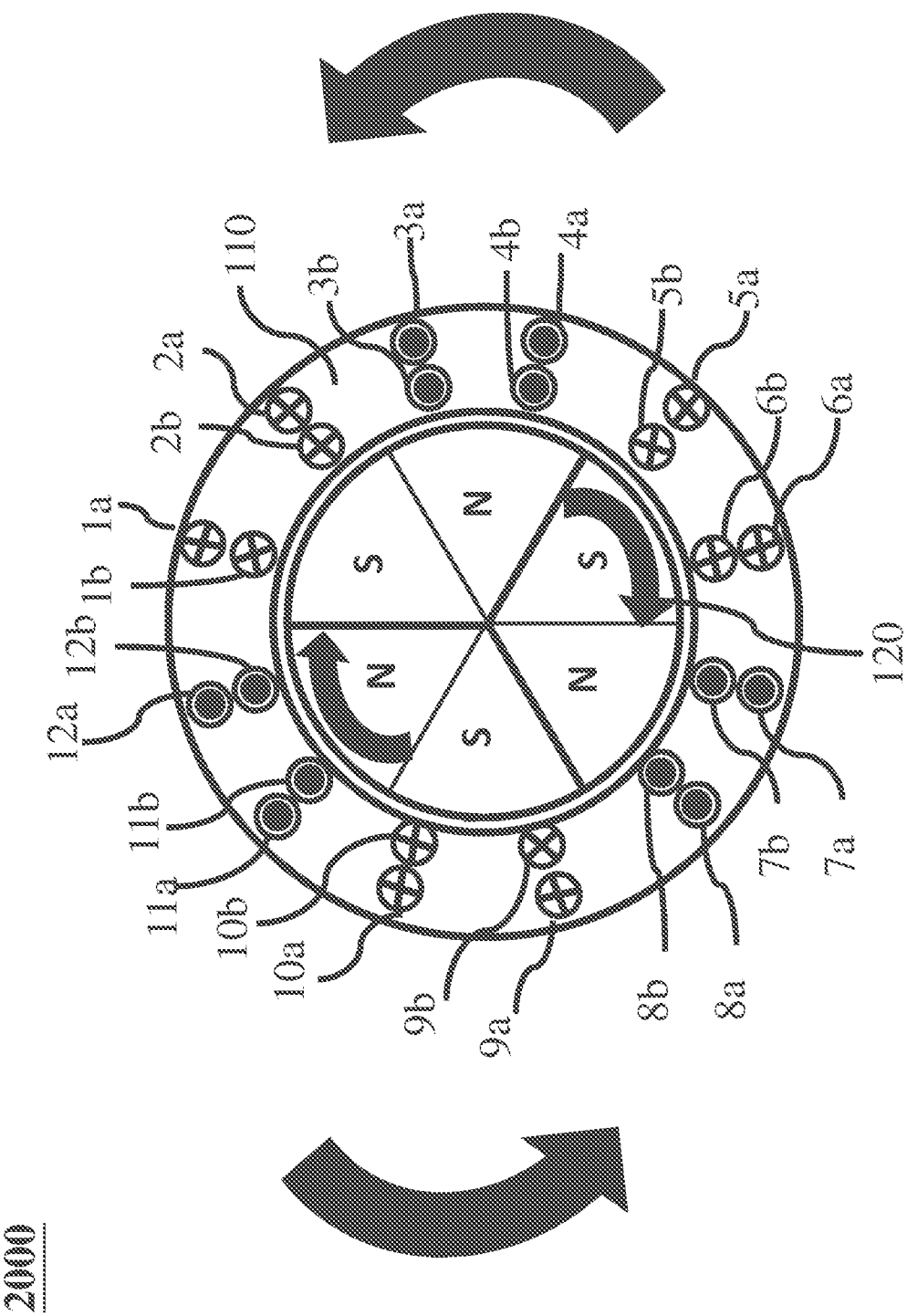

Next, please refers to FIGS. 5B~5C and FIGS. 6B~6C. As shown in FIGS. 5B~5C, the polarity of the first external electrode 160 is positive, and the polarity of the second external electrode 170 is negative, and the logic unit (not shown) outputs a positive logic signal to the control unit (not shown), and the 2$^{th}$ first control switch 200B is switched from short as shown in FIG. 5B to open as shown in FIG. 5C, the 4$^{th}$ first control switch 200D is switched from open as shown in FIG. 5B to short as shown in FIG. 5C, the 2$^{th}$ second control switch 300B is switched from open as shown in FIG. 5B to short as shown in FIG. 5C, and the 4$^{th}$ second control switch 300D is switched from short as shown in FIG. 5B to open as shown in FIG. 5C, then the current will be commutated at the node B2 connecting the 2$^{th}$ step of armature coil 203 and the node D4 connecting the 4$^{th}$ step of armature coil 401 like a commutator disposed therebetween. As shown in FIGS. 6B~6C, because the currents within the 2$^{th}$ step of armature coil 203 and the 4$^{th}$ step of armature coil 401 flow backward, so the armature coils whose current flows out of the surface of the circular armature unit 110 face the N poles of the magnetic unit 120 will be changed from the first armature conductors 2a, 3a, 6a, 7a, 10a, 11a and the second armature conductors 2b, 3b, 6b, 7b, 10b, 11b to the first armature conductors 3a, 4a, 7a, 8a, 11a, 12a and the second armature conductors 3b, 4b, 7b, 8b, 11b, 12b, and the armature coils whose current flows into the surface of the circular armature unit 110 face the S poles of the magnetic unit 120 will be changed from the first armature conductors 4a, 5a, 8a, 9a, 12a, 1a and the second armature conductors 4b, 5b, 8b, 9b, 12b, 1b to the first armature conductors 1a, 2a, 5a, 6a, 9a, 10a and the second armature conductors 1b, 2b, 5b, 6b, 9b, 10b, thereby the magnetic unit 120 will clockwise rotate relatively to the circular armature unit 100.

Figure 5D:
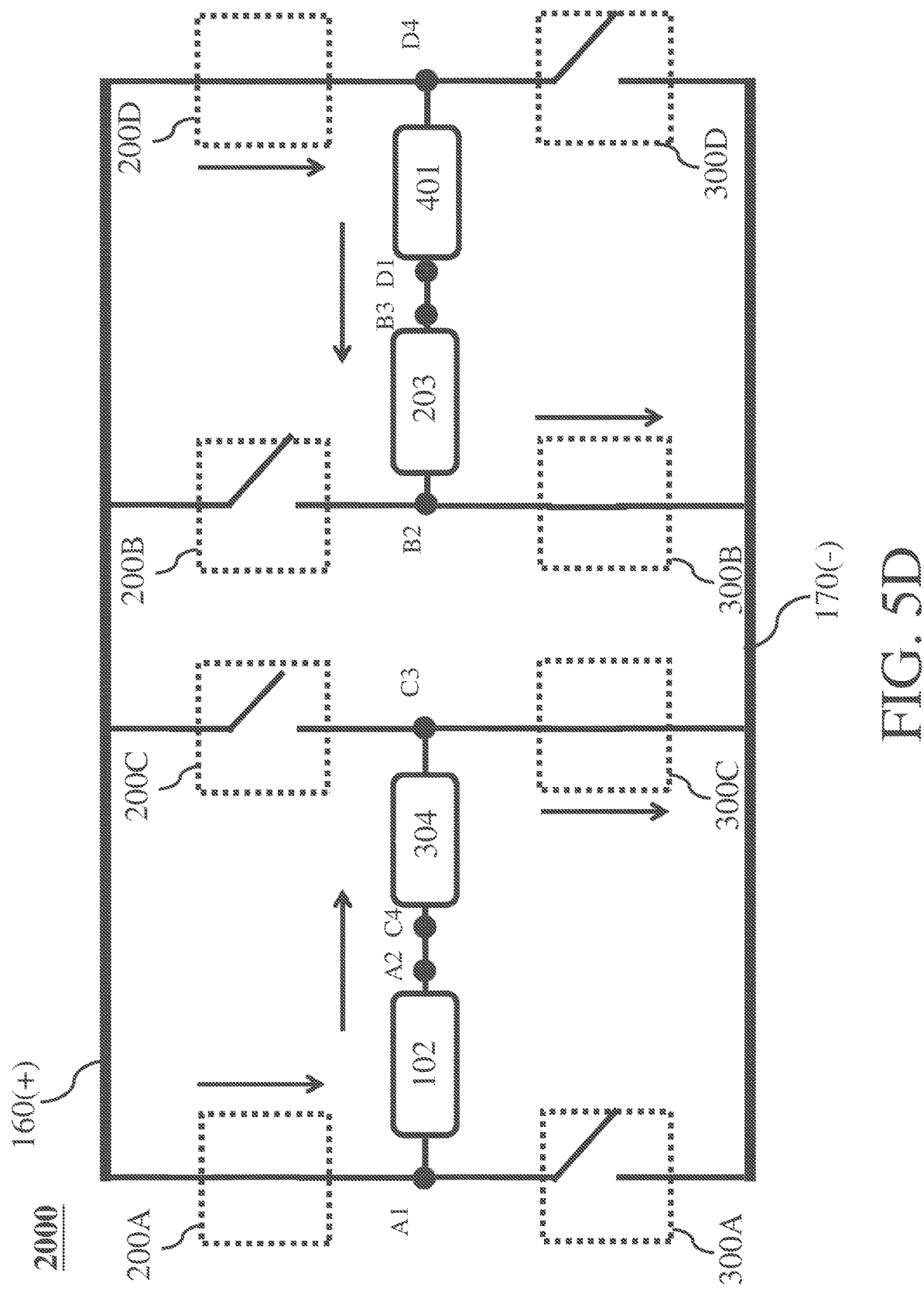
Figure 5A:
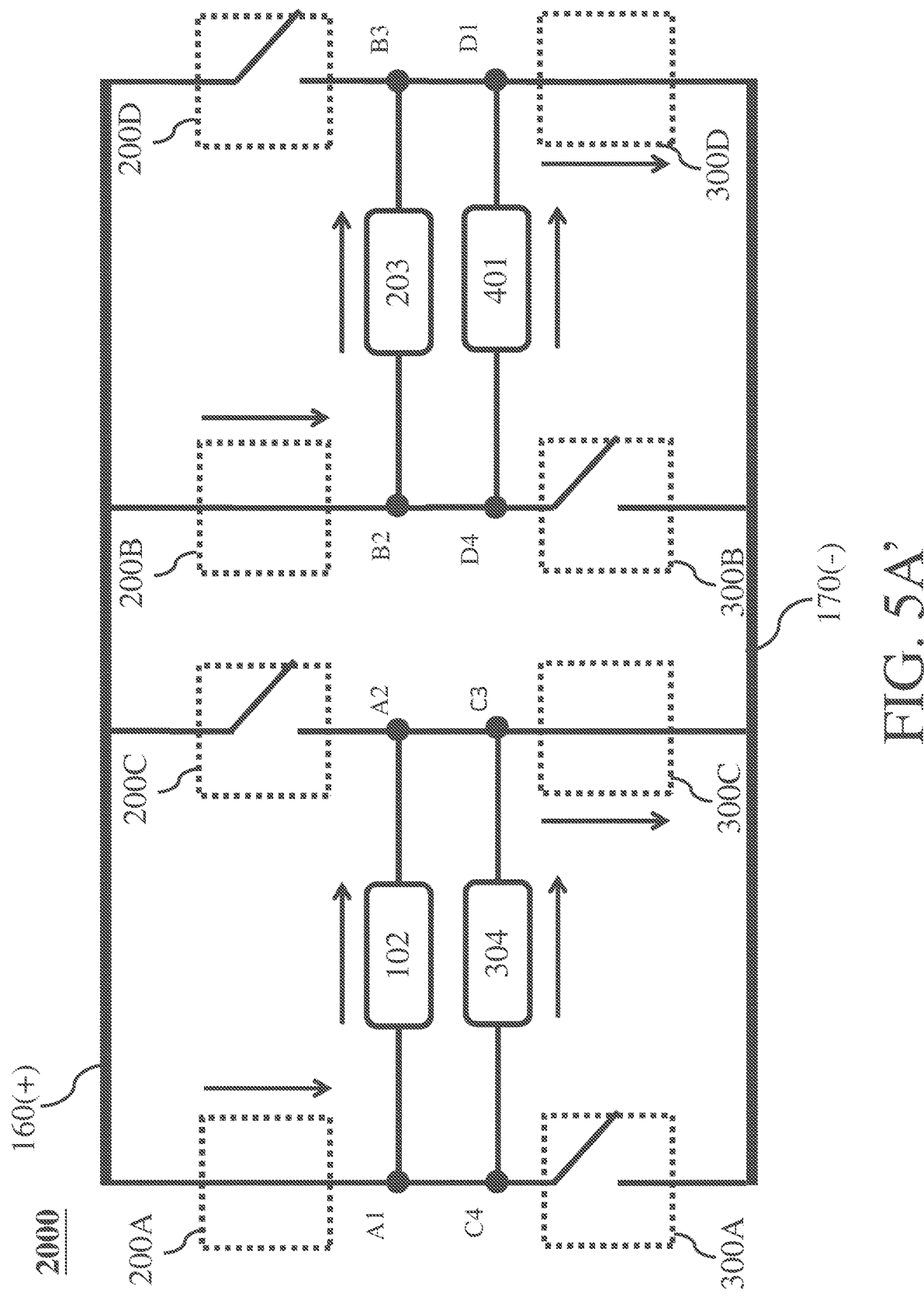
Figure 5B:
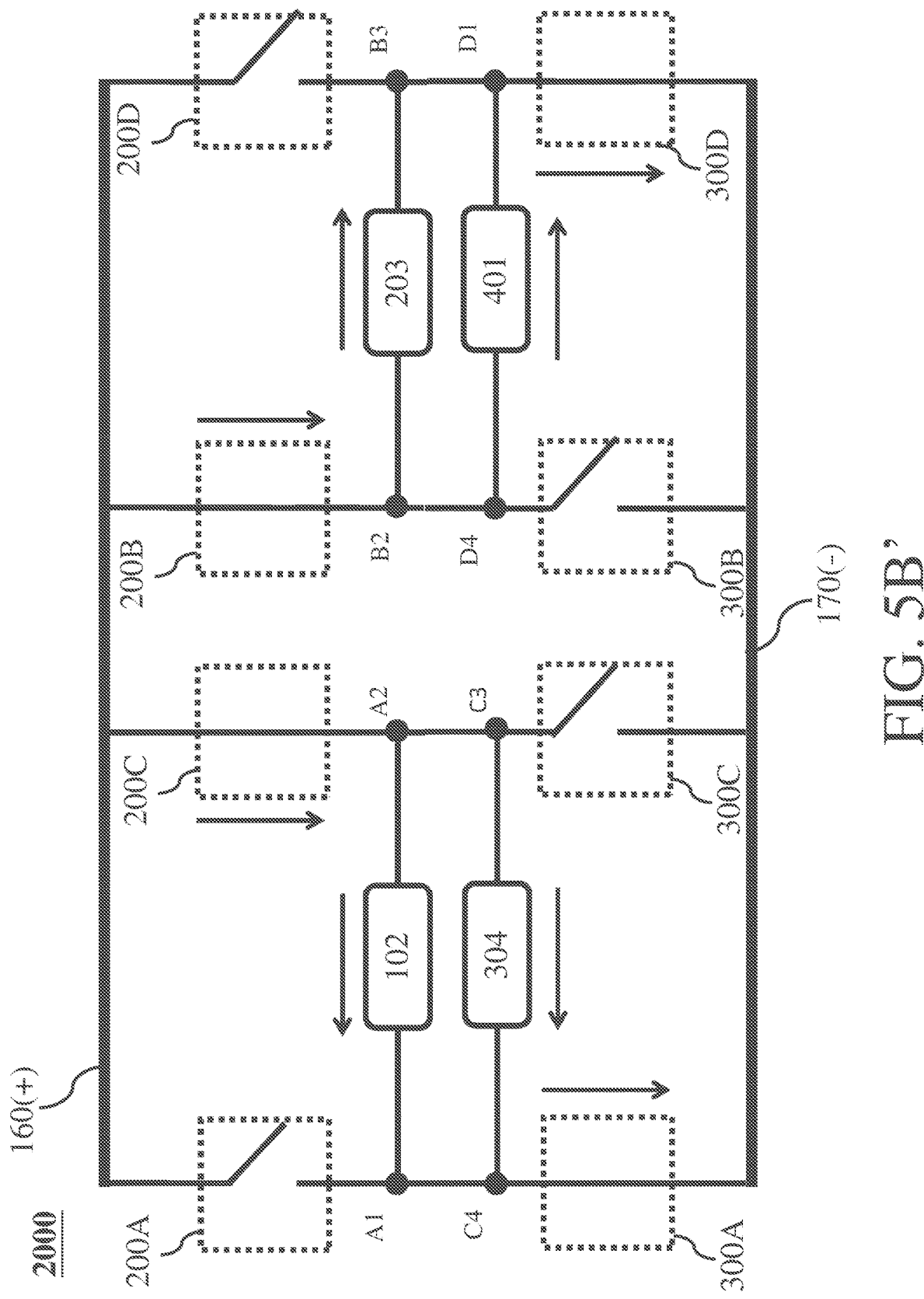
Figure 5C:
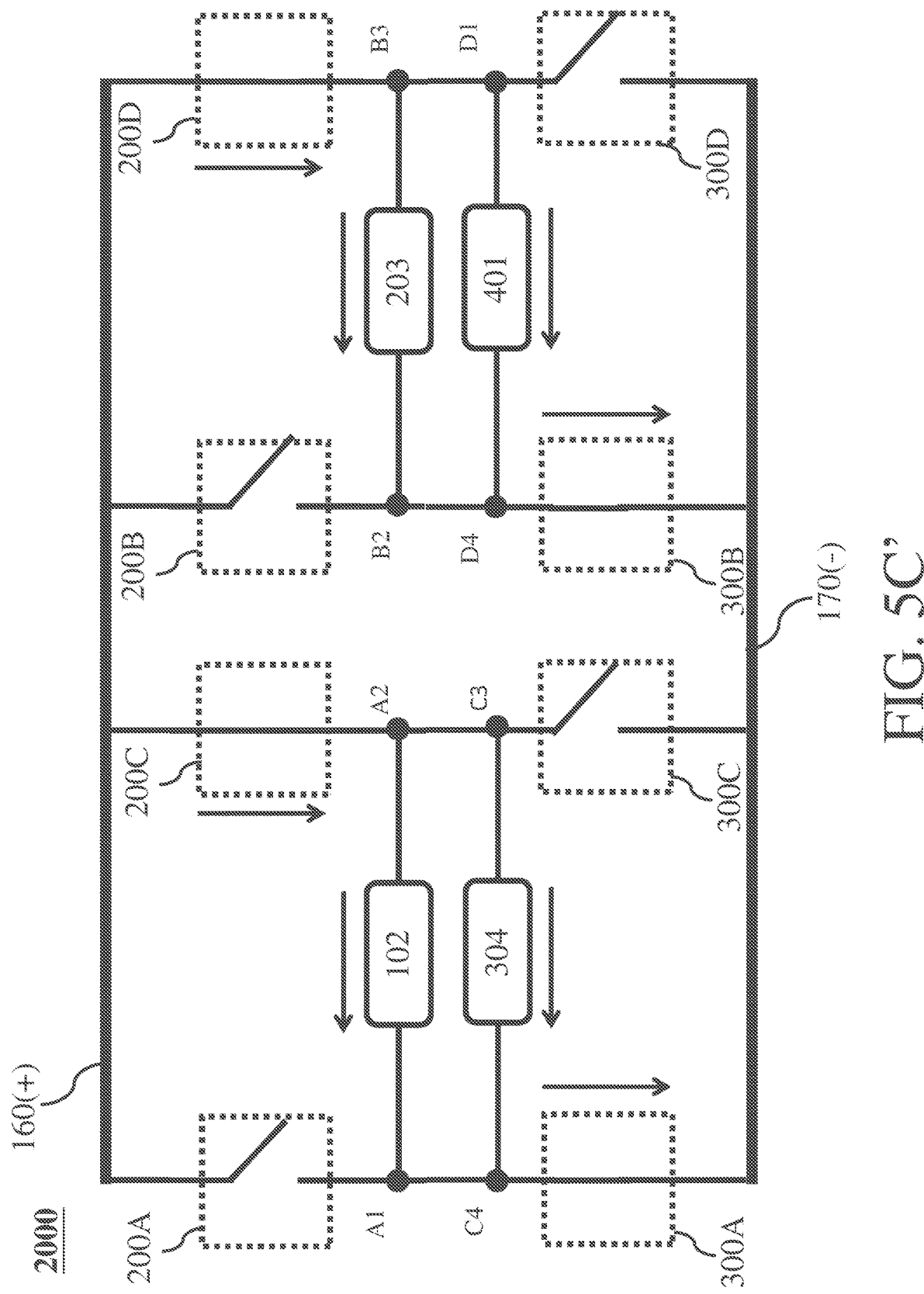
Figure 5D:
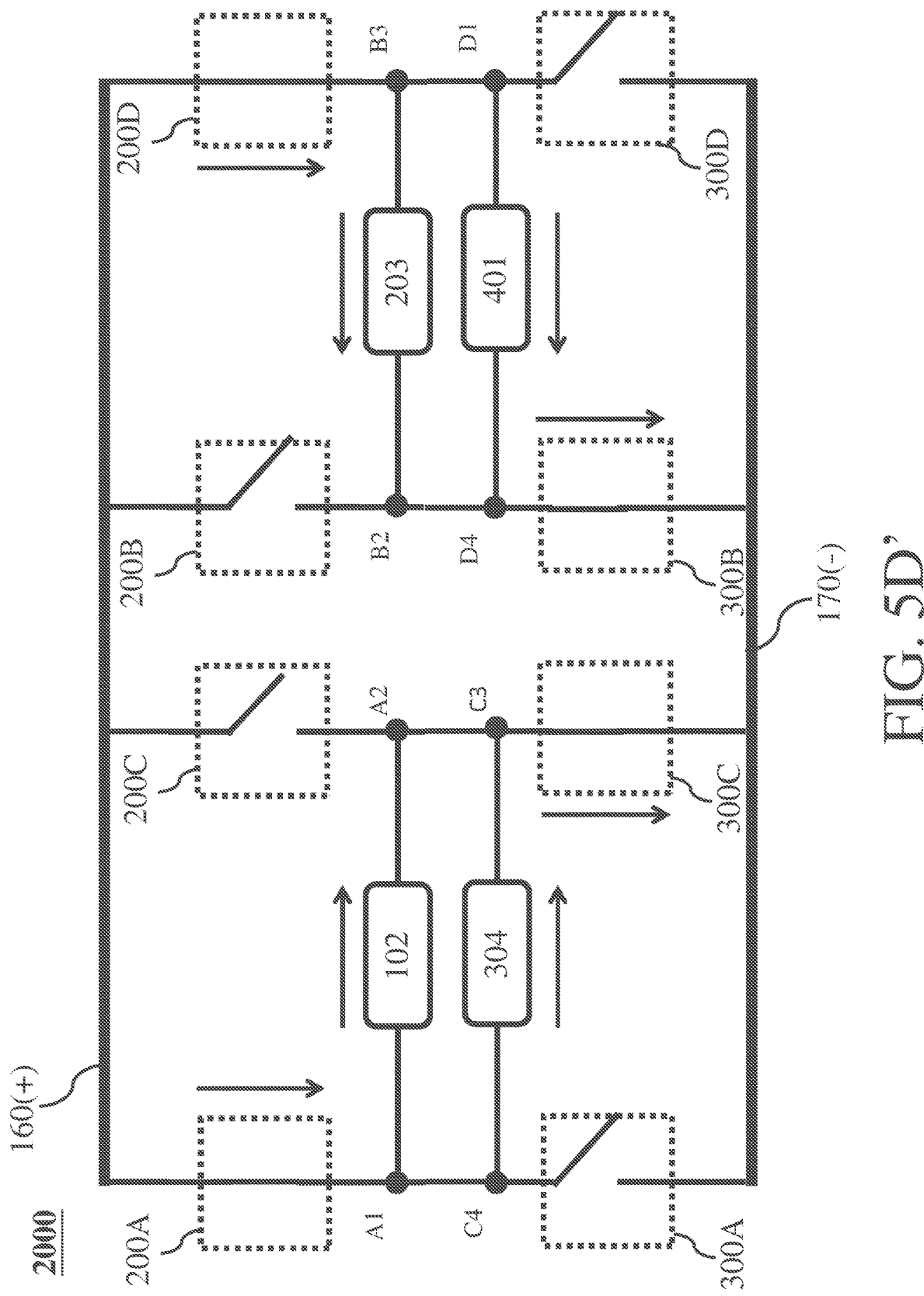

Next, please refers to FIGS. 5C-5D and FIGS. 6C-6D. As shown in FIGS. 5C-5D, the polarity of the first external electrode 160 is positive, and the polarity of the second external electrode 170 is negative, and the logic unit (not shown) outputs a positive logic signal to the control unit (not shown), and the first control switch 200A is switched from open as shown in FIG. 5C to short as shown in FIG. 5D, the 3$^{th}$ first control switch 200C is switched from short as shown in FIG. 5C to open as shown in FIG. 5D, the second control switch 300A is switched from short as shown in FIG. 5C to open as shown in FIG. 5D, and the 3$^{th}$ second control switch 300C is switched from open as shown in FIG. 5C to short as shown in FIG. 5D, then the current will be commutated at the node A1 connecting the $1^{th}$ step of armature coil 102 and the node C3 connecting the $3^{th}$ step of armature coil 304 like a commutator disposed therebetween. As shown in FIGS. 5C-5D, because the currents within the $1^{th}$ step of armature coil 102 and the $3^{th}$ step of armature coil 304 flow backward, so the armature coils whose current flows out of the surface of the circular armature unit 110 face the N poles of the magnetic unit 120 will be changed from the first armature conductors 3a, 4a, 7a, 8a, 11a, 12a and the second armature conductors 3b, 4b, 7b, 8b, 11b, 12b to the first armature conductors 1a, 4a, 5a, 8a, 9a, 12a and the second armature conductors 1b, 4b, 5b, 8b, 9b, 12b, and the armature coils whose current flows into the surface of the circular armature unit 110 face the S poles of the magnetic unit 120 will be changed from the first armature conductors 1a, 2a, 5a, 6a, 9a, 10a and the second armature conductors 1b, 2b, 5b, 6b, 9b, 10b to the first armature conductors 2a, 3a, 6a, 7a, 10a, 11a and the second armature conductors 2b, 3b, 6b, 7b, 10b, 11b, thereby the magnetic unit 120 will clockwise rotate relatively to the circular armature unit 100.

Finally, please refers to FIGS. 5D, 5A and FIGS. 6D, 6A. As shown in FIGS. 5D, 5A, the polarity of the first external electrode 160 is positive, and the polarity of the second external electrode 170 is negative, and the logic unit (not shown) outputs a positive logic signal to the control unit (not shown), and the $2^{th}$ first control switch 200B is switched from open as shown in FIG. 5D to short as shown in FIG. 5A, the $4^{th}$ first control switch 200D is switched from short as shown in FIG. 5D to open as shown in FIG. 5A, the $2^{th}$ second control switch 300B is switched from short as shown in FIG. 5D to open as shown in FIG. 5A, and the $4^{th}$ second control switch 300D is switched from open as shown in FIG. 5D to short as shown in FIG. 5A, then the current will be commutated at the nodes B2 connecting the $2^{th}$ step of armature coil 203 and the node D4 connecting the $4^{th}$ step of armature coil 401 like a commutator disposed therebetween. As shown in FIGS. 5D and 5A, because the currents within the $2^{th}$ step of armature coil 203 and the $4^{th}$ step of armature coil 401 flow backward, so the armature coils whose current flows out of the surface of the circular armature unit 110 face the N poles of the magnetic unit 120 will be changed from the first armature conductors 1a, 4a, 5a, 8a, 9a, 12a and the second armature conductors 1b, 4b, 5b, 8b, 9b, 12b to the first armature conductors 1a, 2a, 5a, 6a, 9a, 10a and the second armature conductors 1b, 2b, 5b, 6b, 9b, 10b, and the armature coils whose current flows into the surface of the circular armature unit 110 face the S poles of the magnetic unit 120 will be changed from the first armature conductors 2a, 3a, 6a, 7a, 10a, 11a and the second armature conductors 2b, 3b, 6b, 76b, 10b, 11b to the first armature conductors 3a, 4a, 7a, 8a, 11a, 12a and the second armature conductors 3b, 4b, 7b, 8b, 11b, 12b, thereby the magnetic unit 120 will clockwise rotate relatively to the circular armature unit 100.

FIG. 4A' is a schematic drawing illustrating another brushless DC dynamo 2000' of the Embodiment 2 according to this present invention. As shown in FIG. 4A', the structure of the brushless DC dynamo 2000' is similar to that of the brushless DC dynamo 2000 comprising a circular armature unit 110 and a magnetic unit 120 consisted of a permanent magnet or an electromagnet disposed inside of the circular armature unit 110, except that the $1^{th}$ step of the armature coil and the $3^{th}$ step of the armature coil of the brushless DC dynamo 2000' are interconnected in parallel, and the $2^{th}$ step of the armature coil and the $4^{th}$ step of the armature coil are interconnected in parallel, and the first armature conductors and the second armature conductors within each step of the armature coils are alternatively interconnected in sequence as shown in FIG. 4B' or alternatively interconnected in parallel as shown in FIG. 4B".

Please refers to FIGS. 5A'~5D' illustrating equivalent circuit diagrams at different stages of the 4 steps armature coil of the brushless DC dynamo 2000' as shown in FIG. 4A', and FIGS. 6A-6D illustrating schematic drawing showing operation of the brushless DC dynamo 2000 at different stages corresponding to FIGS. 5A'~5D'.

First, please refers to FIGS. 5A'~5B' and FIGS. 6A-6B. As shown in FIGS. 5A'-5B', the polarity of the first external electrode 160 is positive, and the polarity of the second external electrode 170 is negative, and the logic unit (not shown) outputs a positive logic signal to the control unit (not shown), and the $1^{th}$ first control switch 200A is switched from short as shown in FIG. 5A' to open as shown in FIG. 5B', the $3^{th}$ first control switch 200C is switched from open as shown in FIG. 5A' to short as shown in FIG. 5B', the second control switch 300A is switched from open as shown in FIG. 5'A to short as shown in FIG. 5B', and the $3^{th}$ second control switch 300C is switched from short as shown in FIG. 5A' to open as shown in FIG. 5B', then the current will be commutated at the nodes A1 and A2 connecting the $1^{th}$ step of armature coil 102 like a commutator disposed therebetween, and the current will be commutated at the nodes C4 and C3 connecting the $3^{th}$ step of armature coil 304 like a commutator disposed therebetween. As shown in FIGS. 6A-6B, because the currents within the $1^{th}$ step of armature coil 102 and the $3^{th}$ step of armature coil 304 flow backward, so the armature coils whose current flows out of the surface of the circular armature unit 110 face the N poles of the magnetic unit 120 will be changed from the first armature conductors 1a, 2a, 5a, 6a, 9a, 10a and the second armature conductors 1b, 2b, 5b, 6b, 9b, 10b to the first armature conductors 2a, 3a, 6a, 7a, 10a, 11a and the second armature conductors 2b, 3b, 6b, 7b, 10b, 11b, and the armature coils whose current flows into the surface of the circular armature unit 110 face the S poles of the magnetic unit 120 will be changed from the first armature conductors 3a, 4a, 7a, 8a, 11a, 12a and the second armature conductors 3b, 4b, 7b, 8b, 11b, 12b to the first armature conductors 4a, 5a, 8a, 9a, 12a, 1a and the second armature conductors 4b, 5b, 8b, 9b, 12b, 1b, thereby the magnetic unit 120 will clockwise rotate relatively to the circular armature unit 100.

Next, please refers to FIGS. 5B'~5C' and FIGS. 6B-6C. As shown in FIGS. 5B'-5C', the polarity of the first external electrode 160 is positive, and the polarity of the second external electrode 170 is negative, and the logic unit (not shown) outputs a positive logic signal to the control unit (not shown), and the $2^{th}$ first control switch 200B is switched from short as shown in FIG. 5B' to open as shown in FIG. 5C', the $4^{th}$ first control switch 200D is switched from open as shown in FIG. 5B' to short as shown in FIG. 5C', the $2^{th}$ second control switch 300B is switched from open as shown in FIG. 5B' to short as shown in FIG. 5C', and the $4^{th}$ second control switch 300D is switched from short as shown in FIG. 5B' to open as shown in FIG. 5C', then the current will be commutated at the nodes B2 and B3 connecting the $2^{th}$ step of the armature coil 203 like a commutator disposed therebetween, and the current will be commutated at the nodes D4 and D1 connecting the $4^{th}$ step of armature coil 401 like a commutator disposed therebetween. As shown in FIGS. 6B-6C, because the currents within the $2^{th}$ step of armature coil 203 and the $4^{th}$ step of armature coil 401 flow backward, so the armature coils whose current flows out of the surface of the circular armature unit 110 face the N poles of the magnetic unit 120 will be changed from the first armature conductors 2a, 3a, 6a, 7a, 10a, 11a and the second armature conductors 2b, 3b, 6b, 7b, 10b, 11b to the first armature conductors 3a, 4a, 7a, 8a, 11a, 12a and the second armature conductors 3b, 4b, 7b, 8b, 11b, 12b, and the armature coils whose current flows into the surface of the circular armature unit 110 face the S poles of the magnetic unit 120 will be changed from the first armature conductors 4a, 5a, 8a, 9a, 12a, 1a and the second armature conductors 4b, 5b, 8b, 9b, 12b, 1b to the first armature conductors 1a, 2a, 5a, 6a, 9a, 10a and the second armature conductors 1b, 2b, 5b, 6b, 9b, 10b, thereby the magnetic unit 120 will clockwise rotate relatively to the circular armature unit 100.

Figure 6D:
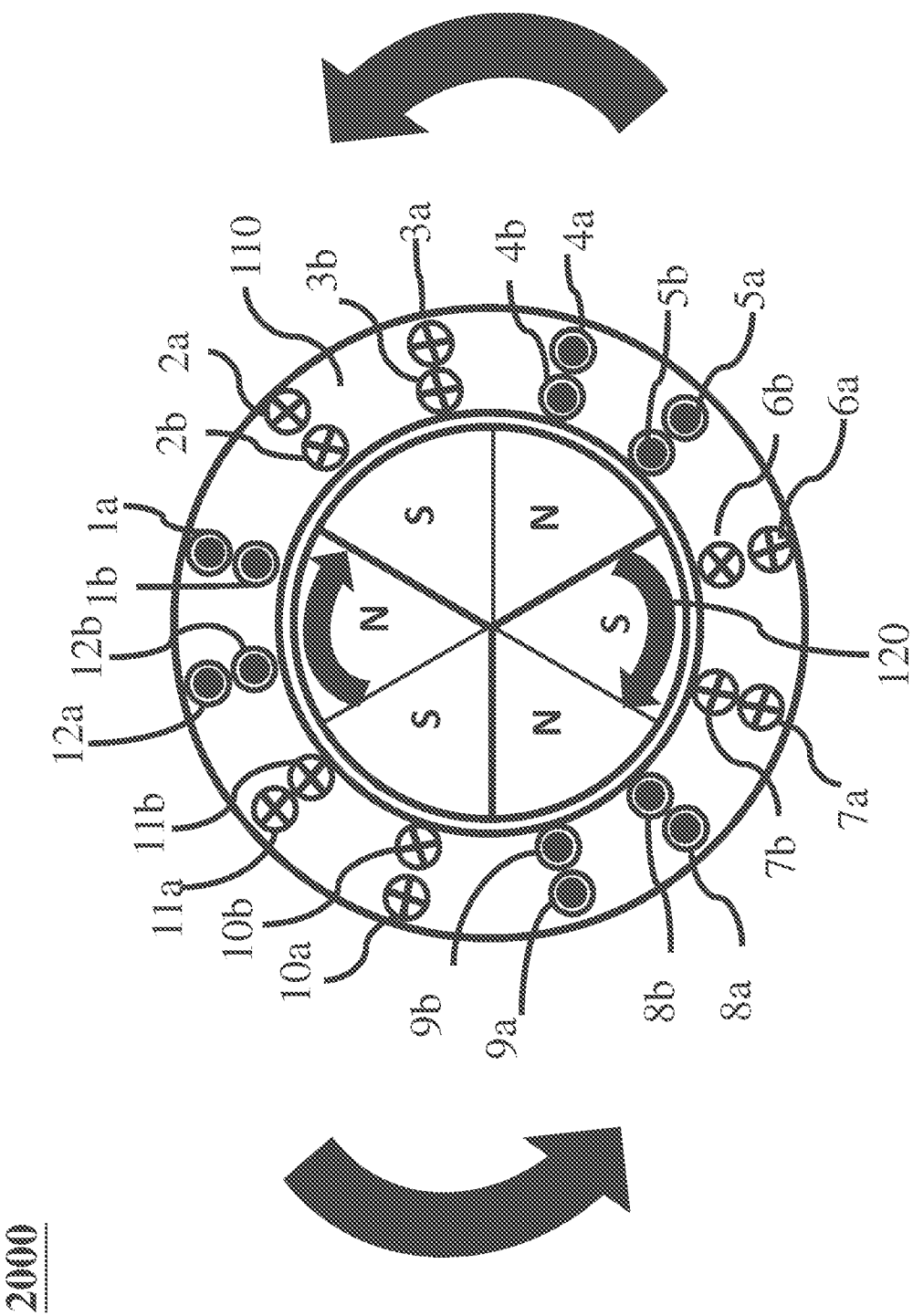

Next, please refers to FIGS. 5C'~5D' and FIGS. 6C-6D. As shown in FIGS. 5C'-5D', the polarity of the first external electrode 160 is positive, and the polarity of the second external electrode 170 is negative, and the logic unit (not shown) outputs a positive logic signal to the control unit (not shown), and the $1^{th}$ first control switch 200A is switched from open as shown in FIG. 5C' to short as shown in FIG. 5D', the $3^{th}$ first control switch 200C is switched from short as shown in FIG. 5C' to open as shown in FIG. 5D', the second control switch 300A is switched from short as shown in FIG. 5C' to open as shown in FIG. 5D', and the $3^{th}$ second control switch 300C is switched from open as shown in FIG. 5C' to short as shown in FIG. 5D', then the current will be commutated at the nodes A1 and A2 connecting the $1^{th}$ step of armature coil 102 like a commutator disposed therebetween, and the current will be commutated at the nodes C4 and C3 connecting the $3^{th}$ step of armature coil 304 like a commutator disposed therebetween. As shown in FIGS. 5C'-5D', because the currents within the $1^{th}$ step of armature coil 102 and the $3^{th}$ step of armature coil 304 flow backward, so the armature coils whose current flows out of the surface of the circular armature unit 110 face the N poles of the magnetic unit 120 will be changed from the first armature conductors 3a, 4a, 7a, 8a, 11a, 12a and the second armature conductors 3b, 4b, 7b, 8b, 11b, 12b to the first armature conductors 1a, 4a, 5a, 8a, 9a, 12a and the second armature conductors 1b, 4b, 5b, 8b, 9b, 12b, and the armature coils whose current flows into the surface of the circular armature unit 110 face the S poles of the magnetic unit 120 will be changed from the first armature conductors 1a, 2a, 5a, 6a, 9a, 10a and the second armature conductors 1b, 2b, 5b, 6b, 9b, 10b to the first armature conductors 2a, 3a, 6a, 7a, 10a, 11a and the second armature conductors 2b, 3b, 6b, 7b, 10b, 11b, thereby the magnetic unit 120 will clockwise rotate relatively to the circular armature unit 100.

Finally, please refers to FIGS. 5D', 5A' and FIGS. 6D, 6A. As shown in FIGS. 5D', 5A', the polarity of the first external electrode 160 is positive, and the polarity of the second external electrode 170 is negative, and the logic unit (not shown) outputs a positive logic signal to the control unit (not shown), and the $2^{th}$ first control switch 200B is switched from open as shown in FIG. 5D' to short as shown in FIG. 5A', the $4^{th}$ first control switch 200D is switched from short as shown in FIG. 5D' to open as shown in FIG. 5A', the $2^{th}$ second control switch 300B is switched from short as shown in FIG. 5D' to open as shown in FIG. 5A', and the $4^{th}$ second control switch 300D is switched from open as shown in FIG. 5D' to short as shown in FIG. 5A', then the current will be commutated at the nodes B2 and B3 connecting the $2^{th}$ step of armature coil 203 like a commutator disposed therebetween, and the current will be commutated at the nodes D4 and D1 connecting the $4^{th}$ step of armature coil 401 like a commutator disposed therebetween. As shown in FIGS. 5D' and 5A', because the currents within the $2^{th}$ step of armature coil 203 and the $4^{th}$ step of armature coil 401 flow backward, so the armature coils whose current flows out of the surface of the circular armature unit 110 face the N poles of the magnetic unit 120 will be changed from the first armature conductors 1a, 4a, 5a, 8a, 9a, 12a and the second armature conductors 1b, 4b, 5b, 8b, 9b, 12b to the first armature conductors 1a, 2a, 5a, 6a, 9a, 10a and the second armature conductors 1b, 2b, 5b, 6b, 9b, 10b, and the armature coils whose current flows into the surface of the circular armature unit 110 face the S poles of the magnetic unit 120 will be changed from the first armature conductors 2a, 3a, 6a, 7a, 10a, 11a and the second armature conductors 2b, 3b, 6b, 7b, 10b, 11b to the first armature conductors 3a, 4a, 7a, 8a, 11a, 12a and the second armature conductors 3b, 4b, 7b, 8b, 11b, 12b, thereby the magnetic unit 120 will clockwise rotate relatively to the circular armature unit 100.

According to the brushless DC dynamo 2000' of this Embodiment 2, the magnetic unit 120 will counterclockwise rotate relatively to circular armature unit 110 when the polarity of the first external electrode 160 is positive and the polarity of the second external electrode 170 is negative, and the logic unit (not shown) outputs a negative logic signal to the control unit (not shown).

According to the brushless DC dynamo 1000 of this Embodiment 2, the magnetic unit 120 will clockwise rotate relatively to circular armature unit 110 when the polarity of the first external electrode 160 is negative and the polarity of the second external electrode 170 is positive, and the logic unit (not shown) outputs a negative logic signal to the control unit (not shown).

According to the brushless DC dynamo 1000 of this Embodiment 2, the magnetic unit 120 will counter clockwise rotate relatively to circular armature unit 110 when the polarity of the first external electrode 160 is negative and the polarity of the second external electrode 170 is positive, and the logic unit (not shown) outputs a positive logic signal to the control unit (not shown).

Furthermore, the above-mentioned brushless DC dynamo 2000' according to Embodiment 2 of this invention can be equipped with a vehicle, and the rotation direction of the driving axis of the vehicle can be changed by controlling the magnetic unit 120 to clockwise or counterclockwise rotate relatively to the circular armature unit 110 of the above-mentioned brushless DC dynamo 2000' controlled by the polarities of the first external electrode 160, the second external electrode 170 and the logic signals output by the logic unit.

According to the brushless DC dynamos 2000 and 2000' of this Embodiment 2, the magnetic unit 120 will clockwise rotate relatively to circular armature unit 110 when the polarity of the first external electrode 160 is positive and the polarity of the second external electrode 170 is negative, and the logic unit (not shown) outputs a negative logic signal to the control unit (not shown).

According to the brushless DC dynamos 2000 and 2000' of this Embodiment 2, the magnetic unit 120 will clockwise rotate relatively to circular armature unit 110 when the polarity of the first external electrode 160 is negative and the polarity of the second external electrode 170 is positive, and the logic unit (not shown) outputs a negative logic signal to the control unit (not shown).

According to the brushless DC dynamos 2000 and 2000' of this Embodiment 2, the magnetic unit 120 will counter-clockwise rotate relatively to circular armature unit 110 when the polarity of the first external electrode 160 is negative and the polarity of the second external electrode 170 is positive, and the logic unit (not shown) outputs a positive logic signal to the control unit (not shown).

Moreover, the driving direction or output direction of the brushless DC dynamos 2000 and 2000' will be reversed when the polarities of the first external electrode 160 and the second external electrode 170 are not changed, and the polarity outputted by the logic unit (not shown) is changed to reverse the operations of all first control switches 200A~200D and all second control switches 300A~300D of the same step. Specially, the driving direction or output direction of the brushless DC dynamos 2000 and 2000' will be quickly reversed to provide a function of bi-polar pulse with modulation (PWM) when the polarities of the first external electrode 160 and the second external electrode 170 are not changed, and the polarity of signals i outputted by the logic unit (not shown) s quickly changed to reverse the operations of all first control switches 200A~200D and all second control switches 300A~300D of the same step. In addition, the function of unipolar pulse with modulation (PWM) mentioned above can be achieved by quickly enabling or disenabling signals outputted by the logic unit (not shown) without changing polarities thereof to simultaneously enable or disenable the operations of all first control switches 200A~200D and all second control switches 300A~300D of the same step.

Furthermore, the above-mentioned brushless DC dynamos 2000 and 2000' according to Embodiment 2 of this invention can be equipped with a vehicle, and the rotation direction of the driving axis of the vehicle can be changed by controlling the magnetic unit 120 to clockwise or counterclockwise rotate relatively to the circular armature unit 110 of the above-mentioned brushless DC dynamo 1000 controlled by the polarities of the first external electrode 160, the second external electrode 170 and the logic signals output by the logic unit.

Exemplary Embodiment 3

This Exemplary Embodiment 3 according to this present invention is to provide another brushless DC dynamo 3000, comprising: a circular armature unit, comprising: L slots of first armature conductors spaced with each other in sequence, and $1^{th}$ slot of the first armature conductors is adjacent to $L^{th}$ slot of the first armature conductors and spatially joined with each other, L is a natural number; and L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number; a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and S≥2, and each pair of the magnetic poles faces M' slots of the circular armature unit, M' is a natural number and M'=2S, L=M'*N; a pair of external electrodes comprising a first external electrode with a first polarity and a second external electrode with a second polarity, wherein the first polarity and the second polarity are opposite to each other, and the pair of external electrodes is a rechargeable battery or a power supplying module, and the first external electrode is interconnected to the rechargeable battery or the power supplying module in sequence by a inductor; a first common potential electrode directly or indirectly electrically connected to the first external electrode with a first polarity; a second common potential electrode; a third common potential electrode electrically connected to the second common potential electrode; a fourth common potential electrode directly or indirectly electrically connected to the second external electrode with a second polarity; a control unit comprising M1' first control switches, M1' second control switches, M2' third control switches and M2' fourth control switches, wherein M1'=2S1, M2'=2S2, M1'+M2'≤M', and S1≥1 S2≥1 S1+S2≤S, and M1', M2', S1 and S2 are all natural numbers; and a logic unit electrically connected to the control unit, wherein logic signals for controlling short or open of the first control switches, the second control switches, the third control switches and the fourth control switches are outputted by the logic unit by sensing the positions of the magnetic unit; wherein, the first armature conductors and the second armature conductors are classified as M' steps of armature coils interconnecting in sequence, and $P^{th}$ step of the armature coils is formed by P1 slot of the first armature conductors satisfying with 1≤Q≤N and P2 slot of the second armature conductors satisfying 1≤Q≤N interconnecting in sequence, wherein P1=1+remainder of $\{[P-1+(M'*(Q-1))]/L\}$, P2=1+remainder of $\{[P-1+(M'*(Q-1))+S]/L\}$, P, Q, P1, P2 are all natural numbers, and M'≥4, 1≤P0≤M', 1≤Q≤N, 1≤P1≤L, 1≤P2≤L, and the armature coils are classified as S classes, and the S classes of the armature coils are further divided into a first group and a second group, wherein the first group includes S1 classes of the armatures coils and the second group includes S2 classes of the armatures coils; wherein, the S1 classes of the armature coils in the first class are independently connected to the first control switch electrically connected to the first common potential electrode and the second control switch electrically connected to the second common potential electrode, wherein $t1^{th}$ class of the armature coils is formed by t1 step of the armature coils and $t1+S^{th}$ step of the armature coils reversely connected in sequence or in parallel, t1 is a natural number and 1≤t1≤S, and wherein, a $[2(t1)-1]^{th}$ node and a $[2(t1)]^{th}$ node are on two terminals of the $t1^{th}$ class of the armature coils, and a $[2(t1)]^{th}$ first control switch is interconnected between the first common potential electrode and the $[2(t1)-1]^{th}$ node, and a $[2(t1)-1]^{th}$ second control switch is interconnected between the second common potential electrode and the $[2(t1)-1]^{th}$ node, and there are at most half of the first control switches short and at most half of the second control switches short at the same operation time, and the $[2(t1)-1]^{th}$ first control switch and the $[2(t1)-1]^{th}$ second control switch are not short at the same time, and the $[2(t1)]^{th}$ first control switch and the $[2(t1)]^{th}$ second control switch are not short at the same time; wherein, the S2 class esof the armature coils in the second class are independently connected to the third control switch electrically connected to the third common potential electrode and the fourth control switch electrically connected to the fourth common potential electrode, wherein $t2^{th}$ class of the armature coils is formed by t2 step of the armature coils and $(t2+S)^{th}$ step of the armature coils reversely connected in sequence or in parallel, t2 is a natural number and S1+1≤t2≤S, and a $[2(t2)-1]^{th}$ node and a $[2(t2)-3]^{th}$ node are on two terminals of the $t2^{th}$ class of the armature coils, and a $[2(t2)-3]^{th}$ third control switch is interconnected with the third common potential electrode at the $[2(t2)-1]^{th}$ node, and a $[2(t2)-2]^{th}$ second control switch is interconnected with the second common potential electrode at the $[2(t2)]^{th}$ node, and there are at most half of the third control switches short and at most half of the fourth control switches short at the same operation time, and the $[2(t2)-3]^{th}$ third control switch and the $[2(t2)-3]^{th}$ fourth control switch are not short at the same time, and the $[2(t2)-2]^{th}$ third control switch and the $[2(t2)-2]^{th}$ fourth control switch are not short at the same time.

The brushless DC dynamo 3000 of the Embodiment 3 as mentioned above, wherein the first control switch, the second control switch, the third control switch and the fourth control switch are power device switches for example but not limited to SiC switches, GaN switches, bipolar junction transistor (BJT) switches, insulated gate bipolar transistor (IGBT) switches or metal-oxide-semiconductor field-effect transistor (MOSFET) switches.

The brushless DC dynamo 3000 of the Embodiment 3 as mentioned above, wherein the magnetic unit is a permanent magnet or a electromagnet.

The brushless DC dynamo 3000 of the Embodiment 3 as mentioned above, wherein the logic element is for example but not limited to a resolver, a encoder, a Hall sensor, a photointerrupter or a photoelectric sensor.

The brushless DC dynamo 3000 of the Embodiment 3 as mentioned above, wherein the first armature coils and the second armature coils are manufactured by wave winding, lap winding or frog-leg winding.

The brushless DC dynamo 3000 of the Embodiment 3 as mentioned above, wherein the circular armature unit is a circular stator and the magnetic unit is a magnetic rotor, or alternatively the circular armature unit is a circular rotor and the magnetic is a magnetic stator.

An armature coil with twelve slots is taken as an example to explain this Embodiment 3. Accordingly, it means L=12, The magnetic unit comprises 3 pairs of magnetic poles (N=3), wherein the circular armature unit and the magnetic unit rotate relatively to each other under control.

As mentioned above, L=M'*N, and M'=4 since L=12 and N=3. Therefore, the first armature conductors (not shown) and the second armature conductors (not shown) can be classified into four steps, wherein the $1^{th}$ step of the armature coils 102 and the third step of the armature coil 304 are reversely interconnected in sequence, and the second step of the armature coils 203 and the $4^{th}$ step armature coil 401 are reversely interconnected in sequence. Alternatively, according to other embodiments of this invention, the $1^{th}$ step of the armature coils and the third step of the armature coils are reversely interconnected in parallel, and the second step of the armature coils and the $4^{th}$ step of the armature coils are reversely interconnected in parallel.

Figure 7A:
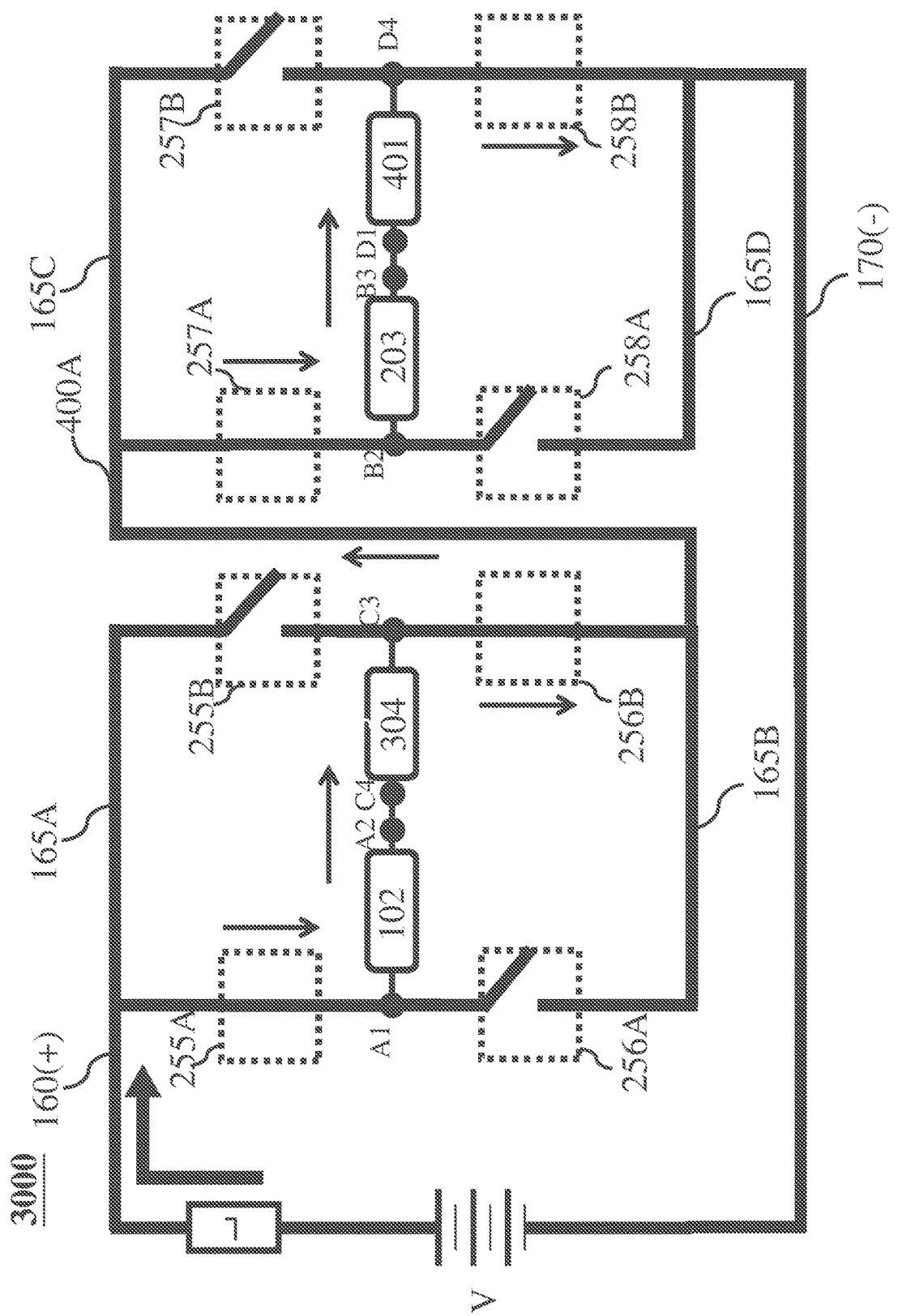
FIGS. 7A~7D are equivalent circuit diagrams at different stages of the 4 steps armature coil of the brushless DC dynamo 3000 of the embodiment 3 according to this present invention.
Figure 7B:
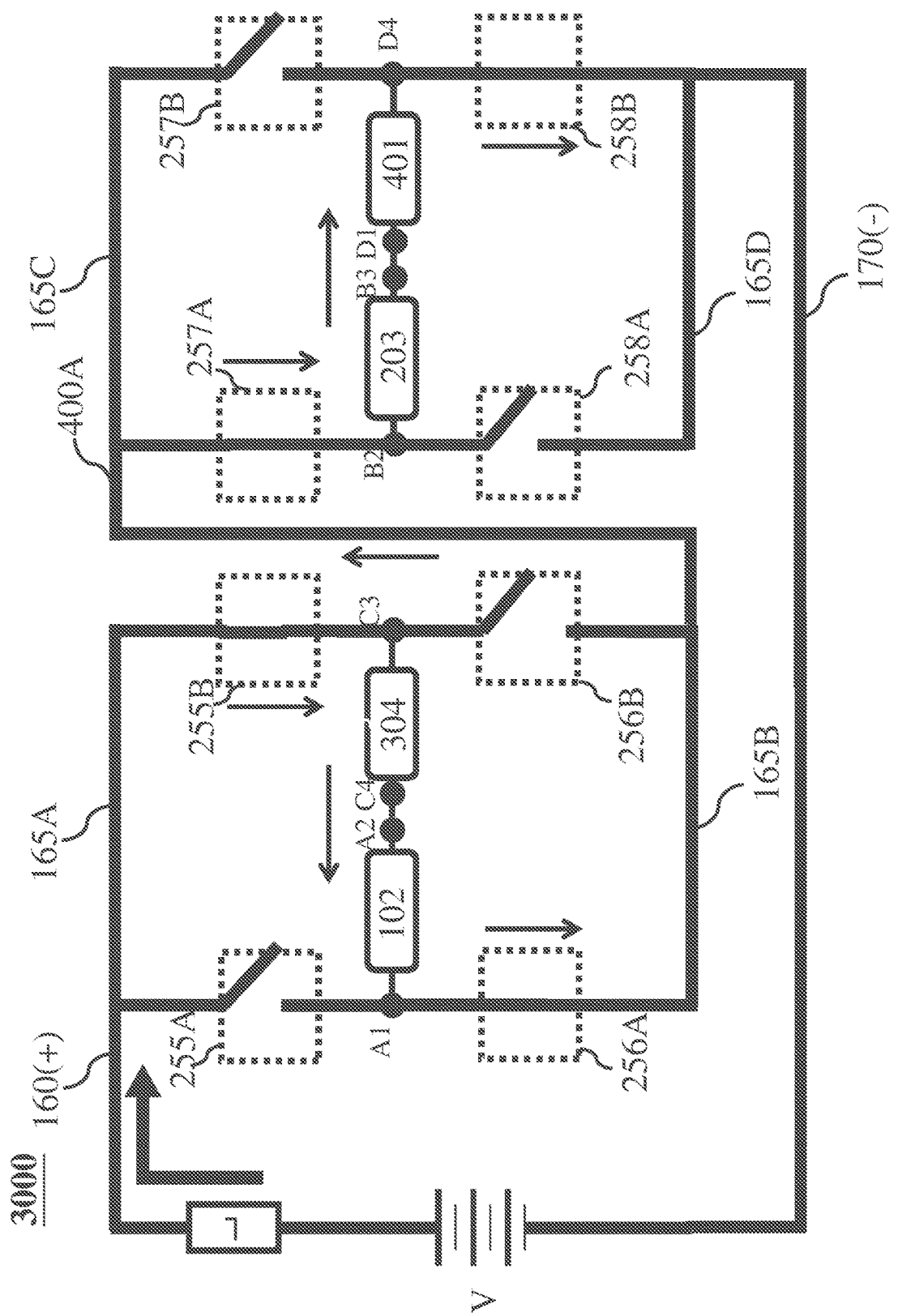

As shown in FIGS. 7A-7B, L=12, M'=4, S=2, S1=1 and S2=1, thereby the armature coils of the brushless DC dynamo 3000 can be divided into two classes including a first class and a second class independent to the first class, wherein the first class comprise one class (S1=1) of the armature coils, and the second classes comprises one class (52=1) of the armature coils, and t1=1, t2=2.

As shown in FIG. 7A~7D, the pair of external electrodes of the brushless DC dynamo 3000 of the Embodiment 3 is a rechargeable battery or a power supplying module V with a first external electrode 160 having a first polarity and a second external electrode having a second polarity opposite to the first polarity, wherein the first external electrode 160 and the first external electrode is interconnected to the rechargeable battery or the power supplying module V in sequence by a inductor. Moreover, the first common potential electrode 165A is directly or indirectly electrically connected to the first external electrode 160, and the second common potential electrode 165B is directly or indirectly electrically connected to a third common potential electrode 165C, and the fourth common potential electrode 165D is electrically connected to the second external electrode 165B.

As shown in FIGS. 7A-7D, the control unit of the brushless DC dynamo 3000 of the Embodiment 3 comprises two (M1'=2) first control switches 255A and 255B, two (M1'=2) second control switches 256A, 256B, two (M1'=2) third control switches 257A and 257B, and two (M2'=2) fourth control switches 258A and 258B.

As shown in FIGS. 7A-7D, the armature coils of the first class (S1=1) are independently connected to the first control switches 255A and 255B interconnected to the first common potential electrode 165A and the second control switches 256A and 256B interconnected to the second common potential electrode 165B, wherein the first class (t1=1) of the armature coils is formed by first step (t1=1) armature coil and the third step (t1=1, S=2) armature coil reversely connected in sequence or in parallel, and a first node A1 and a second node C3 electrically are respectively two terminals of the first class of the armature coils. The first node A1 is electrically connected to the first common potential electrode 165A through the $1^{th}$ first control switch 255A, the second node C3 is electrically connected to the first common potential electrode 165A through the $2^{th}$ first control switch 255B, and the first node A1 is electrically connected to the second common potential electrode 165B through the $1^{th}$ second control switch 256A, the second node C3 is electrically connected to the second common potential electrode 165B through the $2^{th}$ second control switch 256B. There are at most half of the first control switches 255A and 255B short and at most half of the second control switches 256A and 256B short at the same operation time, and the $1^{th}$ first control switch 255A and the $1^{th}$ second control switch 256A are not short at the same time, and the $2^{th}$ first control switch 255B and the $2^{th}$ second control switch 256B are not short at the same time.

As shown in FIGS. 7A-7D, the armature coils of the second class (S2=1) are independently connected to the third control switches 257A and 257B interconnected to the third common potential electrode 165C and the fourth control switches 258A and 258B interconnected to the fourth common potential electrode 165D, wherein the second class (t2=2) of the armature coils is formed by second step of the armature coils and the fourth step of the armature coils reversely connected in sequence or in parallel, and a third node B2 and a fourth node D4 electrically are respectively two terminals of the second class of the armature coils. The third node B2 is electrically connected to the third common potential electrode 165C through the $1^{th}$ third control switch 257A, the fourth node D4 is electrically connected to the third common potential electrode 165C through the $2^{th}$ third control switch 257B, and the third node B2 is electrically connected to the fourth common potential electrode 165D through the $1^{th}$ fourth control switch 258A, the fourth node D4 is electrically connected to the fourth common potential electrode 165D through the $2^{th}$ fourth control switch 258B. There are at most half of the third control switches 257A and 257B short and at most half of the fourth control switches 258A and 258B short at the same operation time, and the third control switch 257A and the $1^{th}$ fourth control switch 258A are not short at the same time, and the $2^{th}$ third control switch 257B and the $2^{th}$ fourth control switch 258B are not short at the same time.

As shown in FIGS. 7A-7B, the polarity of the first external electrode 160 is positive, and the polarity of the second external electrode 170 is negative, and the logic unit (not shown) outputs a positive logic signal to the control unit (not shown), and the $1^{th}$ first control switch 255A is switched from short as shown in FIG. 7A to open as shown in FIG. 7B, the $2^{th}$ first control switch 255B is switched from open as shown in FIG. 7A to short as shown in FIG. 7B, the 1$^{th}$ second control switch 256A is switched from open as shown in FIG. 7A to short as shown in FIG. 7B, the 2$^{th}$ second control switch 256B is switched from short as shown in FIG. 7A to open as shown in FIG. 7B, then the current will be commutated at the node C3 connecting the 3$^{rd}$ step of armature coil 304 and the node A1 connecting the 1$^{th}$ step of armature coil 102 like a commutator disposed therebetween, and make the magnetic unit (not shown) of the brushless DC dynamo 3000 of this present Embodiment 3 clockwise rotate relatively to the circular armature unit (not shown).

Figure 7C:
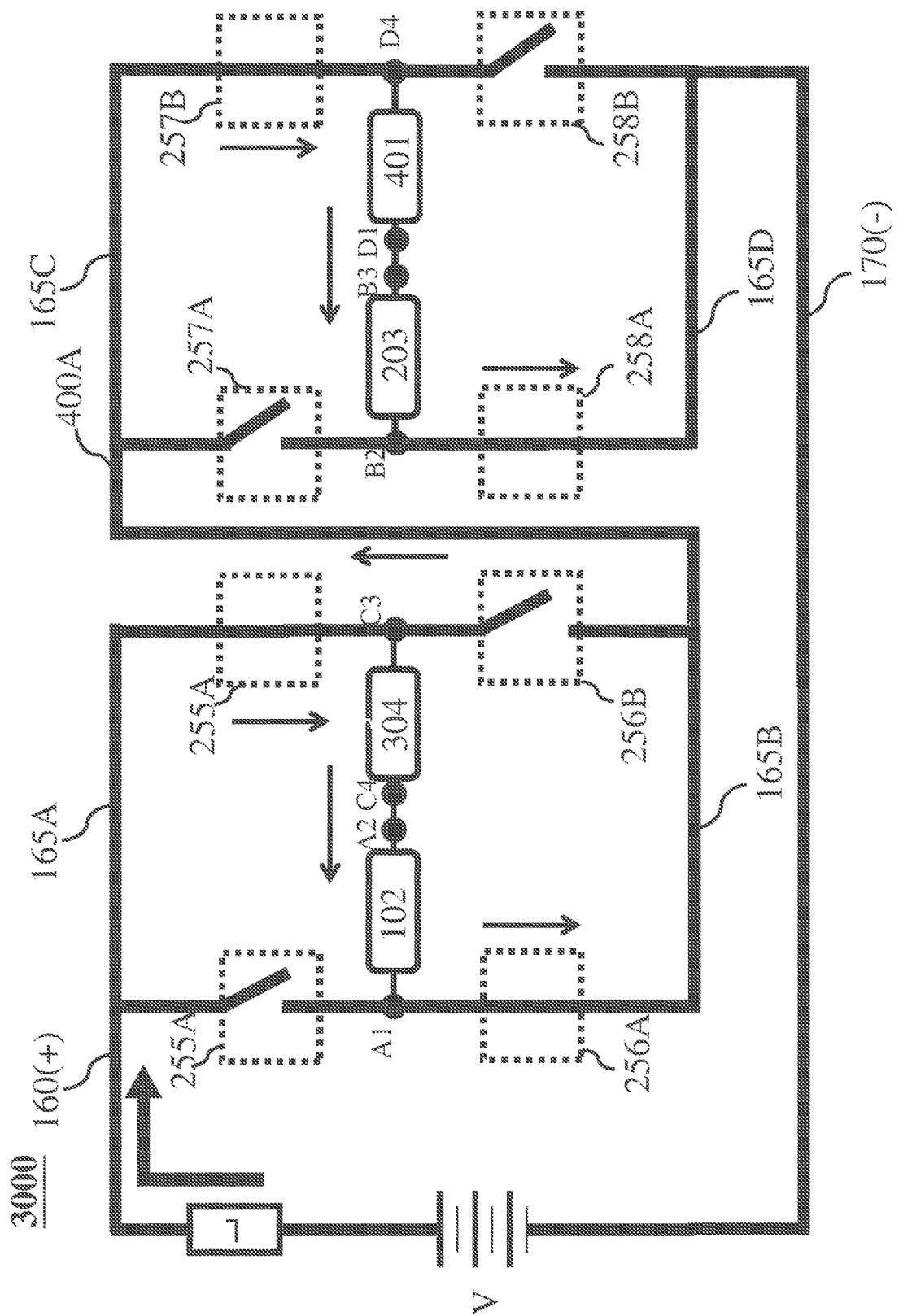

As shown in FIGS. 7B~7C, the polarity of the first external electrode 160 is positive, and the polarity of the second external electrode 170 is negative, and the logic unit (not shown) outputs a positive logic signal to the control unit (not shown), and the 1$^{th}$ third control switch 257A is switched from short as shown in FIG. 7B to open as shown in FIG. 7C, the 2$^{th}$ third control switch 257B is switched from open as shown in FIG. 7B to short as shown in FIG. 7C, the 1$^{th}$ fourth control switch 258A is switched from open as shown in FIG. 7B to short as shown in FIG. 7C, the 2$^{th}$ fourth control switch 258B is switched from short as shown in FIG. 7B to open as shown in FIG. 7C, then the current will be commutated at the node D4 connecting the 4$^{th}$ step of armature coil 401 and the node B2 connecting the 2$^{th}$ step of armature coil 203 like a commutator disposed therebetween, and make the magnetic unit (not shown) of the brushless DC dynamo 3000 of this present Embodiment 3 clockwise rotate relatively to the circular armature unit (not shown).

Figure 7D:
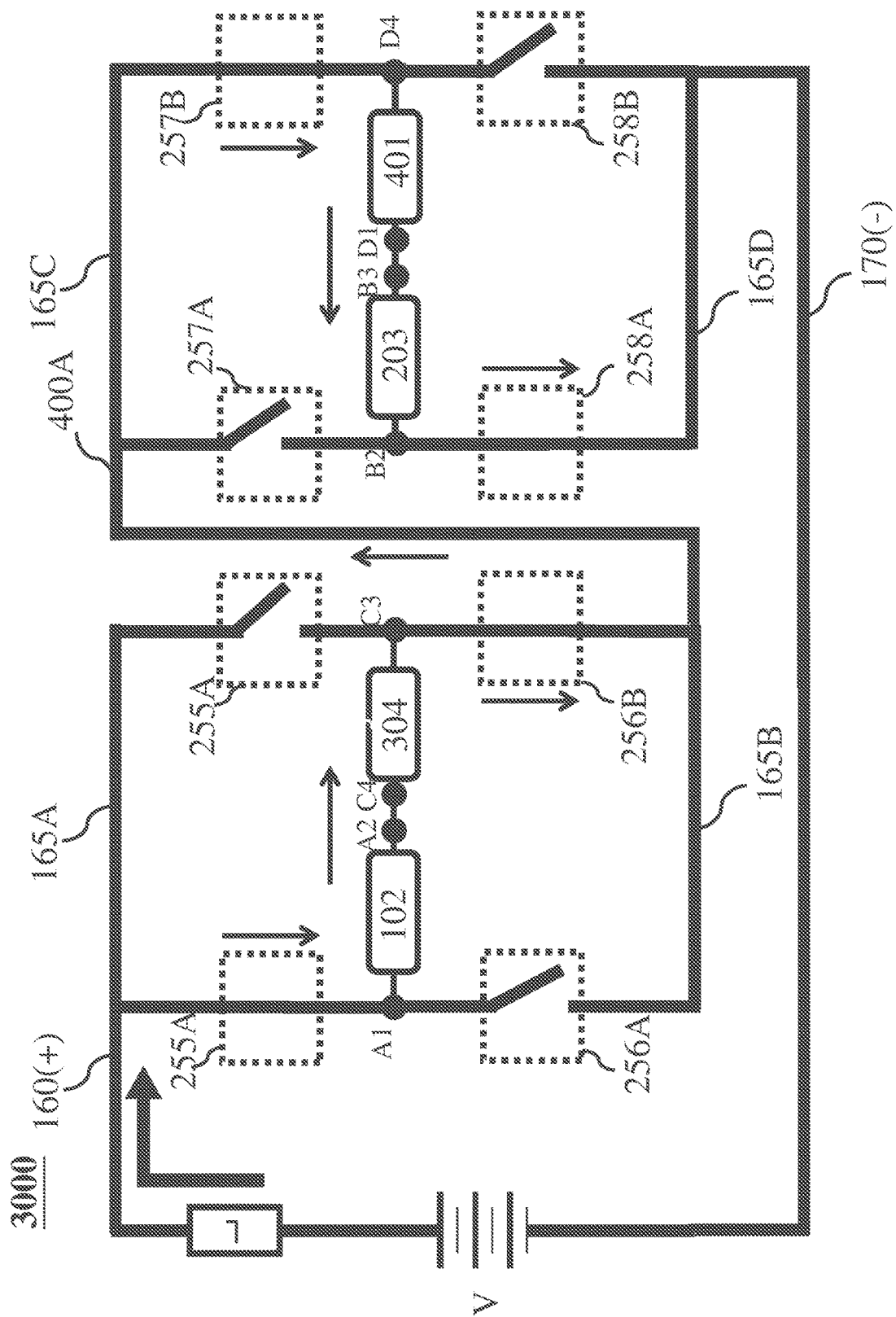

As shown in FIGS. 7C~7D, the polarity of the first external electrode 160 is positive, and the polarity of the second external electrode 170 is negative, and the logic unit (not shown) outputs a positive logic signal to the control unit (not shown), and the 1$^{th}$ first control switch 255A is switched from open as shown in FIG. 7C to short as shown in FIG. 7D, the 2$^{th}$ first control switch 255B is switched from short as shown in FIG. 7C to open as shown in FIG. 7D, the 1$^{th}$ second control switch 256A is switched from short as shown in FIG. 7C to open as shown in FIG. 7D, the 2$^{th}$ second control switch 256B is switched from open as shown in FIG. 7C to short as shown in FIG. 7D, then the current will be commutated at the node C3 connecting the 3$^{rd}$ step of armature coil 304 and the node A1 connecting the 1$^{th}$ step of armature coil 102 like a commutator disposed therebetween, and make the magnetic unit (not shown) of the brushless DC dynamo 3000 of this present Embodiment 3 clockwise rotate relatively to the circular armature unit (not shown).

As shown in FIGS. 7D and 7A, the polarity of the first external electrode 160 is positive, and the polarity of the second external electrode 170 is negative, and the logic unit (not shown) outputs a positive logic signal to the control unit (not shown), and the 1$^{th}$ third control switch 257A is switched from open as shown in FIG. 7D to short as shown in FIG. 7A, the 2$^{th}$ third control switch 257B is switched from short as shown in FIG. 7D to open as shown in FIG. 7A, the 1$^{th}$ fourth control switch 258A is switched from short as shown in FIG. 7D to open as shown in FIG. 7A, the 2$^{th}$ fourth control switch 258B is switched from open as shown in FIG. 7D to short as shown in FIG. 7A, then the current will be commutated at the node D4 connecting the 4$^{th}$ step of armature coil 401 and the node B2 connecting the 2$^{th}$ step of armature coil 203 like a commutator disposed therebetween, and make the magnetic unit (not shown) of the brushless DC dynamo 3000 of this present Embodiment 3 clockwise rotate relatively to the circular armature unit (not shown).

According to the brushless DC dynamo 3000 of this Embodiment 3, the magnetic unit 120 will clockwise rotate relatively to circular armature unit 110 when the polarity of the first external electrode 160 is positive and the polarity of the second external electrode 170 is negative, and the logic unit (not shown) outputs a positive logic signal to the control unit (not shown).

According to the brushless DC dynamo 3000 of this Embodiment 3, the magnetic unit 120 will counterclockwise rotate relatively to circular armature unit 110 when the polarity of the first external electrode 160 is positive and the polarity of the second external electrode 170 is negative, and the logic unit (not shown) outputs a negative logic signal to the control unit (not shown).

According to the brushless DC dynamo 3000 of this Embodiment 3, the magnetic unit 120 will clockwise rotate relatively to circular armature unit 110 when the polarity of the first external electrode 160 is negative and the polarity of the second external electrode 170 is positive, and the logic unit (not shown) outputs a negative logic signal to the control unit (not shown).

According to the brushless DC dynamo 3000 of this Embodiment 3, the magnetic unit 120 will counterclockwise rotate relatively to circular armature unit 110 when the polarity of the first external electrode 160 is negative and the polarity of the second external electrode 170 is positive, and the logic unit (not shown) outputs a positive logic signal to the control unit (not shown).

Moreover, the driving direction or output direction of the brushless DC dynamo 3000 will be reversed when the polarities of the first external electrode 160 and the second external electrode 170 are not changed, and the polarity outputted by the logic unit (not shown) is changed to reverse the operations of all first control switches 255A~255B, all second control switches 256A~256B, all third control switches 257A~257B and all fourth control switches 258A~258B of the same step. Specially, the driving direction or output direction of the brushless DC dynamo 3000 will be quickly reversed to provide a function of bi-polar pulse with modulation (PWM) when the polarities of the first external electrode 160 and the second external electrode 170 are not changed, and the polarity of signals outputted by the logic unit (not shown) is quickly changed to reverse the operations of all first control switches 255A~255B, all second control switches 256A~256B, all third control switches 257A~257B and all fourth control switches 258A~258B of the same step. In addition, the function of unipolar pulse with modulation (PWM) mentioned above can be achieved by quickly enabling or disenabling signals outputted by the logic unit (not shown) without changing polarities thereof to simultaneously enable or disenable the operations of all first control switches 255A~255B, all second control switches 256A~256B, all third control switches 257A~257B and all fourth control switches 258A~258B of the same step.

Furthermore, the above-mentioned brushless DC dynamo 3000 according to Embodiment 3 of this invention can be equipped with a vehicle, and the rotation direction of the driving axis of the vehicle can be changed by controlling the magnetic unit 120 to clockwise or counterclockwise rotate relatively to the circular armature unit 110 of the above-mentioned brushless DC dynamo 3000 controlled by the polarities of the first external electrode 160, the second external electrode 170 and the logic signals output by the logic unit.

Exemplary Embodiment 4

The structure of the brushless DC dynamo 4000 of this Embodiment 4 is similar to that of the brushless DC dynamo 3000, except that the brushless DC dynamo 4000 further comprises a 5$^{th}$ control switch 400A, a 6$^{th}$ control switch 400B and a 7$^{th}$ control switch 400C.

Figure 8A:
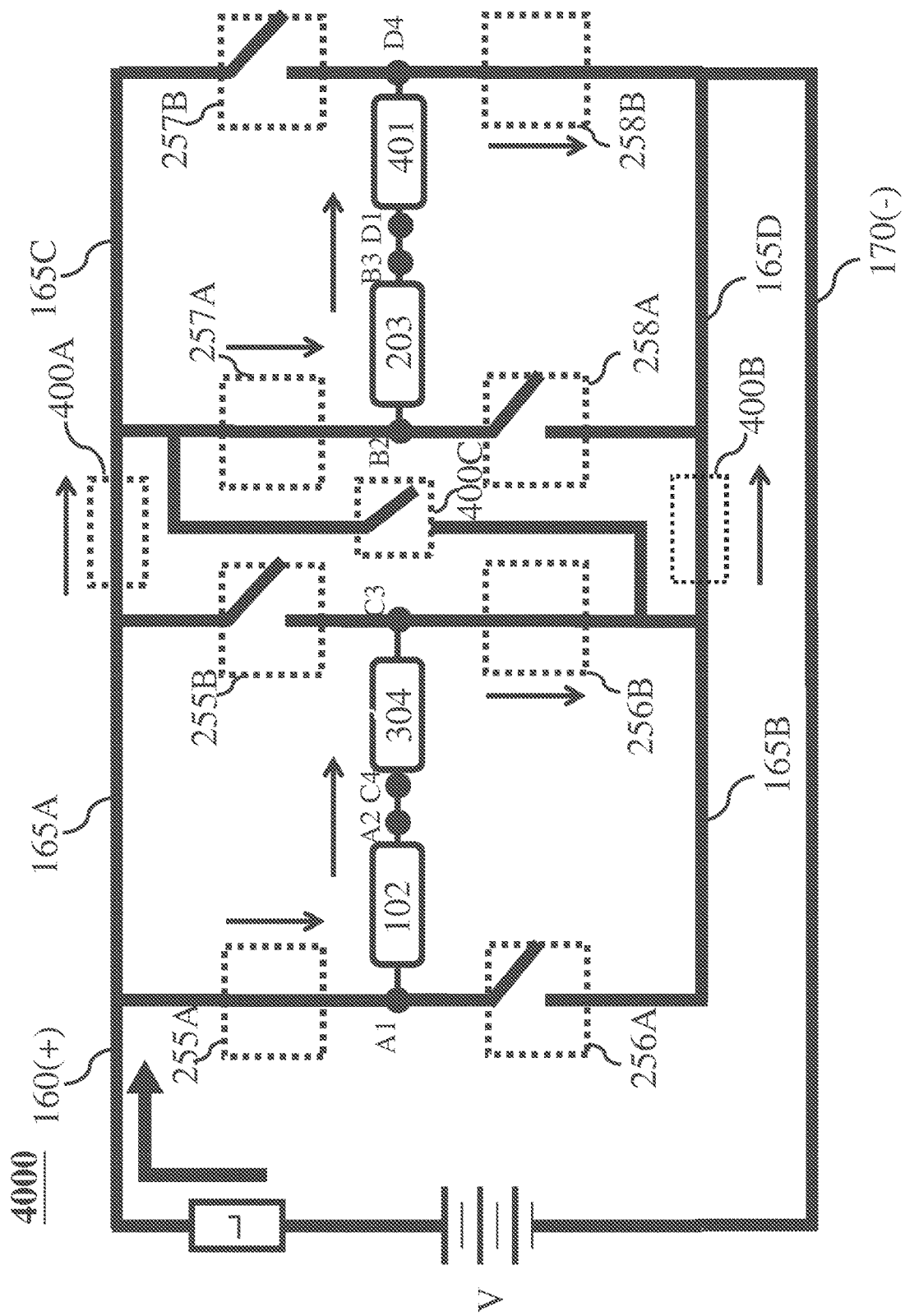
FIGS. 8A~8B are equivalent circuit diagrams at different stages of the 4 steps armature coil of the brushless DC dynamo 4000 of the embodiment 4 according to this present invention.
Figure 8B:
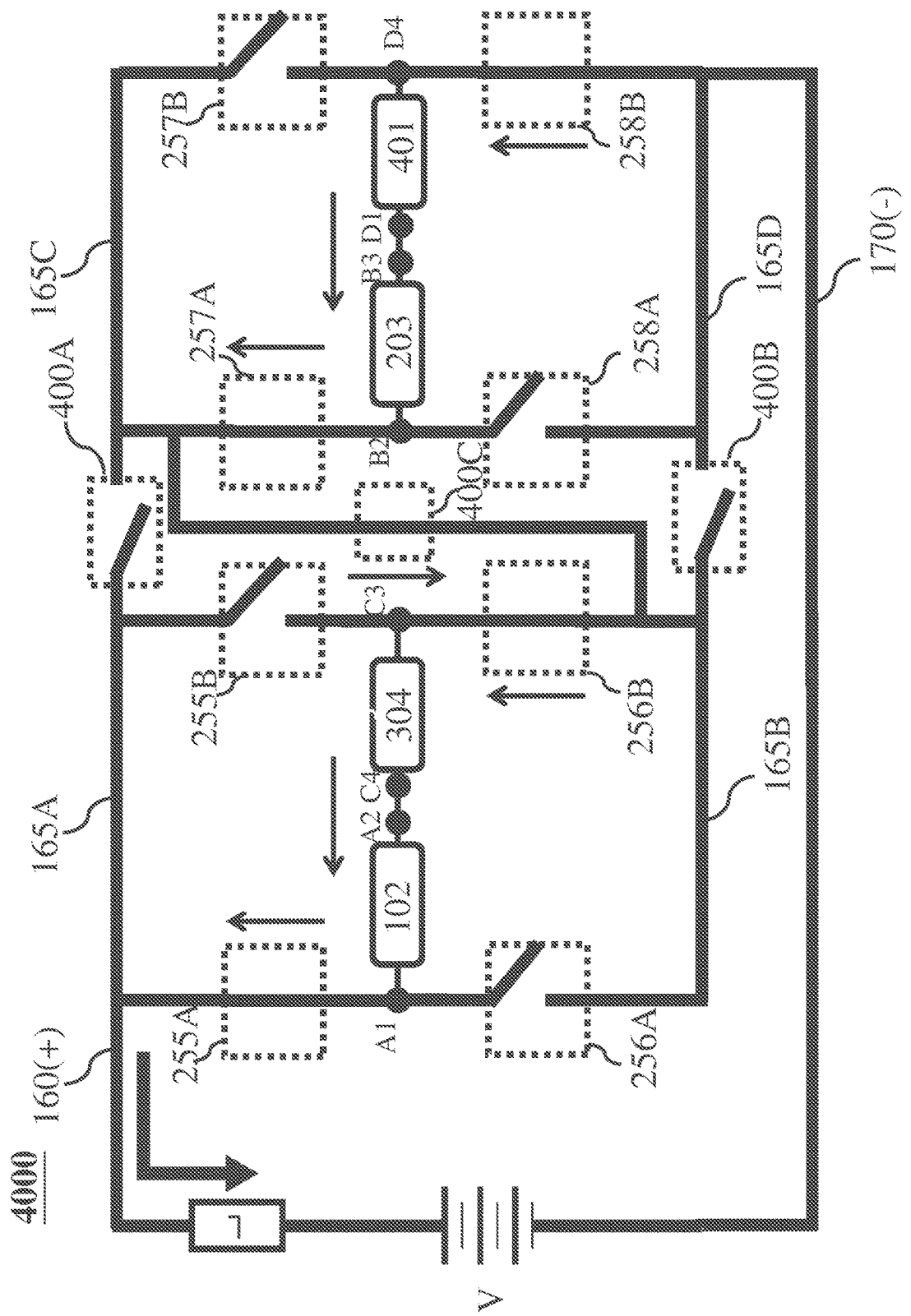

As shown in FIGS. 8A-8B, the brushless DC dynamo 4000 further comprises a 5$^{th}$ control switch 400A, a 6$^{th}$ control switch 400B and a 7$^{th}$ control switch 400C, wherein the third common potential electrode 165C is electrically connected to one terminal of the 5$^{th}$ control switch 400A and one terminal of the 7$^{th}$ control switch 400C, and the other terminal of the 5$^{th}$ control switch 400A is electrically connected to the first common potential electrode 165A, and the second common potential electrode 165B is electrically connected to one terminal of the 6$^{th}$ control switch 400B and the other terminal of the 7$^{th}$ control switch 400C, and the other terminal of the 6$^{th}$ control switch 400B is electrically connected to the fourth common potential electrode 165D.

As shown in FIG. 8A, the brushless DC dynamo 4000 acts as motors connected in parallel and can be driven by the rechargeable battery module V when the 5$^{th}$ control switch 400A and the 6$^{th}$ control switch 400B are short and the 7$^{th}$ control switch 400C is open.

As shown in FIG. 8B, the brushless DC dynamo 4000 acts as generators connected in series and charges to the rechargeable battery module V when the 5$^{th}$ control switch 400A and the 6$^{th}$ control switch 400B are open and the 7$^{th}$ control switch 400C is short.

Furthermore, the brushless DC dynamo 400 can optionally comprise a resistor (not shown) and electrically to the inductor L in parallel.

The brushless DC dynamo 4000 of the Embodiment 4 as mentioned above, wherein the first control switch, the second control switch, the third control switch and the fourth control switch are power device switches for example but not limited to SiC switches, GaN switches, bipolar junction transistor (BJT) switches, insulated gate bipolar transistor (IGBT) switches or metal-oxide-semiconductor field-effect transistor (MOSFET) switches.

The brushless DC dynamo 4000 of the Embodiment 4 as mentioned above, wherein the magnetic unit is a permanent magnet or a electromagnet.

The brushless DC dynamo 4000 of the Embodiment 4 as mentioned above, wherein the logic element is for example but not limited to a resolver, a encoder, a Hall sensor, a photointerrupter or a photoelectric sensor.

The brushless DC dynamo 4000 of the Embodiment 4 as mentioned above, wherein the first armature coils and the second armature coils are manufactured by wave winding, lap winding or frog-leg winding.

The brushless DC dynamo 4000 of the Embodiment 4 as mentioned above, wherein the circular armature unit is a circular stator and the magnetic unit is a magnetic rotor, or alternatively the circular armature unit is a circular rotor and the magnetic is a magnetic stator.

Moreover, the driving direction or output direction of the brushless DC dynamo 4000 will be reversed when the polarities of the first external electrode 160 and the second external electrode 170 are not changed, and the polarity outputted by the logic unit (not shown) is changed to reverse the operations of all first control switches 255A~255B, all second control switches 256A~256B, all third control switches 257A~257B and all fourth control switches 258A~258B of the same step. Specially, the driving direction or output direction of the brushless DC dynamo 3000 will be quickly reversed to provide a function of bi-polar pulse with modulation (PWM) when the polarities of the first external electrode 160 and the second external electrode 170 are not changed, and the polarity of signals outputted by the logic unit (not shown) is quickly changed to reverse the operations of all first control switches 255A~255B, all second control switches 256A~256B, all third control switches 257A~257B and all fourth control switches 258A~258B of the same step. In addition, the function of unipolar pulse with modulation (PWM) mentioned above can be achieved by quickly enabling or disenabling signals outputted by the logic unit (not shown) without changing polarities thereof to simultaneously enable or disenable the operations of all first control switches 255A~255B, all second control switches 256A~256B, all third control switches 257A~257B and all fourth control switches 258A~258B of the same step.

Furthermore, the above-mentioned brushless DC dynamo 4000 according to Embodiment 4 of this invention can be equipped with a vehicle, and the rotation direction of the driving axis of the vehicle can be changed by controlling the magnetic unit 120 to clockwise or counterclockwise rotate relatively to the circular armature unit 110 of the above-mentioned brushless DC dynamo 4000 controlled by the polarities of the first external electrode 160, the second external electrode 170 and the logic signals output by the logic unit.

The invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brushless DC dynamo, comprising:
    a circular armature unit, comprising:
        L slots of first armature conductors spaced with each other in sequence, and 1$^{th}$ slot of the first armature conductors is adjacent to L$^{th}$ slot of the first armature conductors and spatially joined with each other, L is a natural number; and
        L slots of second armature conductors spaced with each other in sequence, adjacent to the L$^{th}$ slots of the first armature conductors, and 1$^{th}$ slot of the second armature conductors is adjacent to L$^{th}$ slot of the second armature conductors and spatially joined with each other, L is a natural number;
    a magnetic unit, disposed inside the circular armature unit, comprising N pairs of magnetic poles, N is a natural number, wherein the circular armature unit and the magnetic unit rotate relatively to each other under control, and each of the magnetic poles faces S slots of the circular armature unit, S is a natural number and S≥2, and each pair of the magnetic poles faces M slots of the circular armature unit, M is a natural number, M=2S and L=M*N;
    a pair of external electrodes comprising a first external electrode with a first polarity and a second external electrode with a second polarity, wherein the first polarity and the second polarity are opposite to each other;
    a control unit comprising M first control switches and M second control switches; and
    a logic unit electrically connected to the control unit, wherein logic signals for controlling short or open of the first control switches and the second control switches are outputted by the logic unit by sensing positions of the magnetic unit;

wherein, the first armature conductors and the second armature conductors are classified as M steps of armature coils interconnecting in sequence, and $P^{th}$ step of the armature coils is formed by P1 slot of the first armature conductors satisfying with $1 \leq Q \leq N$ and P2 slot of the second armature conductors satisfying $1 \leq Q \leq N$ interconnecting in sequence, wherein P1=1+remainder of $\{[P-1+(M*(Q-1))]/L\}$, P2=1+remainder of $\{[P-1+(M*(Q-1))+S]/L\}$, P, Q, S are all natural numbers, and $1 \leq P \leq M$, $1 \leq Q \leq N$, $1 \leq P1 \leq L$, $1 \leq P2 \leq L$;

wherein, $1^{th}$ first control switch is disposed between the first external electrode with a first polarity and a node connecting $1^{th}$ step of the armature coils and $M^{th}$ step of the armature coils, wherein $i^{th}$ first control switch is disposed between the first external electrode with a first polarity and a node connecting $(i-1)^{th}$ step of the armature coils and $i^{th}$ step of the armature coils, and $i^{th}$ second control switch is disposed between the second external electrode with a second polarity and a node connecting $1^{th}$ step of the armature coils and $M^{th}$ step of the armature coils, wherein $i^{th}$ second control switch is disposed between the second external electrode with a second polarity and a node connecting $(i-1)^{th}$ step of the armature coils and $i^{th}$ step of the armature coils, i is a natural number and $2 \leq i \leq M$;

wherein, when the brushless DC dynamo is operated under a basic mode, there is only one of the first control switch that is short and only one of the second control switch that is short at the same operating time, wherein when $1^{th}$ first control switch is short, $(1+S)^{th}$ second control switch is short; when $2 \leq i \leq S$, $i^{th}$ first control switch is short, $(i+S)^{th}$ second control switch is short; when i=S+1, $i^{th}$ first control switch is short, $1_{st}$ second control switch is short; when $S+1 \leq i \leq M$, $i^{th}$ first control switch is short, $(i-S)^{th}$ second control switch is short;

wherein when the brushless DC dynamo is operated under transition mode during transiting from a basic mode to next basic mode, adjacent two of the first control switches or adjacent two of the second control switches of the brushless DC dynamo can be short at the same operating time, and the first control switches not adjacent to each other or the second control switches not adjacent to each other of the brushless DC dynamo cannot be short at the same operating time.

2. The brushless DC dynamo as claimed in claim 1, wherein the driving or outputting direction of the brushless DC dynamo will be reversed when the polarities of the logic signals outputted by the logic unit are changed to upset the operation of the first control switches and the second control switches of the same step without changing the first polarity of the first external electrode and the second polarity of the second external electrode.

3. The brushless DC dynamo as claimed in claim 2, wherein the driving or outputting direction of the brushless DC dynamo will be quickly reversed to provide a power modulation function similar to bipolar pulse width modulation (PWM) when the polarities of the logic signals outputted by the logic unit are quickly changed to quickly upset the operation of the first control switches and the second control switches of the same step without changing the first polarity of the first external electrode and the second polarity of the second external electrode.

4. The brushless DC dynamo as claimed in claim 1, wherein a power modulation function similar to single polar pulse width modulation (PWM) is provided when the polarities of the first external electrode and the second external electrode and the polarities of the logic signals output by the logic unit are not changed, and the logic signals output by the logic unit are quickly synchronously enabled or forbidden to quickly synchronously enable or forbid the operation of the first control switches and the second control switches of the same step.

5. A brushless DC dynamo, comprising:
a circular armature unit, comprising:
L slots of first armature conductors spaced with each other in sequence, and $1^{th}$ slot of the first armature conductors is adjacent to $L^{th}$ slot of the first armature conductors and spatially joined with each other, L is a natural number; and
L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number;
a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and $S \geq 2$, and each pair of the magnetic poles faces M' slots of the circular armature unit, M' is a natural number and M'=2S, L=M'*N;
a pair of external electrodes comprising a first external electrode with a first polarity and a second external electrode with a second polarity, wherein the first polarity and the second polarity are opposite to each other;
a control unit comprising M' first control switches and M' second control switches; and
a logic unit electrically connected to the control unit, wherein logic signals for controlling short or open of the first control switches and the second control switches are outputted by the logic unit by sensing positions of the magnetic unit;
wherein, the first armature conductors and the second armature conductors are classified as M' steps of armature coils interconnecting in sequence, and $P^{th}$ step of the armature coils is formed by P1 slot of the first armature conductors satisfying with $1 \leq Q \leq N$ and P2 slot of the second armature conductors satisfying $1 \leq Q \leq N$ interconnecting in sequence, wherein P1=1+remainder of $\{[P-1+(M'*(Q-1)+S)]/L\}$, P2=1+remainder of $\{[P-1+(M'*(Q-1))]/L\}$, P, Q, P1, P2 are all natural numbers, and $M' \geq 4$, $1 \leq P \leq M'$, $1 \leq Q \leq N$, $1 \leq P1 \leq L$, $1 \leq P2 \leq L$, and the armature coils are classified as S classes, wherein $t^{th}$ class of the armature coils is formed by $t^{th}$ step of the armature coils and $(t+S)^{th}$ step of the armature coils reversely connected in sequence or in parallel, t is a natural number and $t \leq S$;
wherein, a $(2t-1)^{th}$ node and a $(2t)^{th}$ node are on two terminals of the $t^{th}$ class of the armature coils formed by $t^{th}$ step of the armature coils and $(t+S)^{th}$ step of the armature coils reversely connected in sequence or in parallel, and a $t^{th}$ first control switch is interconnected with the first external electrode with a first polarity at the $(2t-1)^{th}$ node, and a $(t+S)^{th}$ second control switch is interconnected with the second external electrode with a second polarity at the $(2t)^{th}$ node;
wherein, there are at most half of the first control switches short and at most half of the second control switches short at the same operation time, and the $t^{th}$ first control switch and the $t^{th}$ second control switch are not short at the same time, and the the $(t+S)^{th}$ first control switch and the $(t+S)^{th}$ second control switch are not short at the same time.

6. The brushless DC dynamo as claimed in claim 5, wherein the driving or outputting direction of the brushless DC dynamo will be reversed when the polarities of the logic signals outputted by the logic unit are changed to upset the operation of the first control switches and the second control switches of the same step without changing the first polarity of the first external electrode and the second polarity of the second external electrode.

7. The brushless DC dynamo as claimed in claim 6, wherein the driving or outputting direction of the brushless DC dynamo will be quickly reversed to provide a power modulation function similar to bipolar pulse width modulation (PWM) when the polarities of the logic signals outputted by the logic unit are quickly changed to quickly upset the operation of the first control switches and the second control switches of the same step without changing the first polarity of the first external electrode and the second polarity of the second external electrode, or a power modulation function similar to single polar pulse width modulation (PWM) is provided when the polarities of the first external electrode and the second external electrode and the polarities of the logic signal output by the logic unit are not changed, and the logic signals output by the logic unit are quickly synchronously enabled or forbidden to quickly synchronously enable or forbid the operation of the first control switches and the second control switches of the same step.

8. The brushless DC dynamo as claimed in claim 5, wherein a power modulation function similar to single polar pulse width modulation (PWM) is provided when the polarities of the first external electrode and the second external electrode and the polarities of the logic signals output by the logic unit are not changed, and the logic signals output by the logic unit are quickly synchronously enabled or forbidden to quickly synchronously enable or forbid the operation of the first control switches and the second control switches of the same step.

9. A brushless DC dynamo, comprising:
   a circular armature unit, comprising:
      L slots of first armature conductors spaced with each other in sequence, and $1^{th}$ slot of the first armature conductors is adjacent to $L^{th}$ slot of the first armature conductors and spatially joined with each other, L is a natural number; and
      L slots of second armature conductors spaced with each other in sequence, adjacent to the L slots of the first armature conductors, and $1^{th}$ slot of the second armature conductors is adjacent to $L^{th}$ slot of the second armature conductors and spatially joined with each other, L is a natural number;
   a magnetic unit, disposed inside the circular armature unit, comprising N pairs of magnetic poles, wherein the circular armature unit and the magnetic unit rotate relatively to each other under control, N is a natural number, and each of the magnetic poles faces S slots of the circular armature unit, S is a natural number and S≥2, and each pair of the magnetic poles faces M' slots of the circular armature unit, M' is a natural number and M'=2S, L=M'*N;
   a pair of external electrodes comprising a first external electrode with a first polarity and a second external electrode with a second polarity, wherein the first polarity and the second polarity are opposite to each other, and the pair of external electrodes is a rechargeable battery or a power supplying module, and the first external electrode is interconnected to the rechargeable battery or the power supplying module in sequence by a inductor;
   a first common potential electrode directly or indirectly electrically connected to the first external electrode with a first polarity;
   a second common potential electrode;
   a third common potential electrode electrically connected to the second common potential electrode;
   a fourth common potential electrode directly or indirectly electrically connected to the second external electrode with a second polarity;
   a control unit comprising M1' first control switches, M1' second control switches, M2' third control switches and M2' fourth control switches, wherein M1'=2S1, M2'=2S2, M1'+M2'≤M', and S1≥1, S2≥1, S1+S2≤S, and M1', M2', S1 and S2 are all natural numbers; and
   a logic unit electrically connected to the control unit, wherein logic signals for controlling short or open of the first control switches, the second control switches, the third control switches and the fourth control switches are outputted by the logic unit by sensing the positions of the magnetic unit;
wherein, the first armature conductors and the second armature conductors are classified as M' steps of armature coils interconnecting in sequence, and $P^{th}$ step of the armature coils is formed by P1 slot of the first armature conductors satisfying with 1≤Q≤N and P2 slot of the second armature conductors satisfying 1≤Q≤N interconnecting in sequence, wherein P1=1+remainder of $\{[P-1+(M'*(Q-1))]/L\}$, P2=1+remainder of $\{[P-1+(M'*(Q-1))+S]/L\}$, P, Q, P1, P2 are all natural numbers, and M'≥4, 1≤P≤M', 1≤Q≤N, 1≤P1≤L, 1≤P2≤L, and the armature coils are classified as S classes, and the S classes of the armature coils are further divided into a first group and a second group, wherein the first group includes S1 classes of the armatures coils and the second group includes S2 classes of the armature coils;
wherein, the S1 classes of the armature coils in the first class are independently connected to the first control switch electrically connected to the first common potential electrode and the second control switch electrically connected to the second common potential electrode, wherein $t1^{th}$ class of the armature coils is formed by t1 step of the armature coils and $t1+S^{th}$ step of the armature coils reversely connected in sequence or in parallel, t1 is a natural number and 1≤t1≤S, and wherein, a $[2(t1)-1]^{th}$ node and a $[2(t1)]^{th}$ node are on two terminals of the $t1^{th}$ class of the armature coils, and a $[2(t1)]^{th}$ first control switch is interconnected between the first common potential electrode and the $[2(t1)-1]^{th}$ node, and a $[2(t1)-1]^{th}$ second control switch is interconnected between the second common potential electrode and the $[2(t1)-1]^{th}$ node, and there are at most half of the first control switches short and at most half of the second control switches short at the same operation time, and the $[2(t1)-1]^{th}$ first control switch and the $[2(t1)-1]^{th}$ second control switch are not short at the same time, and the $[2(t1)]^{th}$ first control switch and the $[2(t1)]^{th}$ second control switch are not short at the same time;
wherein, the S2 classes of the armature coils in the second class are independently connected to the third control switch electrically connected to the third common potential electrode and the fourth control switch electrically connected to the fourth common potential electrode, wherein $t2^{th}$ class of the armature coils is formed by t2 step of the armature coils and $(t2+S)^{th}$ step of the armature coils reversely connected in sequence or in parallel, t2 is a natural number and $S1+1 \leq t2 \leq S$, and a $[2(t2)-1]^{th}$ node and a $[2(t2)-3]^{th}$ node are on two terminals of the $t2^{th}$ class of the armature coils, and a $[2(t2)-3]^{th}$ third control switch is interconnected with the third common potential electrode at the $[2(t2)-1]^{th}$ node, and a $[2(t2)-2]^{th}$ second control switch is interconnected with the second common potential electrode at the $[2(t2)]^{th}$ node, and there are at most half of the third control switches short and at most half of the fourth control switches short at the same operation time, and the $[2(t2)-3]^{th}$ third control switch and the $[2(t2)-3]^{th}$ fourth control switch are not short at the same time, and the $[2(t2)-2]^{th}$ third control switch and the $[2(t2)-2]^{th}$ fourth control switch are not short at the same time.

10. The brushless DC dynamo as claimed in claim 9, further comprising a fifth control switch, a sixth control switch and a seventh control switch, wherein the third common potential electrode electrically is electrically connected to a terminal of the fifth control switch and a terminal of the seventh control switch and the other one terminal of the fifth control switch is electrically connected to the first common potential electrode, and the second common potential electrode electrically is electrically connected to a terminal of the sixth control switch and the other one terminal of the seventh control switch and the other one terminal of the sixth control switch is electrically connected to the fourth common potential electrode, wherein the brushless DC dynamo acts as motor connected in parallel driven by the rechargeable battery module when the fifth control switch and the sixth control switch are short and the seventh control switch is open, and the brushless DC dynamo acts as generator connected in series and charge to the rechargeable battery module when the fifth control switch and the sixth control switch are open and the seventh control switch is short.

11. The brushless DC dynamo as claimed in claim 9 or claim 10, wherein the driving or outputting direction of the brushless DC dynamo will be reversed when the polarities of the logic signals outputted by the logic unit are changed to upset the operation of the first control switches, the second control switches, the third control switches, and the fourth control switches of the same step without changing the first polarity of the first external electrode and the second polarity of the second external electrode.

12. The brushless DC dynamo as claimed in claim 9 or claim 10, wherein the driving or outputting direction of the brushless DC dynamo will be quickly reversed to provide a power modulation function similar to bipolar pulse width modulation (PWM) when the polarities of the logic signals outputted by the logic unit are quickly changed to quickly upset the operation of the first control switches, the second control switches, the third control switches and the fourth controlling switches of the same step without changing the first polarity of the first external electrode and the second polarity of the second external electrode.

13. The brushless DC dynamo as claimed in claim 1, wherein a power modulation function similar to single polar pulse width modulation (PWM) is provided when the polarities of the first external electrode and the second external electrode and the polarities of the logic signals output by the logic unit are not changed, and the logic signals output by the logic unit are quickly synchronously enabled or forbidden to quickly synchronously enable or forbid the operation of the first control switches, the second control switches, the third control switches and the fourth control switches of the same step.

14. A vehicle, comprising a lease one brushless DC dynamo as claimed in claim 1.

15. A vehicle, comprising a lease one brushless DC dynamo as claimed in claim 5.

16. A vehicle, comprising a lease one brushless DC dynamo as claimed in claim 9.

* * * * *